(12) United States Patent  
Patton

(10) Patent No.: US 12,511,021 B2  
(45) Date of Patent: Dec. 30, 2025

(54) DEVICE MANAGEMENT USER INTERFACE

(71) Applicant: Apple Inc., Cupertino, CA (US)

(72) Inventor: Jennifer D. Patton, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/410,169

(22) Filed: Aug. 24, 2021

(65) Prior Publication Data

US 2022/0083183 A1   Mar. 17, 2022

Related U.S. Application Data

(60) Provisional application No. 63/078,224, filed on Sep. 14, 2020.

(51) Int. Cl.
*G06F 3/04817* (2022.01)
*G06F 3/0482* (2013.01)
*G06F 3/0484* (2022.01)

(52) U.S. Cl.
CPC ........ *G06F 3/0484* (2013.01); *G06F 3/04817* (2013.01); *G06F 3/0482* (2013.01)

(58) Field of Classification Search
CPC .. G06F 3/0484; G06F 3/04817; G06F 3/0482; G06F 1/1626; G06F 1/163; G06F 3/04847; G06F 3/0481; G06F 9/451
See application file for complete search history.

(56) References Cited

U.S. PATENT DOCUMENTS

| | | | |
|---|---|---|---|
| 4,803,487 A | 2/1989 | Willard et al. | |
| 4,974,174 A | 11/1990 | Kleinman | |
| 5,305,435 A | 4/1994 | Bronson | |
| 5,333,256 A | 7/1994 | Green et al. | |
| 5,463,725 A | 10/1995 | Henckel et al. | |
| 5,544,295 A | 8/1996 | Capps | |
| 5,572,649 A | 11/1996 | Elliott et al. | |
| 5,617,031 A | 4/1997 | Tuttle | |
| 5,736,974 A | 4/1998 | Selker | |
| 5,745,096 A | 4/1998 | Ludolph et al. | |
| 5,793,366 A | 8/1998 | Mano et al. | |
| 5,825,353 A | 10/1998 | Will | |
| 5,853,327 A | 12/1998 | Gilboa | |
| 5,943,039 A | 8/1999 | Anderson et al. | |

(Continued)

FOREIGN PATENT DOCUMENTS

| | | | |
|---|---|---|---|
| AU | 2015101019 A4 | 9/2015 | |
| AU | 2015101022 A4 | 9/2015 | |

(Continued)

OTHER PUBLICATIONS

Applicant Initiated Interview Summary received for U.S. Appl. No. 17/188,228, mailed on Jun. 14, 2022, 9 pages.

(Continued)

*Primary Examiner* — Tuyetlien T Tran

(74) *Attorney, Agent, or Firm* — YHE Law LLP

(57) ABSTRACT

The present disclosure generally relates to managing external devices with an electronic device. User interfaces visually distinguish between external devices having a first relationship with the electronic device and external devices having a second relationship with the electronic device to facilitate a user's ability to determine a particular external device to manage.

46 Claims, 23 Drawing Sheets

(56) References Cited

U.S. PATENT DOCUMENTS

| | | |
|---|---|---|
| 5,960,366 A | 9/1999 | Duwaer |
| 5,973,694 A | 10/1999 | Steele et al. |
| 6,002,398 A | 12/1999 | Wilson |
| 6,005,579 A | 12/1999 | Sugiyama et al. |
| 6,008,807 A | 12/1999 | Bretschneider et al. |
| 6,016,248 A | 1/2000 | Anzai et al. |
| 6,043,816 A | 3/2000 | Williams et al. |
| 6,166,736 A | 12/2000 | Hugh |
| 6,167,353 A | 12/2000 | Piernot et al. |
| 6,190,174 B1 | 2/2001 | Lam et al. |
| 6,215,490 B1 | 4/2001 | Kaply |
| 6,230,170 B1 | 5/2001 | Zellweger et al. |
| 6,232,972 B1 | 5/2001 | Arcuri et al. |
| 6,310,633 B1 | 10/2001 | Graham et al. |
| 6,333,752 B1 | 12/2001 | Hasegawa et al. |
| 6,336,126 B1 | 1/2002 | Bjorklund et al. |
| 6,359,837 B1 | 3/2002 | Tsukamoto |
| 6,369,794 B1 | 4/2002 | Sakurai et al. |
| 6,429,896 B1 | 8/2002 | Aruga et al. |
| 6,462,757 B1 | 10/2002 | Kao et al. |
| 6,486,895 B1 | 11/2002 | Robertson et al. |
| 6,522,347 B1 | 2/2003 | Sakai et al. |
| 6,556,222 B1 | 4/2003 | Narayanaswami |
| 6,570,583 B1 | 5/2003 | Kung et al. |
| 6,609,146 B1 | 8/2003 | Slotznick et al. |
| 6,636,246 B1 | 10/2003 | Gallo et al. |
| 6,650,894 B1 | 11/2003 | Berstis et al. |
| 6,661,438 B1 | 12/2003 | Shiraishi et al. |
| 6,768,497 B2 | 7/2004 | Baar et al. |
| 6,809,724 B1 | 10/2004 | Shiraishi et al. |
| 6,809,759 B1 | 10/2004 | Chiang |
| 6,819,867 B2 | 11/2004 | Mayer et al. |
| 6,857,105 B1 | 2/2005 | Fox et al. |
| 6,889,138 B1 | 5/2005 | Krull et al. |
| 6,900,793 B2 | 5/2005 | Goh et al. |
| 6,937,228 B2 | 8/2005 | Yu |
| 6,957,395 B1 | 10/2005 | Jobs et al. |
| 6,977,868 B2 | 12/2005 | Brewer et al. |
| 7,081,905 B1 | 7/2006 | Raghunath |
| 7,458,014 B1 | 11/2008 | Rubin et al. |
| 7,463,304 B2 | 12/2008 | Murray |
| 7,537,162 B1 | 5/2009 | Siu |
| 7,545,367 B2 | 6/2009 | Sunda et al. |
| 7,571,014 B1 | 8/2009 | Lambourne et al. |
| 7,596,761 B2 | 9/2009 | Lemay et al. |
| 7,600,192 B1 | 10/2009 | Hashimoto et al. |
| 7,653,883 B2 | 1/2010 | Hotelling et al. |
| 7,656,393 B2 | 2/2010 | King et al. |
| 7,710,393 B2 | 5/2010 | Tsuk et al. |
| 7,716,603 B2 | 5/2010 | Boyden |
| 7,738,911 B2 | 6/2010 | Kim |
| 7,739,622 B2 | 6/2010 | Deline et al. |
| 7,814,112 B2 | 10/2010 | Gupta et al. |
| 7,843,471 B2 | 11/2010 | Doan et al. |
| 7,905,815 B2 | 3/2011 | Ellis et al. |
| 7,954,056 B2 | 5/2011 | Graham |
| 7,956,847 B2 | 6/2011 | Christie |
| 7,965,276 B1 | 6/2011 | Martin et al. |
| 8,040,331 B2 | 10/2011 | Hill et al. |
| 8,046,705 B2 | 10/2011 | Hunleth et al. |
| 8,189,087 B2 | 5/2012 | Misawa et al. |
| 8,191,011 B2 | 5/2012 | Abanami et al. |
| 8,194,036 B1 | 6/2012 | Geiss et al. |
| 8,196,043 B2 | 6/2012 | Crow et al. |
| 8,196,061 B1 | 6/2012 | Bhojan |
| 8,250,071 B1 | 8/2012 | Killalea et al. |
| 8,266,550 B1 | 9/2012 | Cleron et al. |
| 8,290,603 B1 | 10/2012 | Lambourne |
| 8,290,777 B1 | 10/2012 | Nguyen et al. |
| 8,427,432 B2 | 4/2013 | Kim et al. |
| 8,443,280 B2 | 5/2013 | Noyes |
| 8,487,882 B2 | 7/2013 | Inaba et al. |
| 8,499,236 B1 | 7/2013 | Keljo |
| 8,504,937 B2 | 8/2013 | Jobs et al. |
| 8,519,987 B2 | 8/2013 | Bonne |
| 8,533,623 B2 | 9/2013 | St. Jacques |
| 8,549,429 B2 | 10/2013 | Tsuruta et al. |
| 8,566,700 B2 | 10/2013 | Ueda |
| 8,624,836 B1 | 1/2014 | Miller et al. |
| 8,656,040 B1 | 2/2014 | Bajaj et al. |
| 8,669,945 B2 | 3/2014 | Coddington |
| 8,675,084 B2 | 3/2014 | Bolton et al. |
| 8,742,890 B2 | 6/2014 | Gocho et al. |
| 8,762,844 B2 | 6/2014 | Kim et al. |
| 8,762,895 B2 | 6/2014 | Mehta et al. |
| 8,782,513 B2 | 7/2014 | Migos et al. |
| 8,860,674 B2 | 10/2014 | Lee et al. |
| 8,894,462 B2 | 11/2014 | Huang et al. |
| 8,924,894 B1 | 12/2014 | Yaksick et al. |
| 8,952,886 B2 | 2/2015 | Tsuk et al. |
| 8,983,539 B1 | 3/2015 | Kim et al. |
| 9,071,945 B1 | 6/2015 | Rubin et al. |
| 9,112,849 B1 | 8/2015 | Werkelin Ahlin et al. |
| 9,146,124 B2 | 9/2015 | Parada et al. |
| 9,171,268 B1 | 10/2015 | Penilla et al. |
| 9,172,866 B2 | 10/2015 | Ito et al. |
| 9,176,652 B1 | 11/2015 | Patel et al. |
| 9,182,876 B2 | 11/2015 | Kim et al. |
| 9,189,089 B2 | 11/2015 | Sutton et al. |
| 9,223,296 B2 | 12/2015 | Yang et al. |
| 9,229,624 B2 | 1/2016 | Wei et al. |
| 9,268,400 B2 | 2/2016 | Gomez Sainz-Garcia |
| 9,329,831 B1 | 5/2016 | Fullerton et al. |
| 9,369,537 B1 | 6/2016 | Mathew et al. |
| D765,118 S | 8/2016 | Bachman et al. |
| 9,405,766 B2 | 8/2016 | Robbin et al. |
| 9,423,868 B2 | 8/2016 | Iwasaki |
| 9,442,516 B2 | 9/2016 | Migos et al. |
| 9,448,691 B2 | 9/2016 | Suda |
| 9,451,144 B2 | 9/2016 | Dye |
| 9,462,340 B1 | 10/2016 | Mathurin |
| 9,495,575 B2 | 11/2016 | Kim et al. |
| D773,510 S | 12/2016 | Foss et al. |
| 9,544,563 B1 | 1/2017 | Cheng et al. |
| 9,547,419 B2 | 1/2017 | Yang et al. |
| 9,552,015 B2 | 1/2017 | Capela et al. |
| 9,560,629 B2 | 1/2017 | Migicovsky et al. |
| D778,912 S | 2/2017 | Akana et al. |
| 9,574,896 B2 | 2/2017 | Mcgavran et al. |
| 9,579,480 B2 | 2/2017 | Potharaju et al. |
| 9,582,187 B2 | 2/2017 | Gil et al. |
| 9,594,354 B1 | 3/2017 | Kahn et al. |
| 9,620,312 B2 | 4/2017 | Ely et al. |
| 9,628,950 B1 | 4/2017 | Noeth et al. |
| 9,652,741 B2 | 5/2017 | Goldberg et al. |
| D789,381 S | 6/2017 | Okumura et al. |
| 9,704,386 B2 | 7/2017 | Yoon et al. |
| 9,753,543 B2 | 9/2017 | Jeon et al. |
| 9,798,388 B1 | 10/2017 | Murali |
| 9,814,426 B2 | 11/2017 | Connor |
| 9,820,323 B1 | 11/2017 | Young et al. |
| 9,832,697 B2 | 11/2017 | Kotecha et al. |
| 9,870,114 B1 | 1/2018 | Jones et al. |
| 9,892,715 B2 | 2/2018 | Komulainen et al. |
| D813,239 S | 3/2018 | Akana et al. |
| 9,921,711 B2 | 3/2018 | Oh et al. |
| 9,927,957 B1 | 3/2018 | Sagar et al. |
| 9,942,463 B2 | 4/2018 | Kuo et al. |
| 9,965,144 B2 | 5/2018 | Nakamura et al. |
| 9,973,674 B2 | 5/2018 | Dye et al. |
| 10,019,097 B2 | 7/2018 | Ely et al. |
| 10,019,599 B1 | 7/2018 | Moran et al. |
| 10,025,458 B2 | 7/2018 | Chaudhri et al. |
| 10,048,802 B2 | 8/2018 | Shedletsky et al. |
| 10,057,470 B2 | 8/2018 | Kim et al. |
| 10,133,439 B1 | 11/2018 | Brichter et al. |
| 10,135,905 B2 | 11/2018 | Chaudhri et al. |
| 10,175,652 B2 | 1/2019 | Ely et al. |
| 10,182,138 B2 | 1/2019 | Motika et al. |
| 10,216,147 B2 | 2/2019 | Ely et al. |
| 10,216,392 B2 | 2/2019 | Zhao |
| 10,222,909 B2 | 3/2019 | Shedletsky et al. |
| 10,275,117 B2 | 4/2019 | Zambetti et al. |
| D849,749 S | 5/2019 | Akana et al. |

(56) References Cited

U.S. PATENT DOCUMENTS

| | | |
|---|---|---|
| 10,296,125 B2 | 5/2019 | Ely et al. |
| 10,299,300 B1 | 5/2019 | Young |
| 10,310,697 B2 | 6/2019 | Roberts et al. |
| 10,324,590 B2 | 6/2019 | Yang et al. |
| 10,324,620 B2 | 6/2019 | Balaram |
| 10,331,081 B2 | 6/2019 | Ely et al. |
| 10,331,082 B2 | 6/2019 | Ely et al. |
| 10,356,070 B2 | 7/2019 | Cha et al. |
| 10,429,959 B2 | 10/2019 | Battlogg |
| 10,466,881 B2 | 11/2019 | Sasaki et al. |
| 10,524,300 B2 | 12/2019 | Ueda et al. |
| 10,627,914 B2 | 4/2020 | Ang et al. |
| 10,643,246 B1 | 5/2020 | Suprasadachandran Pillai |
| 10,664,074 B2 | 5/2020 | Moussette et al. |
| 10,664,120 B1 | 5/2020 | Jones et al. |
| 10,671,174 B2 | 6/2020 | Ang et al. |
| 10,684,693 B2 | 6/2020 | Kletsov et al. |
| 10,691,332 B2 | 6/2020 | Offenberg et al. |
| 10,721,711 B2 | 7/2020 | Kirov et al. |
| 10,802,598 B2 | 10/2020 | Ang et al. |
| 10,852,700 B2 | 12/2020 | Abramov |
| 10,966,149 B2 | 3/2021 | Yoon et al. |
| 11,048,334 B2 | 6/2021 | Rothberg et al. |
| 11,050,873 B2 | 6/2021 | Kim et al. |
| 11,068,128 B2 | 7/2021 | Zambetti et al. |
| 11,099,647 B2 | 8/2021 | Ang et al. |
| 11,543,887 B2 | 1/2023 | Ang et al. |
| 11,868,531 B1 | 1/2024 | Tasci |
| 2001/0030597 A1 | 10/2001 | Inoue et al. |
| 2001/0031622 A1 | 10/2001 | Kivela et al. |
| 2002/0010707 A1 | 1/2002 | Chang et al. |
| 2002/0068600 A1 | 6/2002 | Chihara et al. |
| 2002/0075334 A1 | 6/2002 | Yfantis |
| 2002/0083101 A1 | 6/2002 | Card et al. |
| 2002/0101457 A1 | 8/2002 | Lang |
| 2002/0113802 A1 | 8/2002 | Card et al. |
| 2002/0118230 A1 | 8/2002 | Card et al. |
| 2002/0120651 A1 | 8/2002 | Pustejovsky et al. |
| 2002/0122072 A1 | 9/2002 | Selker |
| 2002/0140803 A1 | 10/2002 | Gutta et al. |
| 2002/0142734 A1 | 10/2002 | Wickstead |
| 2002/0171737 A1 | 11/2002 | Tullis et al. |
| 2003/0020671 A1 | 1/2003 | Santoro et al. |
| 2003/0025802 A1 | 2/2003 | Mayer, Jr. et al. |
| 2003/0030673 A1 | 2/2003 | Ho |
| 2003/0076301 A1 | 4/2003 | Tsuk et al. |
| 2003/0076352 A1 | 4/2003 | Uhlig et al. |
| 2003/0098891 A1 | 5/2003 | Molander et al. |
| 2003/0103044 A1 | 6/2003 | Sunda et al. |
| 2003/0128237 A1 | 7/2003 | Sakai |
| 2003/0142288 A1 | 7/2003 | Kinrot et al. |
| 2003/0151982 A1 | 8/2003 | Brewer et al. |
| 2003/0158927 A1* | 8/2003 | Sagey ............... H04L 41/22 709/223 |
| 2003/0171984 A1 | 9/2003 | Wodka et al. |
| 2003/0184598 A1 | 10/2003 | Graham |
| 2004/0017404 A1 | 1/2004 | Schileru-Key |
| 2004/0044953 A1 | 3/2004 | Watkins et al. |
| 2004/0061678 A1 | 4/2004 | Goh et al. |
| 2004/0073935 A1 | 4/2004 | Kang |
| 2004/0080531 A1 | 4/2004 | Berstis |
| 2004/0100389 A1 | 5/2004 | Naito et al. |
| 2004/0125081 A1 | 7/2004 | Hayakawa |
| 2004/0130581 A1 | 7/2004 | Howard et al. |
| 2004/0141016 A1 | 7/2004 | Fukatsu et al. |
| 2004/0205514 A1 | 10/2004 | Sommerer et al. |
| 2004/0230599 A1 | 11/2004 | Moore et al. |
| 2004/0239692 A1 | 12/2004 | Balle et al. |
| 2004/0252119 A1 | 12/2004 | Hunleth et al. |
| 2004/0264301 A1 | 12/2004 | Howard et al. |
| 2004/0264916 A1 | 12/2004 | Van et al. |
| 2005/0116941 A1 | 6/2005 | Wallington et al. |
| 2005/0117601 A1 | 6/2005 | Anderson et al. |
| 2005/0119031 A1 | 6/2005 | Spalink et al. |
| 2005/0132281 A1 | 6/2005 | Pan et al. |
| 2005/0134695 A1 | 6/2005 | Deshpande et al. |
| 2005/0198319 A1 | 9/2005 | Chan et al. |
| 2005/0209051 A1 | 9/2005 | Santomassimo et al. |
| 2005/0223068 A1 | 10/2005 | Shohfi et al. |
| 2005/0237194 A1 | 10/2005 | Voba et al. |
| 2005/0246642 A1 | 11/2005 | Valderas et al. |
| 2005/0278757 A1 | 12/2005 | Grossman et al. |
| 2006/0028446 A1 | 2/2006 | Liberty et al. |
| 2006/0036962 A1 | 2/2006 | Jobs et al. |
| 2006/0064716 A1 | 3/2006 | Sull et al. |
| 2006/0071918 A1 | 4/2006 | Mori et al. |
| 2006/0079973 A1 | 4/2006 | Bacharach et al. |
| 2006/0101122 A1 | 5/2006 | Ishii |
| 2006/0135064 A1 | 6/2006 | Cho et al. |
| 2006/0143574 A1 | 6/2006 | Ito et al. |
| 2006/0150215 A1 | 7/2006 | Wroblewski et al. |
| 2006/0217104 A1 | 9/2006 | Cho |
| 2006/0230346 A1 | 10/2006 | Bhogal et al. |
| 2006/0277486 A1 | 12/2006 | Skinner |
| 2007/0021153 A1 | 1/2007 | Novak |
| 2007/0025711 A1 | 2/2007 | Marcus et al. |
| 2007/0031119 A1 | 2/2007 | Iwanaga |
| 2007/0035513 A1 | 2/2007 | Sherrard et al. |
| 2007/0036346 A1 | 2/2007 | Kwon |
| 2007/0040810 A1 | 2/2007 | Dowe et al. |
| 2007/0075614 A1 | 4/2007 | Calmeise |
| 2007/0083828 A1 | 4/2007 | Toriyama et al. |
| 2007/0096283 A1 | 5/2007 | Ljung et al. |
| 2007/0106949 A1 | 5/2007 | Narita et al. |
| 2007/0109417 A1 | 5/2007 | Hyttfors et al. |
| 2007/0132733 A1 | 6/2007 | Ram |
| 2007/0143495 A1 | 6/2007 | Porat |
| 2007/0157089 A1 | 7/2007 | Van Os et al. |
| 2007/0165103 A1 | 7/2007 | Arima et al. |
| 2007/0174761 A1 | 7/2007 | Lin et al. |
| 2007/0177804 A1 | 8/2007 | Elias et al. |
| 2007/0180379 A1 | 8/2007 | Osato et al. |
| 2007/0180392 A1 | 8/2007 | Russo |
| 2007/0182999 A1 | 8/2007 | Anthony et al. |
| 2007/0191008 A1 | 8/2007 | Bucher et al. |
| 2007/0211042 A1 | 9/2007 | Kim et al. |
| 2007/0229458 A1 | 10/2007 | Moon |
| 2007/0233736 A1 | 10/2007 | Xiong et al. |
| 2007/0236475 A1 | 10/2007 | Wherry |
| 2007/0236479 A1 | 10/2007 | Wang et al. |
| 2007/0237493 A1 | 10/2007 | Hall et al. |
| 2007/0239831 A1 | 10/2007 | Basu |
| 2007/0254640 A1 | 11/2007 | Bliss |
| 2007/0259654 A1 | 11/2007 | Oijer |
| 2007/0265929 A1 | 11/2007 | Danninger |
| 2007/0277121 A1 | 11/2007 | Beckman |
| 2008/0004113 A1 | 1/2008 | Avery et al. |
| 2008/0052643 A1 | 2/2008 | Ike et al. |
| 2008/0052945 A1 | 3/2008 | Matas et al. |
| 2008/0062127 A1 | 3/2008 | Brodersen et al. |
| 2008/0066135 A1 | 3/2008 | Brodersen et al. |
| 2008/0077673 A1 | 3/2008 | Thomas et al. |
| 2008/0094368 A1 | 4/2008 | Ording et al. |
| 2008/0120029 A1 | 5/2008 | Zelek et al. |
| 2008/0122796 A1 | 5/2008 | Jobs et al. |
| 2008/0134033 A1 | 6/2008 | Burns et al. |
| 2008/0136790 A1 | 6/2008 | Hio |
| 2008/0141182 A1 | 6/2008 | Barsness et al. |
| 2008/0163119 A1 | 7/2008 | Kim et al. |
| 2008/0165136 A1 | 7/2008 | Christie et al. |
| 2008/0168073 A1 | 7/2008 | Siegel et al. |
| 2008/0168404 A1 | 7/2008 | Ording |
| 2008/0172634 A1 | 7/2008 | Choi et al. |
| 2008/0186808 A1 | 8/2008 | Lee |
| 2008/0201649 A1 | 8/2008 | Mattila et al. |
| 2008/0207281 A1 | 8/2008 | Tsuchiya et al. |
| 2008/0214191 A1 | 9/2008 | Yach et al. |
| 2008/0219151 A1 | 9/2008 | Ma et al. |
| 2008/0259829 A1 | 10/2008 | Rosenblatt |
| 2008/0266407 A1 | 10/2008 | Battles et al. |
| 2008/0279475 A1 | 11/2008 | Lee et al. |
| 2008/0284855 A1 | 11/2008 | Umeyama et al. |
| 2008/0319944 A1 | 12/2008 | Venolia et al. |
| 2009/0002335 A1 | 1/2009 | Chaudhri |

(56) References Cited

U.S. PATENT DOCUMENTS

| | | |
|---|---|---|
| 2009/0007019 A1 | 1/2009 | Kobayashi et al. |
| 2009/0058821 A1 | 3/2009 | Chaudhri et al. |
| 2009/0060170 A1 | 3/2009 | Coughlan et al. |
| 2009/0068984 A1 | 3/2009 | Burnett |
| 2009/0088207 A1 | 4/2009 | Sweeney et al. |
| 2009/0089712 A1 | 4/2009 | Sato |
| 2009/0098912 A1 | 4/2009 | Kim et al. |
| 2009/0102933 A1 | 4/2009 | Harris et al. |
| 2009/0103780 A1 | 4/2009 | Nishihara et al. |
| 2009/0113347 A1 | 4/2009 | Hess et al. |
| 2009/0138827 A1 | 5/2009 | Van Os et al. |
| 2009/0143114 A1 | 6/2009 | Vargas et al. |
| 2009/0144391 A1 | 6/2009 | Jung et al. |
| 2009/0178008 A1 | 7/2009 | Herz et al. |
| 2009/0183100 A1 | 7/2009 | Eom et al. |
| 2009/0187825 A1 | 7/2009 | Sandquist et al. |
| 2009/0193359 A1 | 7/2009 | Anthony et al. |
| 2009/0195402 A1 | 8/2009 | Izadi et al. |
| 2009/0195497 A1 | 8/2009 | Fitzgerald et al. |
| 2009/0199130 A1 | 8/2009 | Tsern et al. |
| 2009/0203315 A1 | 8/2009 | Kawabata et al. |
| 2009/0204920 A1 | 8/2009 | Beverley et al. |
| 2009/0207743 A1 | 8/2009 | Huq et al. |
| 2009/0222748 A1 | 9/2009 | Lejeune et al. |
| 2009/0225060 A1 | 9/2009 | Rizoiu et al. |
| 2009/0228126 A1 | 9/2009 | Spielberg et al. |
| 2009/0228868 A1 | 9/2009 | Forstall et al. |
| 2009/0231960 A1 | 9/2009 | Hutcheson |
| 2009/0235155 A1 | 9/2009 | Ueda |
| 2009/0235162 A1 | 9/2009 | Nuccio et al. |
| 2009/0239587 A1 | 9/2009 | Negron et al. |
| 2009/0241054 A1 | 9/2009 | Hendricks |
| 2009/0241150 A1 | 9/2009 | White et al. |
| 2009/0254867 A1 | 10/2009 | Farouki et al. |
| 2009/0259939 A1 | 10/2009 | Lockett et al. |
| 2009/0271381 A1 | 10/2009 | Beezer et al. |
| 2009/0284476 A1 | 11/2009 | Bull et al. |
| 2009/0293014 A1 | 11/2009 | Meuninck et al. |
| 2009/0311993 A1 | 12/2009 | Horodezky |
| 2009/0315671 A1 | 12/2009 | Gocho et al. |
| 2009/0315841 A1 | 12/2009 | Cheng et al. |
| 2009/0315848 A1 | 12/2009 | Ku et al. |
| 2009/0315867 A1 | 12/2009 | Sakamoto et al. |
| 2009/0319888 A1 | 12/2009 | Oygard |
| 2009/0319928 A1 | 12/2009 | Alphin et al. |
| 2009/0325630 A1 | 12/2009 | Tiitola et al. |
| 2009/0327955 A1 | 12/2009 | Mouilleseaux et al. |
| 2010/0023878 A1 | 1/2010 | Douris et al. |
| 2010/0023883 A1 | 1/2010 | Khazaka et al. |
| 2010/0026640 A1 | 2/2010 | Kim et al. |
| 2010/0029327 A1 | 2/2010 | Jee |
| 2010/0044121 A1 | 2/2010 | Simon et al. |
| 2010/0045616 A1 | 2/2010 | Li et al. |
| 2010/0054497 A1 | 3/2010 | Bull et al. |
| 2010/0066763 A1 | 3/2010 | Macdougall et al. |
| 2010/0070926 A1 | 3/2010 | Abanami et al. |
| 2010/0070931 A1 | 3/2010 | Nichols |
| 2010/0088634 A1 | 4/2010 | Tsuruta et al. |
| 2010/0100849 A1 | 4/2010 | Fram |
| 2010/0107078 A1 | 4/2010 | Hayashi |
| 2010/0110044 A1 | 5/2010 | Englund |
| 2010/0125785 A1 | 5/2010 | Moore et al. |
| 2010/0125807 A1 | 5/2010 | Easterday et al. |
| 2010/0138764 A1 | 6/2010 | Hatambeiki et al. |
| 2010/0146387 A1 | 6/2010 | Hoover |
| 2010/0149090 A1 | 6/2010 | Morris et al. |
| 2010/0162160 A1 | 6/2010 | Stallings et al. |
| 2010/0164908 A1 | 7/2010 | Hill et al. |
| 2010/0169790 A1 | 7/2010 | Vaughan et al. |
| 2010/0174606 A1 | 7/2010 | Hoyle |
| 2010/0175018 A1 | 7/2010 | Petschnigg et al. |
| 2010/0178873 A1 | 7/2010 | Lee et al. |
| 2010/0199232 A1 | 8/2010 | Mistry et al. |
| 2010/0211908 A1 | 8/2010 | Luk et al. |
| 2010/0211919 A1 | 8/2010 | Brown et al. |
| 2010/0214243 A1 | 8/2010 | Birnbaum et al. |
| 2010/0228836 A1 | 9/2010 | Lehtovirta et al. |
| 2010/0235742 A1 | 9/2010 | Hsu et al. |
| 2010/0241699 A1 | 9/2010 | Muthukumarasamy et al. |
| 2010/0241967 A1 | 9/2010 | Lee et al. |
| 2010/0242066 A1 | 9/2010 | Tseng et al. |
| 2010/0267424 A1 | 10/2010 | Kim et al. |
| 2010/0283743 A1 | 11/2010 | Coddington |
| 2010/0284389 A1 | 11/2010 | Ramsay et al. |
| 2010/0287513 A1 | 11/2010 | Singh et al. |
| 2010/0289217 A1 | 11/2010 | Lavie et al. |
| 2010/0289740 A1 | 11/2010 | Kim et al. |
| 2010/0289910 A1 | 11/2010 | Kamshilin et al. |
| 2010/0321201 A1 | 12/2010 | Huang et al. |
| 2010/0333045 A1 | 12/2010 | Guéziec et al. |
| 2011/0007029 A1 | 1/2011 | Ben-David |
| 2011/0012772 A1 | 1/2011 | Chuang et al. |
| 2011/0014956 A1 | 1/2011 | Lee et al. |
| 2011/0016425 A1 | 1/2011 | Homburg et al. |
| 2011/0025624 A1 | 2/2011 | Goto |
| 2011/0029750 A1 | 2/2011 | Jang et al. |
| 2011/0037712 A1* | 2/2011 | Kim ..................... G06F 3/0488 345/173 |
| 2011/0041056 A1 | 2/2011 | Griffin et al. |
| 2011/0047491 A1 | 2/2011 | Hwang et al. |
| 2011/0055760 A1 | 3/2011 | Drayton et al. |
| 2011/0058052 A1 | 3/2011 | Bolton et al. |
| 2011/0059769 A1 | 3/2011 | Brunolli |
| 2011/0074719 A1 | 3/2011 | Yeh et al. |
| 2011/0074824 A1 | 3/2011 | Srinivasan et al. |
| 2011/0081860 A1 | 4/2011 | Brown et al. |
| 2011/0087955 A1 | 4/2011 | Ho et al. |
| 2011/0091182 A1 | 4/2011 | Look et al. |
| 2011/0106921 A1 | 5/2011 | Brown et al. |
| 2011/0107241 A1 | 5/2011 | Moore |
| 2011/0111735 A1 | 5/2011 | Pietrow |
| 2011/0115932 A1 | 5/2011 | Shin et al. |
| 2011/0126155 A1 | 5/2011 | Krishnaraj et al. |
| 2011/0130168 A1 | 6/2011 | Vendrow et al. |
| 2011/0138284 A1 | 6/2011 | Wigdor et al. |
| 2011/0141031 A1 | 6/2011 | Mccullough et al. |
| 2011/0145691 A1 | 6/2011 | Noyes |
| 2011/0145692 A1 | 6/2011 | Noyes et al. |
| 2011/0153628 A1 | 6/2011 | Basu et al. |
| 2011/0157046 A1 | 6/2011 | Lee et al. |
| 2011/0157055 A1 | 6/2011 | Tilley et al. |
| 2011/0159469 A1 | 6/2011 | Hwang et al. |
| 2011/0159927 A1 | 6/2011 | Choi |
| 2011/0164042 A1 | 7/2011 | Chaudhri |
| 2011/0181520 A1 | 7/2011 | Boda et al. |
| 2011/0183613 A1* | 7/2011 | Nocera ............ H04M 1/72412 455/41.2 |
| 2011/0191710 A1 | 8/2011 | Jang et al. |
| 2011/0202834 A1 | 8/2011 | Mandryk et al. |
| 2011/0202859 A1 | 8/2011 | Fong |
| 2011/0202866 A1 | 8/2011 | Huang et al. |
| 2011/0209099 A1 | 8/2011 | Hinckley et al. |
| 2011/0209104 A1 | 8/2011 | Hinckley et al. |
| 2011/0225492 A1 | 9/2011 | Boettcher et al. |
| 2011/0227810 A1 | 9/2011 | Mckinney et al. |
| 2011/0237221 A1 | 9/2011 | Prakash et al. |
| 2011/0248916 A1 | 10/2011 | Griffin et al. |
| 2011/0252062 A1 | 10/2011 | Hanatani et al. |
| 2011/0252318 A1 | 10/2011 | Helms |
| 2011/0252372 A1 | 10/2011 | Chaudhri |
| 2011/0252373 A1 | 10/2011 | Chaudhri |
| 2011/0252375 A1 | 10/2011 | Chaudhri |
| 2011/0261030 A1 | 10/2011 | Bullock |
| 2011/0295879 A1 | 12/2011 | Logis et al. |
| 2011/0296344 A1 | 12/2011 | Habib et al. |
| 2011/0302513 A1 | 12/2011 | Ademar et al. |
| 2011/0307842 A1 | 12/2011 | Chiang et al. |
| 2011/0316884 A1 | 12/2011 | Giambalvo et al. |
| 2011/0316888 A1 | 12/2011 | Sachs et al. |
| 2012/0005622 A1 | 1/2012 | Park et al. |
| 2012/0014223 A1 | 1/2012 | Campbell |
| 2012/0019400 A1 | 1/2012 | Patel et al. |
| 2012/0023438 A1 | 1/2012 | Xia et al. |
| 2012/0023462 A1 | 1/2012 | Rosing et al. |

(56) References Cited

U.S. PATENT DOCUMENTS

| | | |
|---|---|---|
| 2012/0030569 A1 | 2/2012 | Migos et al. |
| 2012/0030627 A1 | 2/2012 | Nurmi et al. |
| 2012/0032988 A1 | 2/2012 | Katayama et al. |
| 2012/0044062 A1 | 2/2012 | Jersa et al. |
| 2012/0051560 A1 | 3/2012 | Sanders |
| 2012/0062398 A1 | 3/2012 | Durand |
| 2012/0069206 A1 | 3/2012 | Hsieh |
| 2012/0071146 A1 | 3/2012 | Shrivastava et al. |
| 2012/0084644 A1 | 4/2012 | Robert et al. |
| 2012/0089300 A1 | 4/2012 | Wolterman et al. |
| 2012/0092383 A1 | 4/2012 | Hysek et al. |
| 2012/0096344 A1 | 4/2012 | Ho et al. |
| 2012/0102387 A1 | 4/2012 | Badoiu et al. |
| 2012/0115608 A1 | 5/2012 | Pfeifer et al. |
| 2012/0120277 A1 | 5/2012 | Tsai et al. |
| 2012/0121185 A1 | 5/2012 | Zavesky |
| 2012/0131470 A1 | 5/2012 | Wessling et al. |
| 2012/0133677 A1 | 5/2012 | Suzuki et al. |
| 2012/0146899 A1 | 6/2012 | Teng |
| 2012/0147052 A1 | 6/2012 | Homma et al. |
| 2012/0155223 A1 | 6/2012 | Hoover |
| 2012/0159373 A1 | 6/2012 | Archer et al. |
| 2012/0159380 A1 | 6/2012 | Kocienda et al. |
| 2012/0162261 A1 | 6/2012 | Kim et al. |
| 2012/0166950 A1 | 6/2012 | Frumar et al. |
| 2012/0179970 A1 | 7/2012 | Hayes |
| 2012/0179998 A1 | 7/2012 | Nesladek et al. |
| 2012/0192068 A1 | 7/2012 | Migos et al. |
| 2012/0192094 A1 | 7/2012 | Goertz et al. |
| 2012/0192102 A1 | 7/2012 | Migos et al. |
| 2012/0192110 A1 | 7/2012 | Wu et al. |
| 2012/0192118 A1 | 7/2012 | Migos et al. |
| 2012/0197419 A1 | 8/2012 | Dhruv et al. |
| 2012/0198531 A1 | 8/2012 | Ort et al. |
| 2012/0236037 A1 | 9/2012 | Lessing et al. |
| 2012/0240085 A1 | 9/2012 | Sim et al. |
| 2012/0266093 A1* | 10/2012 | Park .................. H04N 21/4122 715/811 |
| 2012/0274508 A1 | 11/2012 | Brown et al. |
| 2012/0274550 A1 | 11/2012 | Campbell et al. |
| 2012/0278745 A1 | 11/2012 | Kim et al. |
| 2012/0280908 A1 | 11/2012 | Rhoads et al. |
| 2012/0284012 A1 | 11/2012 | Rodriguez et al. |
| 2012/0284674 A1 | 11/2012 | Geng et al. |
| 2012/0287290 A1 | 11/2012 | Jain et al. |
| 2012/0297342 A1 | 11/2012 | Jang et al. |
| 2012/0304084 A1 | 11/2012 | Kim et al. |
| 2012/0316777 A1 | 12/2012 | Kitta et al. |
| 2012/0320141 A1 | 12/2012 | Bowen et al. |
| 2012/0324384 A1 | 12/2012 | Cohen et al. |
| 2012/0324390 A1 | 12/2012 | Tao et al. |
| 2012/0327006 A1 | 12/2012 | Israr et al. |
| 2013/0016048 A1 | 1/2013 | So et al. |
| 2013/0016818 A1 | 1/2013 | Cohn |
| 2013/0017846 A1 | 1/2013 | Schoppe |
| 2013/0019182 A1 | 1/2013 | Gil et al. |
| 2013/0024811 A1 | 1/2013 | Gleadall et al. |
| 2013/0027341 A1 | 1/2013 | Mastandrea |
| 2013/0038636 A1 | 2/2013 | Fujiwaka |
| 2013/0038771 A1 | 2/2013 | Brunner et al. |
| 2013/0050109 A1 | 2/2013 | Ban |
| 2013/0055160 A1 | 2/2013 | Yamada et al. |
| 2013/0057472 A1 | 3/2013 | Dizac et al. |
| 2013/0061175 A1 | 3/2013 | Matas et al. |
| 2013/0065482 A1 | 3/2013 | Trickett et al. |
| 2013/0069990 A1 | 3/2013 | Geise et al. |
| 2013/0073932 A1 | 3/2013 | Migos et al. |
| 2013/0076591 A1 | 3/2013 | Sirpal et al. |
| 2013/0076774 A1 | 3/2013 | Yu et al. |
| 2013/0085931 A1 | 4/2013 | Runyan |
| 2013/0093904 A1 | 4/2013 | Wagner et al. |
| 2013/0097566 A1 | 4/2013 | Berglund |
| 2013/0106603 A1 | 5/2013 | Weast et al. |
| 2013/0111342 A1 | 5/2013 | Alameh et al. |
| 2013/0111384 A1 | 5/2013 | Kim et al. |
| 2013/0111550 A1 | 5/2013 | Naveh et al. |
| 2013/0117689 A1 | 5/2013 | Lessing et al. |
| 2013/0117693 A1 | 5/2013 | Anderson et al. |
| 2013/0117698 A1 | 5/2013 | Park et al. |
| 2013/0125016 A1 | 5/2013 | Pallakoff et al. |
| 2013/0127850 A1 | 5/2013 | Bindon |
| 2013/0134212 A1 | 5/2013 | Chang et al. |
| 2013/0135228 A1 | 5/2013 | Won et al. |
| 2013/0135234 A1 | 5/2013 | Hisano et al. |
| 2013/0135236 A1 | 5/2013 | Yano |
| 2013/0138272 A1 | 5/2013 | Louise-Babando et al. |
| 2013/0139102 A1 | 5/2013 | Miura et al. |
| 2013/0141325 A1 | 6/2013 | Bailey et al. |
| 2013/0141331 A1 | 6/2013 | Shiu et al. |
| 2013/0141362 A1 | 6/2013 | Asanuma et al. |
| 2013/0142016 A1 | 6/2013 | Pozzo Di Borgo et al. |
| 2013/0143512 A1 | 6/2013 | Hernandez et al. |
| 2013/0145316 A1 | 6/2013 | Heo |
| 2013/0147747 A1 | 6/2013 | Takagi |
| 2013/0152017 A1 | 6/2013 | Song et al. |
| 2013/0154933 A1 | 6/2013 | Sheik-Nainar |
| 2013/0162411 A1 | 6/2013 | Moses et al. |
| 2013/0166679 A1 | 6/2013 | Kuwahara et al. |
| 2013/0168444 A1 | 7/2013 | Hsieh et al. |
| 2013/0185648 A1 | 7/2013 | Kim |
| 2013/0201098 A1 | 8/2013 | Schilit et al. |
| 2013/0205244 A1 | 8/2013 | Decker et al. |
| 2013/0208013 A1 | 8/2013 | Yuu et al. |
| 2013/0219285 A1 | 8/2013 | Iwasaki et al. |
| 2013/0219303 A1 | 8/2013 | Eriksson et al. |
| 2013/0222270 A1 | 8/2013 | Winkler et al. |
| 2013/0223279 A1 | 8/2013 | Tinnakornsrisuphap et al. |
| 2013/0225152 A1 | 8/2013 | Matthews et al. |
| 2013/0226444 A1 | 8/2013 | Johansson et al. |
| 2013/0244633 A1 | 9/2013 | Jacobs et al. |
| 2013/0262564 A1 | 10/2013 | Wall et al. |
| 2013/0275918 A1 | 10/2013 | Antonini et al. |
| 2013/0286251 A1 | 10/2013 | Wood et al. |
| 2013/0305187 A1 | 11/2013 | Phillips et al. |
| 2013/0311954 A1 | 11/2013 | Minkkinen et al. |
| 2013/0314204 A1 | 11/2013 | Ho et al. |
| 2013/0325524 A1 | 12/2013 | Boudville |
| 2013/0329074 A1 | 12/2013 | Zhang et al. |
| 2013/0329924 A1 | 12/2013 | Fleizach et al. |
| 2013/0331130 A1 | 12/2013 | Lee |
| 2013/0332886 A1 | 12/2013 | Cranfill et al. |
| 2013/0339436 A1 | 12/2013 | Gray |
| 2013/0342457 A1 | 12/2013 | Cox et al. |
| 2013/0346882 A1 | 12/2013 | Shiplacoff et al. |
| 2014/0002348 A1 | 1/2014 | Ogawa |
| 2014/0006949 A1 | 1/2014 | Briand et al. |
| 2014/0007021 A1 | 1/2014 | Akiyama et al. |
| 2014/0015546 A1 | 1/2014 | Frederick et al. |
| 2014/0022399 A1 | 1/2014 | Rashid et al. |
| 2014/0028546 A1 | 1/2014 | Jeon et al. |
| 2014/0028554 A1 | 1/2014 | De Los Reyes et al. |
| 2014/0033100 A1 | 1/2014 | Noda et al. |
| 2014/0037107 A1 | 2/2014 | Marino et al. |
| 2014/0040826 A1 | 2/2014 | Wei et al. |
| 2014/0040831 A1 | 2/2014 | Akasaka et al. |
| 2014/0057569 A1 | 2/2014 | Toivanen et al. |
| 2014/0068526 A1 | 3/2014 | Figelman et al. |
| 2014/0068755 A1 | 3/2014 | King et al. |
| 2014/0073252 A1 | 3/2014 | Lee et al. |
| 2014/0075003 A1 | 3/2014 | Tanaka et al. |
| 2014/0075311 A1 | 3/2014 | Boettcher et al. |
| 2014/0075368 A1 | 3/2014 | Kim et al. |
| 2014/0078371 A1 | 3/2014 | Kinoshita |
| 2014/0084857 A1 | 3/2014 | Liu et al. |
| 2014/0095225 A1 | 4/2014 | Williams et al. |
| 2014/0098102 A1 | 4/2014 | Raffle et al. |
| 2014/0104449 A1 | 4/2014 | Masarik et al. |
| 2014/0118563 A1 | 5/2014 | Mehta et al. |
| 2014/0122331 A1 | 5/2014 | Vaish et al. |
| 2014/0123043 A1 | 5/2014 | Schmidt et al. |
| 2014/0141721 A1 | 5/2014 | Kim et al. |
| 2014/0142851 A1 | 5/2014 | Larmo et al. |
| 2014/0143678 A1 | 5/2014 | Mistry et al. |
| 2014/0143737 A1 | 5/2014 | Mistry et al. |

(56) References Cited

U.S. PATENT DOCUMENTS

| | | |
|---|---|---|
| 2014/0149859 A1 | 5/2014 | Van Dyken et al. |
| 2014/0156801 A1 | 6/2014 | Fernandes et al. |
| 2014/0160033 A1 | 6/2014 | Brikman et al. |
| 2014/0160078 A1 | 6/2014 | Seo et al. |
| 2014/0160304 A1 | 6/2014 | Galor et al. |
| 2014/0164544 A1 | 6/2014 | Gagneraud |
| 2014/0164907 A1 | 6/2014 | Jung et al. |
| 2014/0164930 A1 | 6/2014 | Lieb et al. |
| 2014/0165006 A1 | 6/2014 | Chaudhri et al. |
| 2014/0167986 A1 | 6/2014 | Parada et al. |
| 2014/0168056 A1 | 6/2014 | Swaminathan et al. |
| 2014/0173455 A1 | 6/2014 | Shimizu et al. |
| 2014/0173517 A1 | 6/2014 | Chaudhri et al. |
| 2014/0180582 A1 | 6/2014 | Pontarelli et al. |
| 2014/0181654 A1 | 6/2014 | Kumar et al. |
| 2014/0184524 A1 | 7/2014 | Schiefer et al. |
| 2014/0191715 A1 | 7/2014 | Wechlin et al. |
| 2014/0195943 A1 | 7/2014 | Zheng et al. |
| 2014/0204229 A1 | 7/2014 | Leung et al. |
| 2014/0210708 A1 | 7/2014 | Simmons et al. |
| 2014/0215457 A1 | 7/2014 | Gava et al. |
| 2014/0218599 A1 | 8/2014 | Nakamura et al. |
| 2014/0228063 A1 | 8/2014 | Harris et al. |
| 2014/0237389 A1 | 8/2014 | Ryall et al. |
| 2014/0237402 A1 | 8/2014 | Pang et al. |
| 2014/0240216 A1 | 8/2014 | Bukurak et al. |
| 2014/0240577 A1 | 8/2014 | Masugi |
| 2014/0248590 A1 | 9/2014 | Mccormick |
| 2014/0269614 A1 | 9/2014 | Maguire et al. |
| 2014/0273975 A1 | 9/2014 | Barat et al. |
| 2014/0282068 A1 | 9/2014 | Levkovitz et al. |
| 2014/0282214 A1 | 9/2014 | Shirzadi et al. |
| 2014/0289659 A1 | 9/2014 | Harrison et al. |
| 2014/0302834 A1 | 10/2014 | Jones |
| 2014/0310350 A1 | 10/2014 | Borggaard et al. |
| 2014/0310598 A1 | 10/2014 | Sprague et al. |
| 2014/0320387 A1 | 10/2014 | Eriksson et al. |
| 2014/0328147 A1 | 11/2014 | Yang et al. |
| 2014/0331314 A1 | 11/2014 | Fujioka |
| 2014/0333602 A1 | 11/2014 | Yang et al. |
| 2014/0337450 A1 | 11/2014 | Choudhary et al. |
| 2014/0337748 A1 | 11/2014 | Lee |
| 2014/0343843 A1 | 11/2014 | Yanku |
| 2014/0344700 A1 | 11/2014 | Jenkins et al. |
| 2014/0344951 A1 | 11/2014 | Brewer |
| 2014/0358707 A1 | 12/2014 | Perkins et al. |
| 2014/0359124 A1 | 12/2014 | Adimatyam et al. |
| 2014/0359481 A1 | 12/2014 | Graham et al. |
| 2014/0359602 A1 | 12/2014 | Sawaya et al. |
| 2014/0365113 A1 | 12/2014 | Yue et al. |
| 2014/0368719 A1 | 12/2014 | Kaneko et al. |
| 2014/0370807 A1 | 12/2014 | Pierce et al. |
| 2014/0380187 A1 | 12/2014 | Gardenfors et al. |
| 2015/0011199 A1 | 1/2015 | Lee et al. |
| 2015/0017956 A1 | 1/2015 | Jeong |
| 2015/0019981 A1 | 1/2015 | Petitt et al. |
| 2015/0019982 A1 | 1/2015 | Petitt et al. |
| 2015/0022438 A1 | 1/2015 | Hong |
| 2015/0022674 A1 | 1/2015 | Koss et al. |
| 2015/0026615 A1* | 1/2015 | Choi .............. G06F 3/0484 715/765 |
| 2015/0026647 A1 | 1/2015 | Park et al. |
| 2015/0033136 A1 | 1/2015 | Sasaki et al. |
| 2015/0035762 A1 | 2/2015 | Lu |
| 2015/0036853 A1 | 2/2015 | Solum et al. |
| 2015/0046871 A1 | 2/2015 | Lewis |
| 2015/0049033 A1 | 2/2015 | Kim et al. |
| 2015/0049233 A1 | 2/2015 | Choi |
| 2015/0061842 A1 | 3/2015 | Yoon et al. |
| 2015/0061972 A1 | 3/2015 | Kang et al. |
| 2015/0065035 A1 | 3/2015 | Son et al. |
| 2015/0065821 A1 | 3/2015 | Conrad |
| 2015/0067555 A1 | 3/2015 | Joo et al. |
| 2015/0067580 A1 | 3/2015 | Um et al. |
| 2015/0085621 A1 | 3/2015 | Hong et al. |
| 2015/0094031 A1 | 4/2015 | Liu |
| 2015/0094050 A1 | 4/2015 | Bowles et al. |
| 2015/0094093 A1 | 4/2015 | Pierce et al. |
| 2015/0100621 A1 | 4/2015 | Pan |
| 2015/0106221 A1 | 4/2015 | Tapley et al. |
| 2015/0121224 A1 | 4/2015 | Krasnahill, Jr. |
| 2015/0121231 A1 | 4/2015 | Edwardson et al. |
| 2015/0128049 A1 | 5/2015 | Block et al. |
| 2015/0131121 A1 | 5/2015 | Kang |
| 2015/0163788 A1 | 6/2015 | Karunakaran |
| 2015/0172438 A1 | 6/2015 | Yang |
| 2015/0189162 A1 | 7/2015 | Kuo et al. |
| 2015/0193130 A1 | 7/2015 | Cho et al. |
| 2015/0193138 A1 | 7/2015 | Relyea et al. |
| 2015/0194050 A1 | 7/2015 | Lee |
| 2015/0199110 A1 | 7/2015 | Nakazato |
| 2015/0205511 A1 | 7/2015 | Vinna et al. |
| 2015/0234518 A1 | 8/2015 | Teller et al. |
| 2015/0242065 A1 | 8/2015 | Ko et al. |
| 2015/0242989 A1 | 8/2015 | Lee et al. |
| 2015/0243246 A1 | 8/2015 | Mun et al. |
| 2015/0248235 A1 | 9/2015 | Offenberg et al. |
| 2015/0261412 A1 | 9/2015 | Guillama et al. |
| 2015/0261493 A1 | 9/2015 | Lemmon et al. |
| 2015/0264202 A1 | 9/2015 | Pawlowski |
| 2015/0281945 A1 | 10/2015 | Seo et al. |
| 2015/0287403 A1 | 10/2015 | Holzer Zaslansky et al. |
| 2015/0297185 A1 | 10/2015 | Mccormack et al. |
| 2015/0312617 A1 | 10/2015 | Chen et al. |
| 2015/0313496 A1 | 11/2015 | Connor |
| 2015/0339261 A1 | 11/2015 | Jha et al. |
| 2015/0346834 A1 | 12/2015 | Fernandez et al. |
| 2015/0350029 A1 | 12/2015 | Skrobotov |
| 2015/0358043 A1 | 12/2015 | Jeong et al. |
| 2015/0373172 A1 | 12/2015 | Boesen |
| 2015/0378555 A1 | 12/2015 | Ramanathan et al. |
| 2015/0378569 A1 | 12/2015 | Sato et al. |
| 2016/0011758 A1 | 1/2016 | Meggs et al. |
| 2016/0014266 A1 | 1/2016 | Bhatt |
| 2016/0018846 A1 | 1/2016 | Zenoff |
| 2016/0021168 A1 | 1/2016 | Chaudhri et al. |
| 2016/0026425 A1 | 1/2016 | Lee et al. |
| 2016/0028869 A1 | 1/2016 | Bhatt |
| 2016/0034133 A1 | 2/2016 | Wilson et al. |
| 2016/0034153 A1 | 2/2016 | Lejeune et al. |
| 2016/0034167 A1 | 2/2016 | Wilson et al. |
| 2016/0034742 A1 | 2/2016 | Kim et al. |
| 2016/0043905 A1 | 2/2016 | Fiedler |
| 2016/0048296 A1 | 2/2016 | Gan et al. |
| 2016/0048369 A1 | 2/2016 | Zenoff |
| 2016/0048370 A1 | 2/2016 | Zenoff |
| 2016/0050476 A1 | 2/2016 | Patil |
| 2016/0054710 A1 | 2/2016 | Jo et al. |
| 2016/0061613 A1 | 3/2016 | Jung et al. |
| 2016/0062567 A1 | 3/2016 | Yang et al. |
| 2016/0062571 A1 | 3/2016 | Dascola et al. |
| 2016/0062572 A1 | 3/2016 | Yang et al. |
| 2016/0062573 A1 | 3/2016 | Dascola et al. |
| 2016/0062598 A1 | 3/2016 | Kocienda et al. |
| 2016/0062606 A1 | 3/2016 | Vega et al. |
| 2016/0062719 A1 | 3/2016 | Romano et al. |
| 2016/0077495 A1 | 3/2016 | Brown et al. |
| 2016/0092053 A1 | 3/2016 | Loganathan et al. |
| 2016/0092063 A1 | 3/2016 | Lee |
| 2016/0116941 A1 | 4/2016 | Kuwabara et al. |
| 2016/0117141 A1 | 4/2016 | Ro et al. |
| 2016/0124626 A1 | 5/2016 | Lee et al. |
| 2016/0134737 A1 | 5/2016 | Pulletikurty |
| 2016/0142763 A1 | 5/2016 | Kim et al. |
| 2016/0156597 A1 | 6/2016 | Meng et al. |
| 2016/0156957 A1 | 6/2016 | Yun |
| 2016/0162164 A1 | 6/2016 | Phillips et al. |
| 2016/0165037 A1 | 6/2016 | Youn et al. |
| 2016/0170436 A1 | 6/2016 | Farrar et al. |
| 2016/0170598 A1 | 6/2016 | Zambetti et al. |
| 2016/0170608 A1 | 6/2016 | Zambetti et al. |
| 2016/0191511 A1 | 6/2016 | Tijerina et al. |
| 2016/0195864 A1 | 7/2016 | Kim |
| 2016/0202866 A1 | 7/2016 | Zambetti |

(56) References Cited

U.S. PATENT DOCUMENTS

| | | |
|---|---|---|
| 2016/0209939 A1 | 7/2016 | Zambetti et al. |
| 2016/0231883 A1 | 8/2016 | Zambetti |
| 2016/0246566 A1 | 8/2016 | Fullerton et al. |
| 2016/0259489 A1 | 9/2016 | Yang |
| 2016/0260414 A1 | 9/2016 | Yang |
| 2016/0269176 A1 | 9/2016 | Pang et al. |
| 2016/0283194 A1 | 9/2016 | Patil et al. |
| 2016/0313875 A1 | 10/2016 | Williams et al. |
| 2016/0327911 A1 | 11/2016 | Eim et al. |
| 2016/0337206 A1 | 11/2016 | Bugenhagen et al. |
| 2016/0345039 A1 | 11/2016 | Billmeyer |
| 2016/0357507 A1 | 12/2016 | Decker et al. |
| 2017/0006210 A1 | 1/2017 | Dye et al. |
| 2017/0010678 A1 | 1/2017 | Tuli |
| 2017/0010751 A1 | 1/2017 | Shedletsky et al. |
| 2017/0011210 A1 | 1/2017 | Cheong et al. |
| 2017/0031648 A1 | 2/2017 | So et al. |
| 2017/0034253 A1 | 2/2017 | Jiang et al. |
| 2017/0045958 A1 | 2/2017 | Battlogg |
| 2017/0053542 A1 | 2/2017 | Wilson et al. |
| 2017/0083188 A1 | 3/2017 | Yang et al. |
| 2017/0089735 A1 | 3/2017 | Ruh |
| 2017/0104902 A1 | 4/2017 | Kim et al. |
| 2017/0134553 A1 | 5/2017 | Jeon et al. |
| 2017/0134872 A1 | 5/2017 | Silva et al. |
| 2017/0149795 A1* | 5/2017 | Day, II ................ H04L 67/535 |
| 2017/0156110 A1 | 6/2017 | Ueno et al. |
| 2017/0160098 A1 | 6/2017 | Mcgavran et al. |
| 2017/0160819 A1 | 6/2017 | Yi et al. |
| 2017/0180843 A1 | 6/2017 | Perianu et al. |
| 2017/0185373 A1 | 6/2017 | Kim et al. |
| 2017/0192743 A1 | 7/2017 | Chun et al. |
| 2017/0195772 A1 | 7/2017 | Han et al. |
| 2017/0205854 A1 | 7/2017 | Zenoff |
| 2017/0208466 A1 | 7/2017 | Seo et al. |
| 2017/0212590 A1 | 7/2017 | Vanblon et al. |
| 2017/0230236 A1* | 8/2017 | Kim ...................... H04L 7/0008 |
| 2017/0255169 A1 | 9/2017 | Lee et al. |
| 2017/0269692 A1 | 9/2017 | Eck et al. |
| 2017/0308292 A1 | 10/2017 | Choi |
| 2017/0322711 A1* | 11/2017 | Robinson ............ G06F 3/04817 |
| 2017/0322713 A1 | 11/2017 | Hwang et al. |
| 2017/0331901 A1* | 11/2017 | Sarlandie de la Robertie ............ G06F 1/163 |
| 2017/0357426 A1* | 12/2017 | Wilson ................ G06F 3/04847 |
| 2017/0357477 A1 | 12/2017 | Im et al. |
| 2018/0013815 A1 | 1/2018 | Gold |
| 2018/0024683 A1 | 1/2018 | Ely et al. |
| 2018/0067712 A1 | 3/2018 | Behzadi et al. |
| 2018/0069957 A1 | 3/2018 | Mushikabe et al. |
| 2018/0081453 A1 | 3/2018 | Ely |
| 2018/0137266 A1 | 5/2018 | Kim et al. |
| 2018/0199137 A1 | 7/2018 | Mate et al. |
| 2018/0218636 A1* | 8/2018 | Alaouf ................ G09B 19/003 |
| 2018/0253151 A1 | 9/2018 | Kletsov et al. |
| 2018/0259915 A1 | 9/2018 | Hosoi et al. |
| 2018/0262677 A1 | 9/2018 | Dye et al. |
| 2018/0267773 A1 | 9/2018 | Kim et al. |
| 2018/0288560 A1 | 10/2018 | Naik et al. |
| 2018/0307303 A1 | 10/2018 | Powderly et al. |
| 2018/0307363 A1 | 10/2018 | Ely et al. |
| 2018/0321842 A1 | 11/2018 | Lee et al. |
| 2018/0329585 A1 | 11/2018 | Carrigan et al. |
| 2018/0329586 A1 | 11/2018 | Sundstrom et al. |
| 2018/0335891 A1 | 11/2018 | Shedletsky et al. |
| 2018/0335903 A1 | 11/2018 | Coffman et al. |
| 2018/0341448 A1 | 11/2018 | Behzadi et al. |
| 2018/0349583 A1 | 12/2018 | Turgeman et al. |
| 2018/0352435 A1 | 12/2018 | Donley et al. |
| 2018/0364815 A1 | 12/2018 | Moussette et al. |
| 2019/0012063 A1 | 1/2019 | Kocienda et al. |
| 2019/0028865 A1* | 1/2019 | Raleigh ................ G06T 1/0007 |
| 2019/0037004 A1 | 1/2019 | Chaudhri et al. |
| 2019/0056700 A1 | 2/2019 | Matsuno et al. |
| 2019/0072912 A1 | 3/2019 | Pandya et al. |
| 2019/0080072 A1 | 3/2019 | Van Os et al. |
| 2019/0101870 A1 | 4/2019 | Pandya et al. |
| 2019/0121300 A1 | 4/2019 | Peterson et al. |
| 2019/0129661 A1 | 5/2019 | Hirota et al. |
| 2019/0138696 A1* | 5/2019 | Carpenter ............... G16H 40/67 |
| 2019/0146422 A1 | 5/2019 | Meyer et al. |
| 2019/0163324 A1 | 5/2019 | Shedletsky et al. |
| 2019/0179423 A1 | 6/2019 | Rose et al. |
| 2019/0182749 A1 | 6/2019 | Breaux et al. |
| 2019/0187861 A1 | 6/2019 | Yang |
| 2019/0196600 A1 | 6/2019 | Rothberg et al. |
| 2019/0212885 A1 | 7/2019 | Zambetti et al. |
| 2019/0238675 A1* | 8/2019 | Soni .................. H04M 1/72451 |
| 2019/0265849 A1 | 8/2019 | Yang et al. |
| 2019/0281547 A1 | 9/2019 | Yoon et al. |
| 2019/0297439 A1 | 9/2019 | Maeda |
| 2019/0306607 A1 | 10/2019 | Clayton et al. |
| 2019/0340348 A1 | 11/2019 | Yu et al. |
| 2019/0347181 A1* | 11/2019 | Cranfill ................ G06F 21/629 |
| 2019/0349469 A1 | 11/2019 | Skogen et al. |
| 2019/0370094 A1 | 12/2019 | Louch et al. |
| 2019/0372862 A1 | 12/2019 | Carrigan et al. |
| 2020/0042087 A1 | 2/2020 | Ang et al. |
| 2020/0042088 A1 | 2/2020 | Ang et al. |
| 2020/0042089 A1 | 2/2020 | Ang et al. |
| 2020/0042094 A1 | 2/2020 | Ang et al. |
| 2020/0042145 A1 | 2/2020 | Williams et al. |
| 2020/0042311 A1 | 2/2020 | Shin |
| 2020/0067245 A1* | 2/2020 | Maley .................. H01R 13/516 |
| 2020/0159374 A1 | 5/2020 | Yang et al. |
| 2020/0167047 A1 | 5/2020 | Dascola et al. |
| 2020/0174734 A1 | 6/2020 | Gomes et al. |
| 2020/0213437 A1 | 7/2020 | Bhatt |
| 2020/0228646 A1 | 7/2020 | Hotes et al. |
| 2020/0264764 A1 | 8/2020 | Seymour et al. |
| 2020/0272293 A1 | 8/2020 | Zambetti et al. |
| 2020/0285379 A1 | 9/2020 | George-Svahn |
| 2020/0304917 A1 | 9/2020 | Ryu |
| 2020/0333945 A1 | 10/2020 | Wilson et al. |
| 2020/0342144 A1 | 10/2020 | Alameh et al. |
| 2020/0356252 A1 | 11/2020 | Ko et al. |
| 2020/0356687 A1 | 11/2020 | Salzman et al. |
| 2020/0359204 A1 | 11/2020 | Hawkins et al. |
| 2020/0379712 A1 | 12/2020 | Carrigan |
| 2020/0379713 A1 | 12/2020 | Carrigan |
| 2020/0379716 A1 | 12/2020 | Carrigan et al. |
| 2020/0393957 A1 | 12/2020 | Wilson et al. |
| 2021/0055697 A1 | 2/2021 | Abramov |
| 2021/0103338 A1 | 4/2021 | Ang et al. |
| 2021/0110014 A1 | 4/2021 | Turgeman et al. |
| 2021/0216654 A1 | 7/2021 | Ko et al. |
| 2021/0255750 A1 | 8/2021 | Al et al. |
| 2021/0263702 A1 | 8/2021 | Carrigan |
| 2021/0311438 A1 | 10/2021 | Wilson et al. |
| 2021/0373718 A1 | 12/2021 | Yang et al. |
| 2021/0407507 A1 | 12/2021 | Zhou et al. |
| 2022/0043560 A1 | 2/2022 | Kocienda et al. |
| 2022/0043626 A1 | 2/2022 | Carrigan |
| 2022/0101719 A1* | 3/2022 | Bojic ...................... H04W 4/02 |
| 2022/0179497 A1 | 6/2022 | Jung et al. |
| 2022/0240408 A1 | 7/2022 | Faulkner et al. |
| 2022/0244782 A1 | 8/2022 | Robert et al. |
| 2022/0276780 A1 | 9/2022 | Ko et al. |
| 2022/0374085 A1 | 11/2022 | Nguyen et al. |
| 2023/0024225 A1 | 1/2023 | Zambetti et al. |
| 2023/0049771 A1 | 2/2023 | Dascola et al. |
| 2023/0052490 A1 | 2/2023 | Chaudhri et al. |
| 2023/0131489 A1 | 4/2023 | Marzorati et al. |
| 2023/0179700 A1 | 6/2023 | Bhatt |
| 2023/0214089 A1 | 7/2023 | Yang et al. |
| 2023/0252737 A1 | 8/2023 | Dreyer et al. |
| 2023/0335139 A1 | 10/2023 | Breton et al. |
| 2023/0353862 A1 | 11/2023 | Yi et al. |
| 2023/0376193 A1 | 11/2023 | Han et al. |
| 2023/0376268 A1 | 11/2023 | Carrigan et al. |
| 2023/0393535 A1 | 12/2023 | Wilson et al. |
| 2023/0409166 A1 | 12/2023 | Kocienda et al. |
| 2024/0220009 A1 | 7/2024 | Dreyer et al. |
| 2024/0310982 A1 | 9/2024 | Chaudhri et al. |

(56) References Cited

U.S. PATENT DOCUMENTS

| | | | |
|---|---|---|---|
| 2024/0385691 | A1 | 11/2024 | Nie et al. |
| 2025/0047777 | A1 | 2/2025 | Bhatt |
| 2025/0094021 | A1 | 3/2025 | Yang et al. |
| 2025/0130692 | A1 | 4/2025 | Dascola et al. |
| 2025/0156059 | A1 | 5/2025 | Zambetti et al. |
| 2025/0164941 | A1 | 5/2025 | Wilson et al. |

FOREIGN PATENT DOCUMENTS

| | | |
|---|---|---|
| CH | 700242 A2 | 7/2010 |
| CN | 1556955 A | 12/2004 |
| CN | 1705346 A | 12/2005 |
| CN | 1811899 A | 8/2006 |
| CN | 101202866 A | 6/2008 |
| CN | 101243383 A | 8/2008 |
| CN | 101356493 A | 1/2009 |
| CN | 101390038 A | 3/2009 |
| CN | 101427574 A | 5/2009 |
| CN | 101433034 A | 5/2009 |
| CN | 101535938 A | 9/2009 |
| CN | 101611374 A | 12/2009 |
| CN | 101627349 A | 1/2010 |
| CN | 101770331 A | 7/2010 |
| CN | 101776968 A | 7/2010 |
| CN | 101796478 A | 8/2010 |
| CN | 101876877 A | 11/2010 |
| CN | 101893992 A | 11/2010 |
| CN | 102033710 A | 4/2011 |
| CN | 102037436 A | 4/2011 |
| CN | 102112946 A | 6/2011 |
| CN | 102138120 A | 7/2011 |
| CN | 102479027 A | 5/2012 |
| CN | 102479053 A | 5/2012 |
| CN | 202309894 U | 7/2012 |
| CN | 102812426 A | 12/2012 |
| CN | 102830795 A | 12/2012 |
| CN | 102833345 A | 12/2012 |
| CN | 102946470 A | 2/2013 |
| CN | 103076942 A | 5/2013 |
| CN | 103415084 A | 11/2013 |
| CN | 103528545 A | 1/2014 |
| CN | 103547987 A | 1/2014 |
| CN | 103713848 A | 4/2014 |
| CN | 103777842 A | 5/2014 |
| CN | 103778082 A | 5/2014 |
| CN | 103782252 A | 5/2014 |
| CN | 103839023 A | 6/2014 |
| CN | 103870282 A | 6/2014 |
| CN | 103914238 A | 7/2014 |
| CN | 103970208 A | 8/2014 |
| CN | 103995647 A | 8/2014 |
| CN | 103995724 A | 8/2014 |
| CN | 104024987 A | 9/2014 |
| CN | 203930358 U | 11/2014 |
| CN | 104205785 A | 12/2014 |
| CN | 104272854 A | 1/2015 |
| CN | 104281430 A | 1/2015 |
| CN | 104346297 A | 2/2015 |
| CN | 104423581 A | 3/2015 |
| CN | 104471532 A | 3/2015 |
| CN | 104717356 A | 6/2015 |
| CN | 104956182 A | 9/2015 |
| CN | 105208511 A | 12/2015 |
| CN | 105388998 A | 3/2016 |
| CN | 105574378 A | 5/2016 |
| CN | 105657465 A | 6/2016 |
| CN | 105959906 A | 9/2016 |
| CN | 106060772 A | 10/2016 |
| CN | 103914238 B | 2/2017 |
| CN | 106797415 A | 5/2017 |
| CN | 106851528 A | 6/2017 |
| CN | 106936929 A | 7/2017 |
| CN | 107637073 A | 1/2018 |
| CN | 107683470 A | 2/2018 |
| CN | 107797657 A | 3/2018 |
| CN | 107852572 A | 3/2018 |
| CN | 107949879 A | 4/2018 |
| CN | 108289239 A | 7/2018 |
| CN | 108292203 A | 7/2018 |
| CN | 108958608 A | 12/2018 |
| CN | 208188782 U | 12/2018 |
| CN | 109347581 A | 2/2019 |
| CN | 109461462 A | 3/2019 |
| CN | 109584879 A | 4/2019 |
| CN | 109584879 B | 7/2021 |
| CN | 108958608 B | 7/2022 |
| EP | 0836074 A2 | 4/1998 |
| EP | 1406158 A2 | 4/2004 |
| EP | 1406176 A1 | 4/2004 |
| EP | 1517228 A2 | 3/2005 |
| EP | 1571538 A1 | 9/2005 |
| EP | 1614992 A1 | 1/2006 |
| EP | 1705883 A1 | 9/2006 |
| EP | 1858238 A2 | 11/2007 |
| EP | 1944677 A2 | 7/2008 |
| EP | 1953663 A1 | 8/2008 |
| EP | 1959337 A2 | 8/2008 |
| EP | 2096413 A1 | 9/2009 |
| EP | 2151745 A2 | 2/2010 |
| EP | 2194452 A1 | 6/2010 |
| EP | 2302493 A2 | 3/2011 |
| EP | 2306692 A1 | 4/2011 |
| EP | 2367098 A2 | 9/2011 |
| EP | 2428947 A2 | 3/2012 |
| EP | 2466260 A1 | 6/2012 |
| EP | 2523439 A1 | 11/2012 |
| EP | 2525282 A2 | 11/2012 |
| EP | 2551784 A1 | 1/2013 |
| EP | 2565767 A1 | 3/2013 |
| EP | 2565769 A2 | 3/2013 |
| EP | 2610738 A2 | 7/2013 |
| EP | 2629483 A1 | 8/2013 |
| EP | 2632131 A1 | 8/2013 |
| EP | 1614992 B1 | 10/2013 |
| EP | 2703972 A1 | 3/2014 |
| EP | 2720442 A1 | 4/2014 |
| EP | 2741176 A2 | 6/2014 |
| EP | 2892240 A1 | 7/2015 |
| EP | 2911377 A1 | 8/2015 |
| EP | 2980715 A1 | 2/2016 |
| EP | 3001282 A1 | 3/2016 |
| EP | 3032537 A2 | 6/2016 |
| EP | 3057342 A1 | 8/2016 |
| EP | 3073703 A1 | 9/2016 |
| EP | 3276905 A1 | 1/2018 |
| EP | 3379853 A1 | 9/2018 |
| GB | 0412212 | 7/2004 |
| GB | 2402105 A | 12/2004 |
| GB | 2489580 A | 10/2012 |
| JP | 2-114318 A | 4/1990 |
| JP | 6-110881 A | 4/1994 |
| JP | 7-325700 A | 12/1995 |
| JP | 8-76926 A | 3/1996 |
| JP | 10-240488 A | 9/1998 |
| JP | 11-39133 A | 2/1999 |
| JP | 11-183183 A | 7/1999 |
| JP | 2000-40158 A | 2/2000 |
| JP | 2000-242390 A | 9/2000 |
| JP | 2001-101202 A | 4/2001 |
| JP | 2001-202170 A | 7/2001 |
| JP | 2001-202178 A | 7/2001 |
| JP | 2001-309455 A | 11/2001 |
| JP | 2003-122713 A | 4/2003 |
| JP | 2003-195998 A | 7/2003 |
| JP | 2003-526820 A | 9/2003 |
| JP | 2004-21522 A | 1/2004 |
| JP | 2004-326193 A | 11/2004 |
| JP | 2005-45744 A | 2/2005 |
| JP | 2006-74320 A | 3/2006 |
| JP | 2006-140990 A | 6/2006 |
| JP | 2006-185273 A | 7/2006 |
| JP | 2007-512635 A | 5/2007 |
| JP | 2007-170995 A | 7/2007 |
| JP | 2007-179544 A | 7/2007 |

(56) References Cited

FOREIGN PATENT DOCUMENTS

| | | |
|---|---|---|
| JP | 2008-276801 A | 11/2008 |
| JP | 2009-502048 A | 1/2009 |
| JP | 2009-80710 A | 4/2009 |
| JP | 2009-246553 A | 10/2009 |
| JP | 2009-265793 A | 11/2009 |
| JP | 2010-97353 A | 4/2010 |
| JP | 2010-511939 A | 4/2010 |
| JP | 2010-522935 A | 7/2010 |
| JP | 2011-53790 A | 3/2011 |
| JP | 2011-95791 A | 5/2011 |
| JP | 2011-217000 A | 10/2011 |
| JP | 2012-58979 A | 3/2012 |
| JP | 2012-90111 A | 5/2012 |
| JP | 2012-155698 A | 8/2012 |
| JP | 2012-252384 A | 12/2012 |
| JP | 2013-47919 A | 3/2013 |
| JP | 2013-73513 A | 4/2013 |
| JP | 2013-73528 A | 4/2013 |
| JP | 2013-137750 A | 7/2013 |
| JP | 2013-530433 A | 7/2013 |
| JP | 2013-146557 A | 8/2013 |
| JP | 2013-164700 A | 8/2013 |
| JP | 2014-53692 A | 3/2014 |
| JP | 2014-123169 A | 7/2014 |
| JP | 2014-128032 A | 7/2014 |
| JP | 2014-143575 A | 8/2014 |
| JP | 2015-61318 A | 3/2015 |
| JP | 2016-13151 A | 1/2016 |
| JP | 2017-34563 A | 2/2017 |
| JP | 2017-143357 A | 8/2017 |
| JP | 2018-113544 A | 7/2018 |
| JP | 2018-147265 A | 9/2018 |
| KR | 10-2010-0003589 A | 1/2010 |
| KR | 10-2010-0019887 A | 2/2010 |
| KR | 10-2010-0109277 A | 10/2010 |
| KR | 10-2011-0093090 A | 8/2011 |
| KR | 10-2012-0071468 A | 7/2012 |
| KR | 10-2012-0079707 A | 7/2012 |
| KR | 10-2013-0052751 A | 5/2013 |
| KR | 10-2015-0022599 A | 3/2015 |
| KR | 10-2016-0000330 A | 1/2016 |
| KR | 10-2016-0092363 A | 8/2016 |
| KR | 10-2017-0027435 A | 3/2017 |
| KR | 10-2017-0032471 A | 3/2017 |
| KR | 10-2017-0082022 A | 7/2017 |
| KR | 10-2017-0124954 A | 11/2017 |
| KR | 10-2019-0020850 A | 3/2019 |
| KR | 10-2019-0022883 A | 3/2019 |
| TW | 201012152 A | 3/2010 |
| TW | 201027419 A | 7/2010 |
| TW | 201119339 A | 6/2011 |
| TW | 201215086 A | 4/2012 |
| TW | I405106 B | 8/2013 |
| TW | 201403406 A | 1/2014 |
| TW | M474482 U | 3/2014 |
| TW | 201426492 A | 7/2014 |
| TW | 201432552 A | 8/2014 |
| TW | 201509168 A | 3/2015 |
| WO | 2005/055034 A1 | 6/2005 |
| WO | 2006/037545 A2 | 4/2006 |
| WO | 2007/002621 A2 | 1/2007 |
| WO | 2007/008321 A2 | 1/2007 |
| WO | 2007/105937 A1 | 9/2007 |
| WO | 2007/142703 A1 | 12/2007 |
| WO | 2007/149731 A1 | 12/2007 |
| WO | 2008/030779 A2 | 3/2008 |
| WO | 2008/030879 A2 | 3/2008 |
| WO | 2008/067498 A2 | 6/2008 |
| WO | 2008/090902 A1 | 7/2008 |
| WO | 2008/099251 A1 | 8/2008 |
| WO | 2008/106777 A1 | 9/2008 |
| WO | 2009/084368 A1 | 7/2009 |
| WO | 2009/089222 A2 | 7/2009 |
| WO | 2009/137419 A2 | 11/2009 |
| WO | 2009/140095 A2 | 11/2009 |
| WO | 2010/134729 A2 | 11/2010 |
| WO | 2011/063516 A1 | 6/2011 |
| WO | 2011/126502 A1 | 10/2011 |
| WO | 2012/103117 A1 | 8/2012 |
| WO | 2012/129359 A1 | 9/2012 |
| WO | 2012/172970 A1 | 12/2012 |
| WO | 2013/149055 A1 | 10/2013 |
| WO | 2013/169849 A2 | 11/2013 |
| WO | 2013/169875 A2 | 11/2013 |
| WO | 2014/058816 A1 | 4/2014 |
| WO | 2014/105276 A1 | 7/2014 |
| WO | 2014/113987 A1 | 7/2014 |
| WO | 2014/171734 A2 | 10/2014 |
| WO | 2015/061831 A1 | 5/2015 |
| WO | 2015/065402 A1 | 5/2015 |
| WO | 2015/185123 A1 | 12/2015 |
| WO | 2016/022203 A1 | 2/2016 |
| WO | 2016/022205 A1 | 2/2016 |
| WO | 2016/036472 A1 | 3/2016 |
| WO | 2016/036541 A2 | 3/2016 |
| WO | 2016/200603 A1 | 12/2016 |
| WO | 2016/204186 A1 | 12/2016 |
| WO | 2017/062621 A1 | 4/2017 |
| WO | 2017/112003 A1 | 6/2017 |
| WO | 2018/032085 A1 | 2/2018 |
| WO | 2018/048510 A1 | 3/2018 |
| WO | 2018/084802 A1 | 5/2018 |
| WO | 2018/098136 A1 | 5/2018 |
| WO | 2019/173136 A1 | 9/2019 |
| WO | 2019/200350 A1 | 10/2019 |
| WO | 2019/217086 A2 | 11/2019 |
| WO | 2020/063762 A1 | 4/2020 |

OTHER PUBLICATIONS

Applicant-Initiated Interview Summary received for U.S. Appl. No. 16/147,523, mailed on Jun. 13, 2022, 4 pages.
Applicant-Initiated Interview Summary received for U.S. Appl. No. 16/679,967, mailed on Jun. 1, 2022, 2 pages.
Decision to Refuse received for European Patent Application No. 20192404.0, mailed on Jun. 14, 2022, 15 pages.
Notice of Allowance received for Japanese Patent Application No. 2021-571464, mailed on May 30, 2022, 4 pages (1 page of English Translation and 3 pages of Official Copy).
Notice of Allowance received for U.S. Appl. No. 16/679,967, mailed on Jun. 15, 2022, 7 pages.
Notice of Allowance received for U.S. Appl. No. 16/775,528, mailed on Jun. 15, 2022, 6 pages.
Office Action received for European Patent Application No. 15753796.0, mailed on Jun. 2, 2022, 2 pages.
Decision on Appeal received for U.S. Appl. No. 14/913,349, mailed on Apr. 20, 2022, 13 pages.
Non-Final Office Action received for U.S. Appl. No. 16/147,523, mailed on Apr. 26, 2022, 22 pages.
Non-Final Office Action received for U.S. Appl. No. 16/679,967, mailed on Apr. 19, 2022, 13 pages.
Office Action received for Chinese Patent Application No. 201910447678.7, mailed on Mar. 21, 2022, 14 pages (6 pages of English Translation and 8 pages of Official Copy).
Applicant-Initiated Interview Summary received for U.S. Appl. No. 16/147,523, mailed on Dec. 10, 2021, 4 pages.
International Preliminary Report on Patentability received for PCT Patent Application No. PCT/US2020/026044, mailed on Dec. 9, 2021, 18 pages.
International Preliminary Report on Patentability received for PCT Patent Application No. PCT/US2020/035446, mailed on Dec. 9, 2021, 14 pages.
Non-Final Office Action received for U.S. Appl. No. 17/188,228, mailed on Dec. 21, 2021, 14 pages.
Office Action received for Indian Patent Application No. 202017041557, mailed on Dec. 8, 2021, 8 pages.
Final Office Action received for U.S. Appl. No. 16/147,523, mailed on Oct. 14, 2021, 22 pages.
Office Action received for European Patent Application No. 19722280.5, mailed on Oct. 4, 2021, 7 pages.

(56) References Cited

OTHER PUBLICATIONS

Applicant-Initiated Interview Summary received for U.S. Appl. No. 16/679,967, mailed on Oct. 25, 2021, 2 pages.
Final Office Action received for U.S. Appl. No. 16/679,967, mailed on Nov. 10, 2021, 14 pages.
Notice of Allowance received for Korean Patent Application No. 10-2020-7028759, mailed on Oct. 19, 2021, 4 pages (1 page of English Translation and 3 pages of Official Copy).
Brief Communication Regarding Oral Proceedings received for European Patent Application No. 20192404.0, mailed on May 4, 2022, 3 pages.
Brief Communication Regarding Oral Proceedings received for European Patent Application No. 20192404.0, mailed on May 18, 2022, 1 page.
Corrected Notice of Allowance received for U.S. Appl. No. 17/041,350, mailed on Mar. 15, 2022, 3 pages.
Notice of Allowance received for Chinese Patent Application No. 202110011509.6, mailed on Mar. 2, 2022, 2 pages (1 page of English Translation and 1 page of Official Copy).
Notice of Allowance received for Korean Patent Application No. 10-2022-7001721, mailed on Feb. 28, 2022, 5 pages (1 page of English Translation and 4 pages of Official Copy).
Office Action received for Danish Patent Application No. PA202070610, mailed on Mar. 14, 2022, 7 pages.
Office Action received for Korean Patent Application No. 10-2021-7017259, mailed on Mar. 3, 2022, 8 pages (4 pages of English Translation and 4 pages of Official Copy).
Supplemental Notice of Allowance received for U.S. Appl. No. 16/867,002, mailed on Mar. 16, 2022, 2 pages.
Notice of Allowance received for U.S. Appl. No. 16/775,528, mailed on Feb. 24, 2022, 18 pages.
Notice of Allowance received for U.S. Appl. No. 16/867,002, mailed on Mar. 1, 2022, 7 pages.
Notice of Allowance received for U.S. Appl. No. 17/041,350, mailed on Feb. 24, 2022, 6 pages.
Notice of Allowance received for Japanese Patent Application No. 2021-122610, mailed on Aug. 5, 2022, 4 pages (1 page of English Translation and 3 pages of Official Copy).
Notice of Allowance received for U.S. Appl. No. 16/147,523, mailed on Aug. 4, 2022, 9 pages.
Applicant-Initiated Interview Summary received for U.S. Appl. No. 16/679,967, mailed on Feb. 10, 2022, 2 pages.
Summons to Attend Oral Proceedings received for European Patent Application No. 20192404.0, mailed on Feb. 2, 2022, 11 pages.
Office Action received for Korean Patent Application No. 10-2022-7008567, mailed on Mar. 28, 2022, 5 pages (2 pages of English Translation and 3 pages of Official Copy).
Decision of Appeal received for Korean Patent Application No. 10-2021-7017259, mailed on Jun. 29, 2022, 28 pages (4 pages of English Translation and 24 pages of Official Copy).
Notice of Allowance received for Chinese Patent Application No. 201910446753.8, mailed on Jun. 29, 2022, 2 pages (1 page of English Translation and 1 page of Official Copy).
Notice of Allowance received for U.S. Appl. No. 14/913,349, mailed on Jul. 15, 2022, 6 pages.
Office Action received for European Patent Application No. 20217518.8, mailed on Jul. 6, 2022, 5 pages.
Corrected Notice of Allowance received for U.S. Appl. No. 16/775,528, mailed on Mar. 25, 2022, 2 pages.
Corrected Notice of Allowance received for U.S. Appl. No. 17/041,350, mailed on Apr. 4, 2022, 3 pages.
Notice of Acceptance received for Australian Patent Application No. 2022201369, mailed on Mar. 17, 2022, 3 pages.
Office Action received for Australian Patent Application No. 2021201748, mailed on Mar. 18, 2022, 6 pages.
Office Action received for Chinese Patent Application No. 201910446753.8, mailed on Mar. 2, 2022, 11 pages (5 pages of English Translation and 6 pages of Official Copy).
Applicant-Initiated Interview Summary received for U.S. Appl. No. 16/653,857, mailed on Dec. 14, 2020, 3 pages.
Applicant-Initiated Interview Summary received for U.S. Appl. No. 16/653,857, mailed on May 3, 2021, 4 pages.
Farmboyreef, "Apple watch controlling your tv", Available online at: https://www.youtube.com/watch?v=xaJPG0Wm3Tg, Jun. 23, 2015, 3 pages.
Final Office Action received for U.S. Appl. No. 16/653,857, mailed on Feb. 10, 2021, 43 pages.
Final Office Action received for U.S. Appl. No. 15/135,328 mailed on Nov. 9, 2018, 55 pages.
Gil, Lory, "How to control Apple TV with your Apple Watch", Available online at: https://www.imore.com/how-control-your-apple-tv-remote-app%ADapple-watch], Jun. 6, 2016, 24 pages.
Hobbyistsoftwareltd, "VLC Remote", Online available at: https://watchaware.com/watch-apps/297244048, 2016, 7 pages.
Klein, Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
Nikolov, Anton, "Design principle: Consistency", Available online at: https://uxdesign.cc/design-principle-consistency-6b0cf7e7339f, Apr. 8, 2017, 9 pages.
Non-Final Office Action received for U.S. Appl. No. 16/653,857, mailed on Jul. 9, 2020, 35 pages.
Non-Final Office Action received for U.S. Appl. No. 16/653,857, mailed on Jul. 22, 2021, 45 pages.
Non-Final Office Action received for U.S. Appl. No. 17/314,948, mailed on Aug. 1, 2022, 33 pages.
Non-Final Office Action received for U.S. Appl. No. 15/135,328 mailed on Apr. 11, 2018, 64 pages.
Notice of Allowance received for Korean Patent Application No. 10-2022-7008567, mailed on Jul. 4, 2022, 9 pages (2 pages of English Translation and 7 pages of Official Copy).
Notice of Allowance received for U.S. Appl. No. 15/135,328, mailed on Jul. 1, 2019, 25 pages.
Notice of Allowance received for U.S. Appl. No. 16/653,857, mailed on Feb. 16, 2022, 34 pages.
Office Action received for European Patent Application No. 20729346.5, mailed on Jul. 28, 2022, 9 pages.
Ojeda-Zapata, Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.
Sgt.Gizmos, "Pairing Your Apple Watch With Your AppleTV", Available online at: https://www.youtube.com/watch?v=C4t8YFSJ-UY, Apr. 27, 2015, 3 pages.
Singh, Ajit, "myTUNZ: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.
Whitney, Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%2C%20go%20to,.%E2%80%9D%20Tap%20on%20Add%20Music., Mar. 2, 2018, 13 pages.
International Preliminary Report on Patentability received for PCT Patent Application No. PCT/US2020/031536, mailed on Nov. 18, 2021, 11 pages.
Office Action received for Chinese Patent Application No. 202110011509.6, mailed on Oct. 11, 2021, 10 pages (5 pages of English Translation and 5 pages of Official Copy).
Office Action received for Indian Patent Application No. 202018015998, mailed on Nov. 17, 2021, 6 pages.
Office Action received for Indian Patent Application No. 202018016000, mailed on Nov. 16, 2021, 6 pages.
Examiner-Initiated Interview Summary received for U.S. Appl. No. 14/913,349, mailed on Sep. 22, 2021, 2 pages.
Examiner's Answer to Appeal Brief received for U.S. Appl. No. 14/913,349, mailed on Sep. 30, 2021, 23 pages.
Final Office Action received for U.S. Appl. No. 17/041,350, mailed on Sep. 17, 2021, 25 pages.
Applicant-Initiated Interview Summary received for U.S. Appl. No. 17/041,350, mailed on Feb. 2, 2022, 2 pages.

(56) References Cited

OTHER PUBLICATIONS

Office Action received for European Patent Application No. 20729346.5, mailed on Jan. 17, 2022, 8 pages.
Office Action received for Korean Patent Application No. 10-2021-7017259, mailed on Jan. 10, 2022, 6 pages (3 pages of English Translation and 3 pages of Official Copy).
Final Office Action received for U.S. Appl. No. 17/188,228, mailed on Jul. 6, 2022, 13 pages.
Notice of Acceptance received for Australian Patent Application No. 2021201748, mailed on Jun. 23, 2022, 3 pages.
Notice of Allowance received for Chinese Patent Application No. 201910447678.7, mailed on Jun. 20, 2022, 2 pages (1 page of English Translation and 1 page of Official Copy).
3C Blogger Kisplay Share, Samsung Galaxy Tab S Hands-on SideSync 3.0 Is Amazing, http://www.samsung.com/tw/article/galaxy-tab-s-blogger-kisplay., Jul. 4, 2014, 4 pages. (Official Copy Only) See Communication under 37 CFR § 1.98(a) (3).
Advisory Action received for U.S. Appl. No. 09/477,419, mailed on Dec. 4, 2002, 3 pages.
Advisory Action received for U.S. Appl. No. 11/069,977, mailed on Aug. 6, 2012, 3 pages.
Advisory Action received for U.S. Appl. No. 11/069,977, mailed on May 13, 2009, 2 pages.
Advisory Action received for U.S. Appl. No. 11/069,977, mailed on May 26, 2011, 3 pages.
Advisory Action received for U.S. Appl. No. 13/077,850, mailed on Apr. 24, 2014, 3 pages.
Advisory Action received for U.S. Appl. No. 13/077,855, mailed on Jun. 15, 2016, 4 pages.
Advisory Action received for U.S. Appl. No. 13/077,862, mailed on Apr. 7, 2016, 3 pages.
Advisory Action received for U.S. Appl. No. 13/077,874, mailed on Aug. 19, 2016, 3 pages.
Advisory Action received for U.S. Appl. No. 14/839,912, mailed on Nov. 14, 2019, 6 pages.
Advisory Action received for U.S. Appl. No. 14/863,099, mailed on Sep. 8, 2016, 3 pages.
Advisory Action received for U.S. Appl. No. 14/913,349, mailed on Oct. 29, 2019, 4 pages.
Advisory Action received for U.S. Appl. No. 15/049,052, mailed on Sep. 11, 2017, 2 pages.
Agarwal Deepesh, "DexClock—Live Clock And Date Blended Into Beautiful Artwork As Your Desktop Wallpaper", available at: https://www.megaleecher.net/DexCiock Wallpaper Designs, Jul. 6, 2013, 4 pages.
Appeal Decision received for U.S. Appl. No. 13/077,862, mailed on Mar. 22, 2019, 10 pages.
Apple, "iPhone User's Guide", Available at: http://mesnotices.20minutes.fr/manuel-notice-mode-emploi/APPLE/IPHONE%2D%5FE#, Jun. 2007, 137 pages.
Appleltouchreviews, "The Best Cydia Tweak For Your iPhone, iPod Touch & iPad—Iconoclasm", Available online at: https://www.youtube.com/watch?v=EhriZRINufQ, Apr. 23, 2011, 2 pages.
Applicant Initiated Interview Summary received for U.S. Appl. No. 14/913,349, mailed on Oct. 7, 2019, 4 pages.
Applicant Initiated Interview Summary received for U.S. Appl. No. 16/583,994, mailed on Apr. 3, 2020, 5 pages.
Applicant Initiated Interview Summary received for U.S. Appl. No. 14/839,912, mailed on Nov. 5, 2019, 5 pages.
Applicant Initiated Interview Summary received for U.S. Appl. No. 15/418,537, mailed on Dec. 23, 2019, 6 pages.
Applicant Initiated Interview Summary received for U.S. Appl. No. 15/930,300, mailed on Oct. 27, 2020, 3 pages.
Applicant Initiated Interview Summary received for U.S. Appl. No. 16/130,838, mailed on Apr. 19, 2021, 5 pages.
Applicant Initiated Interview Summary received for U.S. Appl. No. 16/130,838, mailed on Jul. 20, 2020, 6 pages.
Applicant-Initiated Interview Summary received for U.S. Appl. No. 16/130,838, mailed on Mar. 26, 2020, 8 pages.
Applicant-Initiated Interview Summary received for U.S. Appl. No. 16/144,264, mailed on Jul. 22, 2020, 5 pages.
Applicant-Initiated Interview Summary received for U.S. Appl. No. 16/147,523, mailed on Apr. 27, 2020, 3 pages.
Applicant-Initiated Interview Summary received for U.S. Appl. No. 16/147,523, mailed on Oct. 26, 2020, 3 pages.
Applicant-Initiated Interview Summary received for U.S. Appl. No. 16/147,523, mailed on Sep. 14, 2021, 3 pages.
Applicant-Initiated Interview Summary received for U.S. Appl. No. 16/281,838, mailed on Jun. 2, 2020, 5 pages.
Applicant-Initiated Interview Summary received for U.S. Appl. No. 16/583,981, mailed on Mar. 9, 2020, 5 pages.
Applicant-Initiated Interview Summary received for U.S. Appl. No. 16/583,981, mailed on Sep. 14, 2020, 6 pages.
Applicant-Initiated Interview Summary received for U.S. Appl. No. 16/583,994, mailed on May 28, 2021, 5 pages.
Applicant-Initiated Interview Summary received for U.S. Appl. No. 16/583,994, mailed on Nov. 24, 2020, 4 pages.
Applicant-Initiated Interview Summary received for U.S. Appl. No. 16/723,583, mailed on Dec. 28, 2020, 6 pages.
Applicant-Initiated Interview Summary received for U.S. Appl. No. 16/749,929, mailed on Oct. 13, 2020, 4 pages.
Applicant-Initiated Interview Summary received for U.S. Appl. No. 16/775,528, mailed on Aug. 30, 2021, 4 pages.
Applicant-Initiated Interview Summary received for U.S. Appl. No. 16/775,528, mailed on Feb. 23, 2021, 4 pages.
Applicant-Initiated Interview Summary received for U.S. Appl. No. 17/041,350, mailed on Aug. 18, 2021, 2 pages.
Askabouttech, "How to Change Android Smartwatch Wallpaper", also online available at: https://www.youtube.com/watch?v=SBYrsyuHqBA, Jul. 12, 2014, 5 pages.
Axiang's Network Notebook, Deep Analysis on Samsung's 2013 New Flagship: tell you what kind of mobile phone Galaxy S4 is!, Available at: https://axiang.cc/archives/6115, Apr. 22, 2013, 4 pages (Official Copy Only) See Communication under 37 CFR § 1.98(a) (3).
Baar Marius, "Fitbit Ace—Unboxing, Setup and 24 Hour Test", YouTube [online] [video], Retrieved from: https://youtu.be/ekvkfqOyrls, See especially 4:44., Oct. 24, 2018, 3 pages.
Baidu Experience, "iPhone how to move icon", Online available at: https://jingyan.baidu.com/article/eb9f7b6da4eacb869264e84f.html, Apr. 28, 2014, 4 pages (Official Copy Only) See Communication under 37 CFR § 1.98(a) (3).
Brief Communication regarding Oral Proceedings received for European Patent Application No. 17184710.6, mailed on Feb. 19, 2020, 2 pages.
Brief Communication regarding Oral Proceedings received for European Patent Application No. 17184710.6, mailed on Mar. 9, 2020, 2 pages.
Certificate of Examination received for Australian Patent Application No. 2017101561, mailed on Jun. 25, 2018, 2 pages.
Certificate of Examination received for Australian Patent Application No. 2018101076, mailed on Apr. 11, 2019, 2 pages.
Chenzai, "Apple, please don't screw up notifications on the Apple Watch", Available online at:—https://digi.tech.qq.com/a/20140918/060747.htm. also published on the English webpage https://www.theverge.com/2014/9/9/6127913/apple-please-dont-screw-up-notifications-on-the-apple-watch, Sep. 18, 2014, 8 pages (4 pages of English Translation and 4 pages of Official Copy).
Corrected Notice of Allowance received for U.S. Appl. No. 13/077,874, mailed on Dec. 9, 2016, 2 pages.
Corrected Notice of Allowance received for U.S. Appl. No. 14/641,251, mailed on Jun. 17, 2016, 2 pages.
Corrected Notice of Allowance received for U.S. Appl. No. 14/641,287, mailed on Aug. 9, 2018, 2 pages.
Corrected Notice of Allowance received for U.S. Appl. No. 14/641,287, mailed on Sep. 12, 2018, 2 pages.
Corrected Notice of Allowance received for U.S. Appl. No. 14/839,897, mailed on Jan. 23, 2019, 6 pages.
Corrected Notice of Allowance received for U.S. Appl. No. 14/839,903, mailed on Feb. 13, 2019, 2 pages.
Corrected Notice of Allowance received for U.S. Appl. No. 14/839,903, mailed on Mar. 1, 2019, 2 pages.

(56) References Cited

OTHER PUBLICATIONS

Corrected Notice of Allowance received for U.S. Appl. No. 15/268,115, mailed on Apr. 13, 2018, 11 pages.
Corrected Notice of Allowance received for U.S. Appl. No. 15/268,115, mailed on Mar. 21, 2018, 9 pages.
Corrected Notice of Allowance received for U.S. Appl. No. 15/930,300, mailed on Dec. 24, 2020, 3 pages.
Corrected Notice of Allowance received for U.S. Appl. No. 16/281,838, mailed on Oct. 30, 2020, 2 pages.
Corrected Notice of Allowance received for U.S. Appl. No. 16/583,981, mailed on Apr. 6, 2021, 3 pages.
Corrected Notice of Allowance received for U.S. Appl. No. 16/583,981, mailed on May 17, 2021, 3 pages.
Corrected Notice of Allowance received for U.S. Appl. No. 16/583,994, mailed on Jul. 6, 2021, 3 pages.
Cuyamaca LRC Computer Labs, "Topics in CommonSpace Application", Available at: http://www.cuyamaca.net/librarylab/Technical%20Help/cmspace.asp, Retrieved on May 19, 2014, 16 pages.
Decision on Appeal received for Korean Patent Application No. 10-2016-7008449, mailed on Jul. 30, 2019, 29 pages (7 pages of English Translation and 22 pages of Official Copy).
Decision on Appeal received for Korean Patent Application No. 10-2018-7010872, mailed on Jan. 20, 2020, 20 pages (3 pages of English Translation and 17 pages of Official Copy).
Decision on Appeal received for U.S. Appl. No. 14/774,664, mailed on Sep. 12, 2019, 8 pages.
Decision on Appeal received for U.S. Appl. No. 14/863,099, mailed on Aug. 22, 2019, 9 pages.
Decision to Grant received for Danish Patent Application No. PA201570664, mailed on Feb. 20, 2017, 2 pages.
Decision to Grant received for Danish Patent Application No. PA201570781, mailed on Jul. 17, 2017, 2 pages.
Decision to grant received for Danish Patent Application No. PA201570788, mailed on Jul. 10, 2017, 2 pages.
Decision to Grant received for Danish Patent Application No. PA201570791, mailed on Jun. 7, 2017, 2 pages.
Decision to Grant received for Danish Patent Application No. PA201670117, mailed on Nov. 20, 2017, 2 pages.
Decision to Grant received for Danish Patent Application No. PA201770794, mailed on Nov. 11, 2019, 2 pages.
Decision to Grant received for Danish Patent Application No. PA202070609, mailed on May 3, 2021, 2 pages.
Decision to Grant received for European Patent Application No. 12704175.4, mailed on Jul. 19, 2018, 2 pages.
Decision to Grant received for European Patent Application No. 14772001.5, mailed on Dec. 5, 2019, 2 pages.
Decision to Grant received for European Patent Application No. 15712218.5, mailed on Jun. 7, 2018, 2 pages.
Decision to Grant received for European Patent Application No. 15787091.6, mailed on Dec. 3, 2020, 2 pages.
Decision to Grant received for European Patent Application No. 19199004.3, mailed on Jan. 21, 2021, 2 pages.
Decision to Refuse received for European Patent Application No. 17184710.6, mailed on Jun. 16, 2020, 9 pages.
Dharmasena Anusha, "iMessage-send as text message Option", YouTube, Available online at: https://www.youtube.com/watch?v=hXG-MdIW6FA, Feb. 18, 2013, 1 page.
Esther, "Instructions for Kobo Books: How to change to scrolling mode and do table of contents navigation—Google Groups", XP055513050, Retrieved from the Internet: URL:https://groups.google.com/forum/print/msg/viphone/-dkqODh_31N8acJK2dGPe8J?ctz=4607561_ 48_52_123900_ 48_ 436380 [retrieved on Oct. 5, 2018], Aug. 28, 2010, 3 pages.
European Search Report received for European Patent Application No. 19199004.3, mailed on Nov. 12, 2019, 6 pages.
European Search Report received for European Patent Application No. 20192404.0, mailed on Nov. 20, 2020, 4 pages.
European Search Report received for European Patent Application No. 20217518.8, mailed on Apr. 16, 2021, 4 pages.
Examiner-Initiated Interview Summary received for U.S. Appl. No. 14/913,349, mailed on Oct. 27, 2020, 3 pages.
Examiner's Answer to Appeal Brief received for U.S. Appl. No. 14/774,664, mailed on May 31, 2018, 28 pages.
Examiner's Answer to Appeal Brief received for U.S. Appl. No. 14/863,099, mailed on Jul. 28, 2017, 31 pages.
Extended European Search Report received for European Patent Application No. 17810739.7, mailed on Mar. 22, 2019, 9 pages.
Extended European Search Report received for European Patent Application No. 18185408.4, mailed on Oct. 17, 2018, 10 pages.
Final Office Action received for U.S. Appl. No. 09/477,419, mailed on Aug. 15, 2002, 13 pages.
Final Office Action received for U.S. Appl. No. 11/069,977, mailed on Feb. 3, 2009, 12 pages.
Final Office Action received for U.S. Appl. No. 11/069,977, mailed on Mar. 10, 2011, 18 pages.
Final Office Action received for U.S. Appl. No. 11/069,977, mailed on Mar. 11, 2010, 17 pages.
Final Office Action received for U.S. Appl. No. 11/069,977, mailed on Mar. 29, 2012, 19 pages.
Final Office Action Received for U.S. Appl. No. 13/077,850, mailed on Nov. 7, 2013, 14 pages.
Final Office Action received for U.S. Appl. No. 13/077,855, mailed on Mar. 17, 2014, 11 pages.
Final Office Action received for U.S. Appl. No. 13/077,855, mailed on Nov. 7, 2013, 14 pages.
Final Office Action received for U.S. Appl. No. 13/077,862, mailed on Nov. 8, 2013, 15 pages.
Final Office Action received for U.S. Appl. No. 13/077,862, mailed on Oct. 22, 2015, 16 pages.
Final Office Action Received for U.S. Appl. No. 13/077,867, mailed on May 23, 2013, 10 pages.
Final Office Action received for U.S. Appl. No. 13/077,874, mailed on Dec. 3, 2014, 23 pages.
Final Office Action received for U.S. Appl. No. 13/077,874, mailed on May 5, 2016, 26 pages.
Final Office Action received for U.S. Appl. No. 14/641,287, mailed on Jul. 20, 2017, 18 pages.
Final Office Action received for U.S. Appl. No. 14/774,664, mailed on Aug. 25, 2017, 23 pages.
Final Office Action received for U.S. Appl. No. 14/839,897, mailed on Jan. 10, 2018, 16 pages.
Final Office Action received for U.S. Appl. No. 14/839,903, mailed on Sep. 18, 2018, 11 pages.
Final Office Action received for U.S. Appl. No. 14/863,099, mailed on Apr. 21, 2016, 20 pages.
Final Office Action received for U.S. Appl. No. 14/913,349, mailed on Jul. 22, 2019, 20 pages.
Final Office Action received for U.S. Appl. No. 14/913,349, mailed on Jul. 30, 2018, 18 pages.
Final Office Action received for U.S. Appl. No. 14/913,349, mailed on Oct. 30, 2020, 33 pages.
Final Office Action received for U.S. Appl. No. 15/049,052, mailed on Mar. 1, 2018, 15 pages.
Final Office Action received for U.S. Appl. No. 15/049,052, mailed on May 17, 2017, 13 pages.
Final Office Action received for U.S. Appl. No. 15/049,052, mailed on Oct. 2, 2018, 16 pages.
Final Office Action received for U.S. Appl. No. 15/268,115, mailed on Oct. 11, 2017, 48 pages.
Final Office Action received for U.S. Appl. No. 15/418,537, mailed on Sep. 23, 2019, 53 pages.
Final Office Action received for U.S. Appl. No. 16/130,838, mailed on May 29, 2020, 25 pages.
Final Office Action received for U.S. Appl. No. 16/147,523, mailed on Aug. 4, 2020, 15 pages.
Final Office Action received for U.S. Appl. No. 16/583,981, mailed on Apr. 16, 2020, 19 pages.
Final Office Action received for U.S. Appl. No. 16/583,994, mailed on Jul. 23, 2020, 16 pages.
Final Office Action received for U.S. Appl. No. 16/723,583, mailed on Feb. 5, 2021, 15 pages.

(56) References Cited

OTHER PUBLICATIONS

Final Office Action received for U.S. Appl. No. 16/775,528, mailed on May 25, 2021, 15 pages.
Final Office Action received for U.S. Appl. No. 13/077,855, mailed on Mar. 24, 2016, 19 pages.
Final Office Action received for U.S. Appl. No. 14/839,912, mailed on Jul. 30, 2019, 42 pages.
Final Office Action received for U.S. Appl. No. 14/839,912, mailed on Sep. 13, 2018, 31 pages.
Franks Tech Help, "DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
Fuji Film, "Taking Pictures Remotely : Free iPhone/Android App Fuji Film Camera Remote", Available at: http://app.fujifilm-dsc.com/en/camera_remote/guide05.html, Apr. 22, 2014, 3 pages.
GT-I9500(Galaxy S4) User Manual, Samsung, Rev.1.1, http://org.downloadcenter.samsung.com/downloadfile/ContentsFile.aspx?CDSite=UNI_TW&CttFileID=5406113&CDCttType=UM&ModelType=N&ModelName=GTI9500&VPath=UM/201305/20130520173017063/GTI9500_UM_Open_Taiwan_Jellybean_Chi_Rev.1.1_130520.pdf., May 2013, 14 pages. (Official Copy Only) See Communication under 37 CFR § 1.98(a) (3).
How to move and arrange icons on iPhone, Available online on: "https://www.youtube.com/watch?v=5XKAk4wSons", Retrieved on Sep. 10, 2015, Dec. 11, 2011, 1 page.
Intention to Grant received for Danish Patent Application No. PA201570773, mailed on Mar. 9, 2018, 2 pages.
Intention To Grant received for Danish Patent Application No. PA201570781, mailed on Dec. 8, 2016, 2 pages.
Intention to Grant received for Danish Patent Application No. PA201570788, mailed on Mar. 27, 2017, 2 pages.
Intention to Grant received for Danish Patent Application No. PA201570791, mailed on Mar. 7, 2017, 2 pages.
Intention to Grant received for Danish Patent Application No. PA201670117, mailed on Apr. 21, 2017, 2 pages.
Intention to Grant received for Danish Patent Application No. PA201770794, mailed on Aug. 15, 2019, 2 pages.
Intention to Grant received for Danish Patent Application No. PA202070609, mailed on Jan. 14, 2021, 2 pages.
Intention to Grant received for European Patent Application No. 12704175.4, mailed on Mar. 22, 2018, 8 pages.
Intention to Grant received for European Patent Application No. 14772001.5, mailed on Jul. 18, 2019, 16 pages.
Intention to Grant received for European Patent Application No. 14772001.5, mailed on Mar. 22, 2019, 17 pages.
Intention to Grant received for European Patent Application No. 15712218.5, mailed on Jan. 24, 2018, 7 pages.
Intention to Grant received for European Patent Application No. 15787091.6, mailed on Apr. 23, 2020, 7 pages.
Intention to Grant received for European Patent Application No. 15787091.6, mailed on Sep. 30, 2020, 7 pages.
Intention to Grant received for European Patent Application No. 19199004.3, mailed on Sep. 14, 2020, 9 pages.
International Preliminary Report on Patentability received for PCT Patent Application No. PCT/US2012/022401, mailed on Aug. 8, 2013, 12 pages.
International Preliminary Report on Patentability received for PCT Patent Application No. PCT/US2014/027882, mailed on Sep. 24, 2015, 8 pages.
International Preliminary Report on Patentability received for PCT Patent Application No. PCT/US2014/053957, mailed on Mar. 17, 2016, 8 pages.
International Preliminary Report on Patentability received for PCT Patent Application No. PCT/US2015/019298, mailed on Mar. 16, 2017, 12 pages.
International Preliminary Report on Patentability received for PCT Patent Application No. PCT/US2015/041424, mailed on Feb. 2, 2017, 13 pages.
International Preliminary Report on Patentability received for PCT Patent Application No. PCT/US2015/047507, mailed on Mar. 16, 2017, 16 pages.
International Preliminary Report on Patentability received for PCT Patent Application No. PCT/US2015/047704, mailed on Mar. 16, 2017, 19 pages.
International Preliminary Report on Patentability received for PCT Patent Application No. PCT/US2015/055165, mailed on Sep. 21, 2017, 15 pages.
International Preliminary Report on Patentability received for PCT Patent Application No. PCT/US2016/016621, mailed on Aug. 24, 2017, 8 pages.
International Preliminary Report on Patentability received for PCT Patent Application No. PCT/US2017/035331, mailed on Dec. 20, 2018, 13 pages.
International Preliminary Report on Patentability received for PCT Patent Application No. PCT/US2019/024792, mailed on Dec. 17, 2020, 9 pages.
International Preliminary Report on Patentability received for PCT Patent Application No. PCT/US2015/019303, mailed on Mar. 16, 2017, 22 pages.
International Search Report and Written Opinion received for PCT Application No. PCT/US2015/047507, mailed on Feb. 22, 2016, 22 pages.
International Search Report and Written Opinion received for PCT Patent Application No. PCT/US2012/022401, Jul. 6, 2012, 16 pages.
International Search Report and Written Opinion received for PCT Patent Application No. PCT/US2013/032498, mailed on Feb. 10, 2014, 18 pages.
International Search Report and Written Opinion received for PCT Patent Application No. PCT/US2014/027882, mailed on Oct. 10, 2014, 11 pages.
International Search Report and Written Opinion received for PCT Patent Application No. PCT/US2014/053957, mailed on Feb. 19, 2015, 11 pages.
International Search Report and Written Opinion received for PCT Patent Application No. PCT/US2015/019298, mailed on Jul. 13, 2015, 17 pages.
International Search Report and Written Opinion received for PCT Patent Application No. PCT/US2015/019303, mailed on Sep. 28, 2015, 27 pages.
International Search Report and Written Opinion received for PCT Patent Application No. PCT/US2015/041424, mailed on Mar. 31, 2016, 18 pages.
International Search Report and Written Opinion received for PCT Patent Application No. PCT/US2015/047704, mailed on Feb. 22, 2016, 25 pages.
International Search Report and Written Opinion received for PCT Patent Application No. PCT/US2015/055165, mailed on Apr. 20, 2016, 22 pages.
International Search Report and Written Opinion received for PCT Patent Application No. PCT/US2016/016621, mailed on May 9, 2016, 12 pages.
International Search Report and Written Opinion received for PCT Patent Application No. PCT/US2017/035331, mailed on Oct. 6, 2017, 18 pages.
International Search Report and Written Opinion received for PCT Patent Application No. PCT/US2019/024792, mailed on Jul. 18, 2019, 13 pages.
International Search Report and Written Opinion received for PCT Patent Application No. PCT/US2020/026044, mailed on Sep. 9, 2020, 26 pages.
International Search Report and Written Opinion received for PCT Patent Application No. PCT/US2020/031536, mailed on Sep. 23, 2020, 16 pages.
International Search Report and Written Opinion received for PCT Patent Application No. PCT/US2020/035446, mailed on Nov. 10, 2020, 20 pages.
Invitation to Pay Additional Fee received for PCT Patent Application No. PCT/US2017/035331, mailed on Aug. 7, 2017, 4 pages.
Invitation to Pay Additional Fees received for PCT Patent Application No. PCT/US2012/022401, May 4, 2012, 8 pages.

(56) References Cited

OTHER PUBLICATIONS

Invitation to Pay Additional Fees received for PCT Patent Application No. PCT/US2014/027882, mailed on Aug. 5, 2014, 2 pages.
Invitation to Pay Additional Fees received for PCT Patent Application No. PCT/US2015/041424, mailed on Nov. 12, 2015, 6 pages.
Invitation to Pay Additional Fees received for PCT Patent Application No. PCT/US2015/047507, mailed on Jan. 4, 2016, 8 pages.
Invitation to Pay Additional Fees received for PCT Patent Application No. PCT/US2015/047704, mailed on Dec. 16, 2015, 10 pages.
Invitation to Pay Additional Fees received for PCT Patent Application No. PCT/US2015/055165, mailed on Jan. 18, 2016, 6 pages.
Invitation to Pay Additional Fees received for PCT Patent Application No. PCT/US2020/026044, mailed on Jun. 25, 2020, 12 pages.
Invitation to Pay Additional Fees received for PCT Patent Application No. PCT/US2020/031536, mailed on Jul. 31, 2020, 9 pages.
Invitation to Pay Additional Fees received for PCT Patent Application No. PCT/US2020/035446, mailed on Sep. 11, 2020, 12 pages.
Invitation to Pay Search Fees received for European Patent Application No. 15753796.0, mailed on Mar. 24, 2020, 3 pages.
Itjungles, "iPhone 6: How to Pair with Another Bluetooth Device", Available Online at: https://www.youtube.com/watch?v=9setanYtHAk, Aug. 5, 2015, 3 pages.
Jean, "Our Pact Parental Control Review", Available online at: https://www.bewebsmart.com/parental-controls/our-pact-parental-control-review/, Jun. 25, 2016, 25 pages.
Ldinos, "Bejeweled Blitz—PC Game", Online available at: https://www.youtube.com/watch?v=8-p3FAxjKTs, Apr. 7, 2010, 1 page.
My Mate Vince, "Setting up the Fitbit Alta HR Activity Tracker on Apple iOS", Online available at: https://youtu.be/FdwRF4IfvFc, Jun. 18, 2017, 3 pages.
Non-Final Office Action received for U.S. Appl. No. 14/805,403, mailed on Nov. 16, 2017, 21 pages.
Non-Final Office Action received for U.S. Appl. No. 09/477,419, mailed on Apr. 17, 2002, 10 pages.
Non-Final Office Action received for U.S. Appl. No. 09/477,419, mailed on Apr. 22, 2003, 13 pages.
Non-Final Office Action received for U.S. Appl. No. 11/069,977, mailed on Aug. 9, 2011, 18 pages.
Non-Final Office Action received for U.S. Appl. No. 11/069,977, mailed on Jul. 31, 2009, 13 pages.
Non-Final Office Action received for U.S. Appl. No. 11/069,977, mailed on Oct. 4, 2010, 15 pages.
Non-Final Office Action received for U.S. Appl. No. 11/069,977, mailed on Sep. 19, 2008, 12 pages.
Non-Final Office Action received for U.S. Appl. No. 13/077,850, mailed on Mar. 28, 2013, 15 pages.
Non-Final Office Action received for U.S. Appl. No. 13/077,850, mailed on Sep. 10, 2015, 14 pages.
Non-Final Office Action received for U.S. Appl. No. 13/077,855, mailed on Aug. 13, 2015, 13 pages.
Office Action received for U.S. Appl. No. 13/077,862, mailed on Mar. 28, 2013, 15 pages.
Office Action received for U.S. Appl. No. 13/077,862, mailed on Dec. 29, 2014, 11 pages.
Office Action received for U.S. Appl. No. 13/077,862, mailed on Jul. 17, 2020, 20 pages.
Office Action received for U.S. Appl. No. 13/077,862, mailed on Mar. 15, 2013, 10 pages.
Office Action received for U.S. Appl. No. 13/077,862, mailed on Nov. 21, 2019, 18 pages.
Office Action received for U.S. Appl. No. 13/077,867, mailed on Dec. 21, 2012, 9 pages.
Office Action received for U.S. Appl. No. 13/077,867, mailed on Jul. 20, 2012, 10 pages.
Office Action received for U.S. Appl. No. 13/077,874, mailed on Jun. 19, 2014, 15 pages.
Office Action received for U.S. Appl. No. 14/641,287, mailed on Feb. 27, 2017, 18 pages.
Office Action received for U.S. Appl. No. 14/774,664, mailed on Mar. 7, 2017, 23 pages.
Office Action received for U.S. Appl. No. 14/839,897, mailed on May 18, 2017, 11 pages.
Office Action received for U.S. Appl. No. 14/839,903, mailed on Feb. 26, 2018, 10 pages.
Office Action received for U.S. Appl. No. 14/839,912, mailed on Feb. 26, 2019, 36 pages.
Office Action received for U.S. Appl. No. 14/839,912, mailed on Jun. 8, 2017, 26 pages.
Office Action received for U.S. Appl. No. 14/839,913, mailed on Jul. 28, 2016, 12 pages.
Office Action received for U.S. Appl. No. 14/839,913, mailed on Mar. 2, 2016, 11 pages.
Office Action received for U.S. Appl. No. 14/839,914, mailed on Oct. 19, 2017, 46 pages.
Office Action received for U.S. Appl. No. 14/863,099, mailed on Dec. 2, 2015, 12 pages.
Non-Final Office Action received for U.S. Appl. No. 14/864,011, mailed on Jan. 21, 2016, 10 pages.
Non-final Office Action received for U.S. Appl. No. 14/864,011, mailed on Jun. 10, 2016, 10 pages.
Non-Final Office Action received for U.S. Appl. No. 14/913,349, mailed on Apr. 2, 2019, 15 pages.
Non-Final Office Action received for U.S. Appl. No. 14/913,349, mailed on Apr. 22, 2020, 20 pages.
Non-Final Office Action received for U.S. Appl. No. 14/913,349, mailed on Jan. 2, 2020, 25 pages.
Non-Final Office Action received for U.S. Appl. No. 14/913,349, mailed on Jan. 11, 2018, 6 pages.
Non-Final Office Action received for U.S. Appl. No. 15/049,052, mailed on May 31, 2018, 15 pages.
Non-Final Office Action received for U.S. Appl. No. 15/049,052, mailed on Nov. 29, 2016, 13 pages.
Non-Final Office Action received for U.S. Appl. No. 15/049,052, mailed on Sep. 21, 2017, 14 pages.
Non-Final Office Action received for U.S. Appl. No. 15/268,115, mailed on Apr. 13, 2017, 44 pages.
Non-Final Office Action received for U.S. Appl. No. 15/418,537, mailed on Dec. 13, 2018, 53 pages.
Non-Final Office Action received for U.S. Appl. No. 15/433,238, mailed on Nov. 3, 2017, 6 pages.
Non-Final Office Action received for U.S. Appl. No. 16/130,838, mailed on Dec. 31, 2020, 29 pages.
Non-Final Office Action received for U.S. Appl. No. 16/130,838, mailed on Jan. 7, 2020, 16 pages.
Non-Final Office Action received for U.S. Appl. No. 16/144,264, mailed on May 1, 2020, 30 pages.
Non-Final Office Action received for U.S. Appl. No. 16/147,523, mailed on Dec. 27, 2019, 11 pages.
Non-Final Office Action received for U.S. Appl. No. 16/147,523, mailed on Jul. 21, 2021, 20 pages.
Non-Final Office Action received for U.S. Appl. No. 16/281,838, mailed on Mar. 26, 2020, 18 pages.
Non-Final Office Action received for U.S. Appl. No. 16/407,584, mailed on Jul. 10, 2019, 8 pages.
Non-Final Office Action received for U.S. Appl. No. 16/583,981, mailed on Dec. 6, 2019, 14 pages.
Non-Final Office Action received for U.S. Appl. No. 16/583,994, mailed on Dec. 23, 2020, 17 pages.
Non-Final Office Action received for U.S. Appl. No. 16/583,994, mailed on Dec. 30, 2019, 14 pages.
Non-Final Office Action received for U.S. Appl. No. 16/679,967, mailed on Sep. 2, 2021, 12 pages.
Non-Final Office Action received for U.S. Appl. No. 16/723,583, mailed on Aug. 13, 2020, 13 pages.
Non-Final Office Action received for U.S. Appl. No. 16/749,929, mailed on May 13, 2020, 11 pages.
Non-Final Office Action received for U.S. Appl. No. 16/775,528, mailed on Nov. 20, 2020, 15 pages.

(56) References Cited

OTHER PUBLICATIONS

Non-Final Office Action received for U.S. Appl. No. 16/775,528, mailed on Sep. 13, 2021, 14 pages.
Non-Final Office Action received for U.S. Appl. No. 17/041,350, mailed on Jun. 10, 2021, 24 pages.
Non-Final Office Action received for U.S. Appl. No. 13/077,874, mailed on Dec. 3, 2015, 23 pages.
Non-Final Office Action received for U.S. Appl. No. 14/839,912, mailed on Feb. 12, 2018, 30 pages.
Notice of Acceptance received for Australian Patent Application No. 2012209199, mailed on Jan. 27, 2016, 3 pages.
Notice of Acceptance received for Australian Patent Application No. 2014315324, mailed on Sep. 28, 2017, 3 pages.
Notice of Acceptance received for Australian Patent Application No. 2015385757, mailed on Jul. 16, 2018, 3 pages.
Notice of Acceptance received for Australian Patent Application No. 2016218318, mailed on Jul. 3, 2019, 3 pages.
Notice of Acceptance received for Australian Patent Application No. 2017276285, mailed on Apr. 3, 2019, 3 pages.
Notice of Acceptance received for Australian Patent Application No. 2017277851, mailed on Dec. 9, 2019, 3 pages.
Notice of Acceptance received for Australian Patent Application No. 2018247345, mailed on May 15, 2019, 3 pages.
Notice of Acceptance received for Australian Patent Application No. 2019206101, mailed on Dec. 11, 2020, 3 pages.
Notice of Acceptance received for Australian Patent Application No. 2020201723, mailed on May 6, 2021, 3 pages.
Notice of Acceptance received for Australian Patent Application No. 2020239670, mailed on Jul. 2, 2021, 3 pages.
Notice of Allowance received for Australian Patent Application No. 2016202837, mailed on Apr. 21, 2017, 3 pages.
Notice Of Allowance received for Chinese Patent Application No. 201280006317.5, mailed on Feb. 17, 2017, 2 pages (1 page of English Translation and 1 page of Official Copy).
Notice of Allowance received for Chinese Patent Application No. 201480060044.1, mailed on Mar. 29, 2019, 3 pages (1 page of English Translation and 2 pages of Official Copy).
Notice of Allowance received for Chinese Patent Application No. 201580046237.6, mailed on Aug. 29, 2018, 4 pages (1 page of English Translation and 3 pages of Official copy).
Notice of Allowance received for Chinese Patent Application No. 201580046331.1, mailed on Jun. 24, 2020, 4 pages (1 page of English Translation and 3 pages of Official Copy).
Notice of Allowance received for Chinese Patent Application No. 201580077218.X, mailed on Nov. 13, 2020, 2 pages (1 page of English Translation and 1 page of Official Copy).
Notice of Allowance received for Chinese Patent Application No. 201610084974.1, mailed on Aug. 5, 2019, 2 pages (1 page of English Translation and 1 page of Official Copy).
Notice of Allowance received for Chinese Patent Application No. 201710240907.9, mailed on Nov. 25, 2019, 2 pages (1 page of English Translation and 1 page of Official Copy).
Notice of Allowance received for Chinese Patent Application No. 201710657424.9, mailed on May 8, 2020, 2 pages (1 page of English Translation and 1 page of Official Copy).
Notice of Allowance received for Chinese Patent Application No. 201810321928.8, mailed on Sep. 11, 2019, 2 pages (1 page of English Translation and 1 page of Official Copy).
Notice of Allowance received for Chinese Patent Application No. 201910990432.4, mailed on Apr. 27, 2021, 2 pages (1 page of English Translation and 1 page of Official Copy).
Notice of Allowance received for Chinese Patent Application No. 201980036737.X, mailed on Apr. 20, 2021, 10 pages (5 pages of English Translation and 5 pages of Official Copy).
Notice of Allowance received for Danish Patent Application No. PA201570771, mailed on Sep. 2, 2016, 2 pages.
Notice of Allowance received for Danish Patent Application No. PA201570773 , mailed on Apr. 26, 2018, 2 pages.
Notice of Allowance received for Danish Patent Application No. PA201570776, mailed on Feb. 8, 2017, 2 pages.
Notice of Allowance received for Japanese Patent Application No. 2016-130565, mailed on Aug. 28, 2017, 3 pages (Official Copy Only) See Communication under 37 CFR § 1.98(a) (3).
Notice of Allowance received for Japanese Patent Application No. 2016-537946, mailed on Mar. 26, 2018, 4 pages (1 page of English Translation and 3 pages of Official Copy).
Notice of Allowance received for Japanese Patent Application No. 2017-545733, mailed on Jun. 1, 2018, 4 pages (1 page of English Translation and 3 pages of Official copy).
Notice of Allowance received for Japanese Patent Application No. 2018-083313, mailed on Jul. 1, 2019, 4 pages (1 page of English Translation and 3 pages of Official Copy).
Notice of Allowance received for Japanese Patent Application No. 2018-126311, mailed on Feb. 1, 2019, 4 pages (1 page of English Translation and 3 pages of Official copy).
Notice of Allowance received for Japanese Patent Application No. 2019-138053, mailed on Jul. 2, 2021, 4 pages (1 page of English Translation and 3 pages of Official Copy).
Notice of Allowance received for Japanese Patent Application No. 2020-551465, mailed on Jun. 28, 2021, 4 pages (1 page of English Translation and 3 pages of Official Copy).
Notice of Allowance received for Korean Patent Application No. 10-2013-7022057, mailed on Apr. 27, 2015, 2 pages (Official Copy only) See Communication under 37 CFR § 1.98(a) (3).
Notice of Allowance received for Korean Patent Application No. 10-2014-7033660, issued on Sep. 25, 2015, 3 pages (1 page of English Translation and 2 pages of Official Copy).
Notice of Allowance received for Korean Patent Application No. 10-2015-7013849, mailed on Mar. 28, 2016, 3 pages (1 page of English Translation and 2 pages of Official Copy).
Notice of Allowance received for Korean Patent Application No. 10-2016-7008449, mailed on Aug. 9, 2019, 6 pages (2 pages of English Translation and 4 pages of Official Copy).
Notice of Allowance received for Korean Patent Application No. 10-2016-7017508, issued on Apr. 27, 2017, 3 pages (1 page of English translation and 2 pages of Official Copy).
Notice of Allowance received for Korean Patent Application No. 10-2018-7010872, mailed on Feb. 10, 2020, 6 pages (2 pages of English Translation and 4 pages of Official Copy).
Notice of Allowance received for Korean Patent Application No. 10-2019-7007748, mailed on May 6, 2020, 5 pages (1 page of English Translation and 4 pages of Official Copy).
Notice of Allowance received for Korean Patent Application No. 10-2020-7022802, mailed on Mar. 4, 2021, 6 pages (2 pages of English Translation and 4 pages of Official Copy).
Notice of Allowance received for Taiwanese U.S. Appl. No. 13/077,862, issued on May 14, 2018, 5 pages (2 pages of English Translation and 3 pages of Official Copy).
Notice of Allowance received for Taiwanese U.S. Appl. No. 13/077,862, mailed on Oct. 18, 2017, 7 pages (Official Copy Only) See Communication under 37 CFR § 1.98(a) (3).
Notice of Allowance received for Taiwanese U.S. Appl. No. 13/077,862, mailed on Jun. 12, 2017, 3 pages (Official Copy Only) See Communication under 37 CFR § 1.98(a) (3).
Notice of Allowance received for Taiwanese U.S. Appl. No. 13/077,862, mailed on Oct. 1, 2018, 4 pages (1 pages of English Translation and 3 pages Official Copy).
Notice of Allowance received for Taiwanese U.S. Appl. No. 13/077,862, mailed on Mar. 27, 2017, 3 pages (Official Copy only) See Communication under 37 CFR § 1.98(a) (3).
Notice of Allowance received for Taiwanese U.S. Appl. No. 13/077,862, mailed on Nov. 30, 2017, 5 pages (2 pages of English Translation and 3 pages of Official Copy).
Notice of Allowance received for Taiwanese U.S. Appl. No. 13/077,862, mailed on Jan. 18, 2017, 3 pages (Official Copy only) See Communication under 37 CFR § 1.98(a) (3).
Notice of Allowance received for U.S. Appl. No. 13/077,862, mailed on May 19, 2005, 5 pages.
Notice of Allowance received for U.S. Appl. No. 13/077,862, mailed on Apr. 8, 2013, 16 pages.
Notice of Allowance received for U.S. Appl. No. 13/077,862, mailed on May 15, 2013, 13 pages.

(56) References Cited

OTHER PUBLICATIONS

Notice of Allowance received for U.S. Appl. No. 13/077,862, mailed on May 5, 2016, 15 pages.
Notice of Allowance received for U.S. Appl. No. 13/077,862, mailed on Jan. 30, 2017, 7 pages.
Notice of Allowance received for U.S. Appl. No. 13/077,862, mailed on Jun. 20, 2019, 9 pages.
Notice of Allowance received for U.S. Appl. No. 13/077,862, mailed on Sep. 20, 2019, 2 pages.
Notice of Allowance received for U.S. Appl. No. 13/077,867, mailed on Mar. 12, 2014, 7 pages.
Notice of Allowance received for U.S. Appl. No. 13/077,867, mailed on Sep. 18, 2013, 8 pages.
Notice of Allowance received for U.S. Appl. No. 13/077,874, mailed on Nov. 22, 2016, 13 pages.
Notice of Allowance received for U.S. Appl. No. 14/641,251, mailed on May 18, 2016, 13 pages.
Notice of Allowance received for U.S. Appl. No. 14/641,287, mailed on Jun. 28, 2018, 8 pages.
Notice of Allowance received for U.S. Appl. No. 14/805,403, mailed on Jul. 11, 2018, 15 pages.
Notice of Allowance received for U.S. Appl. No. 14/839,897, mailed on Jun. 8, 2018, 11 pages.
Notice of Allowance received for U.S. Appl. No. 14/839,903, mailed on Jan. 3, 2019, 7 pages.
Notice of Allowance received for U.S. Appl. No. 14/839,913, mailed on Aug. 11, 2016, 5 pages.
Notice of Allowance received for U.S. Appl. No. 14/839,914, mailed on Jun. 22, 2018, 12 pages.
Notice of Allowance received for U.S. Appl. No. 14/864,011, mailed on Apr. 28, 2016, 5 pages.
Notice of Allowance received for U.S. Appl. No. 14/864,011, mailed on Oct. 5, 2016, 5 pages.
Notice of Allowance received for U.S. Appl. No. 15/049,052, mailed on Sep. 16, 2019, 5 pages.
Notice of Allowance received for U.S. Appl. No. 15/268,115, mailed on Mar. 7, 2018, 15 pages.
Notice of Allowance received for U.S. Appl. No. 15/366,607, mailed on Apr. 2, 2019, 2 pages.
Notice of Allowance received for U.S. Appl. No. 15/366,607, mailed on Feb. 21, 2019, 9 pages.
Notice of Allowance received for U.S. Appl. No. 15/418,537, mailed on Apr. 6, 2020, 9 pages.
Notice of Allowance received for U.S. Appl. No. 15/433,238, mailed on May 17, 2018, 7 pages.
Notice of Allowance received for U.S. Appl. No. 15/930,300, mailed on Aug. 5, 2020, 14 pages.
Notice of Allowance received for U.S. Appl. No. 15/975,581, mailed on Oct. 3, 2018, 25 pages.
Notice of Allowance received for U.S. Appl. No. 16/130,838, mailed on Jun. 16, 2021, 12 pages.
Notice of Allowance received for U.S. Appl. No. 16/144,264, mailed on Nov. 16, 2020, 10 pages.
Notice of Allowance received for U.S. Appl. No. 16/281,838, mailed on Aug. 26, 2020, 9 pages.
Notice of Allowance received for U.S. Appl. No. 16/281,838, mailed on May 20, 2021, 9 pages.
Notice of Allowance received for U.S. Appl. No. 16/407,584, mailed on Oct. 28, 2019, 5 pages.
Notice of Allowance received for U.S. Appl. No. 16/583,981, mailed on Mar. 26, 2021, 10 pages.
Notice of Allowance received for U.S. Appl. No. 16/583,994, mailed on Jun. 24, 2021, 10 pages.
Notice of Allowance received for U.S. Appl. No. 16/749,929, mailed on Dec. 16, 2020, 2 pages.
Notice of Allowance received for U.S. Appl. No. 16/749,929, mailed on Nov. 4, 2020, 5 pages.
Notice of Allowance received for U.S. Appl. No. 16/867,002, mailed on Aug. 20, 2021, 12 pages.
Notice of Allowance received for U.S. Appl. No. 16/918,855, mailed on Apr. 6, 2021, 7 pages.
Nozawa Naoki et al., "iPad Perfect Manual for iOS 4", JPN, SOTEC Ltd., Yanagisawa Junichi, Dec. 31, 2010, pp. 189-190 (Official Copy Only) See Communication under 37 CFR § 1.98(a) (3).
Office Action received for Danish Patent Application No. PA201670595, mailed on Nov. 25, 2016, 9 pages.
Office Action received for Danish Patent Application No. PA201770794, mailed on Dec. 19, 2017, 8 pages.
Office Action received for Korean Patent Application No. 10-2018-7010872, mailed on Dec. 21, 2018, 7 pages (3 pages of English Translation and 4 pages of Official Copy).
Office Action received for Australian Patent Application No. 2012209199, issued on Jan. 15, 2015, 3 pages.
Office Action received for Australian Patent Application No. 2014315324, mailed on Aug. 8, 2017, 3 pages.
Office Action received for Australian Patent Application No. 2014315324, mailed on Oct. 21, 2016, 3 pages.
Office Action received for Australian Patent Application No. 2015385757, mailed on Sep. 11, 2017, 3 pages.
Office Action received for Australian Patent Application No. 2016100155, mailed on May 4, 2016, 7 pages.
Office Action received for Australian Patent Application No. 2016202837, mailed on Jan. 10, 2017, 2 pages.
Office Action received for Australian Patent Application No. 2016218318, mailed on Aug. 24, 2018, 5 pages.
Office Action received for Australian Patent Application No. 2016218318, mailed on Sep. 26, 2018, 3 pages.
Office Action received for Australian Patent Application No. 2017100207, mailed on Apr. 6, 2017, 4 pages.
Office Action received for Australian Patent Application No. 2017100207, mailed on Jul. 10, 2017, 3 pages.
Office Action received for Australian Patent Application No. 2017101561, mailed on Dec. 22, 2017, 4 pages.
Office Action received for Australian Patent Application No. 2017276285, mailed on Nov. 26, 2018, 2 pages.
Office Action received for Australian Patent Application No. 2017277851, mailed on Jul. 5, 2019, 3 pages.
Office Action received for Australian Patent Application No. 2018101076, mailed on Oct. 16, 2018, 5 pages.
Office Action received for Australian Patent Application No. 2018247345, mailed on May 6, 2019, 2 pages.
Office Action received for Australian Patent Application No. 2019206101, mailed on Jul. 14, 2020, 4 pages.
Office Action received for Australian Patent Application No. 2020201723, mailed on Feb. 4, 2021, 6 pages.
Office Action received for Australian Patent Application No. 2020239670, mailed on Mar. 3, 2021, 4 pages.
Office Action Received for Chinese Patent Application No. 201280006317.5, mailed on Jan. 11, 2016, 10 pages (5 pages of English Translation and 5 pages of official Copy).
Office Action received for Chinese Patent Application No. 201280006317.5, mailed on Jul. 11, 2016, 6 pages (1 page of English Translation and 5 pages of Official Copy).
Office Action received for Chinese Patent Application No. 201480060044.1, mailed on Jan. 26, 2018, 15 pages (5 pages of English translation and 10 pages of Official Copy).
Office Action received for Chinese Patent Application No. 201480060044.1, mailed on Sep. 25, 2018, 6 pages (3 pages of English translation and 3 pages of official copy).
Office Action received for Chinese Patent Application No. 201580046237.6, mailed on Feb. 6, 2018, 10 pages (5 pages of English Translation and 5 pages of Official Copy).
Office Action received for Chinese Patent Application No. 201580046331.1, mailed on Apr. 23, 2020, 15 pages (9 pages of English Translation and 6 pages of Official Copy).
Office Action received for Chinese Patent Application No. 201580046331.1, mailed on Aug. 2, 2019, 18 pages (6 pages of English Translation and 12 pages of Official Copy).
Office Action received for Chinese Patent Application No. 201580077218.X, mailed on Feb. 3, 2020, 23 pages (8 pages of English Translation and 15 pages of Official Copy).

(56) References Cited

OTHER PUBLICATIONS

Office Action received for Chinese Patent Application No. 201610084974.1, mailed on Dec. 5, 2018, 6 pages (3 pages of English Translation and 3 pages of Official Copy).
Office Action received for Chinese Patent Application No. 201610084974.1, mailed on May 3, 2018, 12 pages (5 pages of English Translation and 7 pages of Official Copy).
Office Action received for Chinese Patent Application No. 201620119869.2, mailed on Jun. 3, 2016, 2 pages (1 page of English Translation and 1 page of Official copy).
Office Action received for Chinese Patent Application No. 201620119869.2, mailed on Nov. 22, 2016, 2 pages (Official Copy only) See Communication under 37 CFR § 1.98(a) (3).
Office Action received for Chinese Patent Application No. 201710240907.9, mailed on Jun. 5, 2019, 10 pages (5 pages of English Translation and 5 pages of Official Copy).
Office Action received for Chinese Patent Application No. 201710657424.9, mailed on Sep. 17, 2019, 23 pages (11 pages of English Translation and 12 pages of Official Copy).
Office Action received for Chinese Patent Application No. 201810321928.8, mailed on Jul. 2, 2019, 10 pages (5 pages of English Translation and 5 pages of Official Copy).
Office Action received for Chinese Patent Application No. 201910990432.4, mailed on Dec. 28, 2020, 6 pages (3 pages of English Translation and 3 pages of Official Copy).
Office Action received for Chinese Patent Application No. 201910990432.4, mailed on May 18, 2020, 15 pages (9 pages of English Translation and 6 pages of Official Copy).
Office Action received for Danish Patent Application No. PA201570664, mailed on Dec. 14, 2016, 2 pages.
Office Action received for Danish Patent Application No. PA201570664, mailed on Jun. 3, 2016, 3 pages.
Office Action received for Danish Patent Application No. PA201570664, mailed on Mar. 15, 2016, 10 pages.
Office Action received for Danish Patent Application No. PA201570771, mailed on Jun. 13, 2016, 3 pages.
Office Action received for Danish Patent Application No. PA201570771, mailed on Mar. 17, 2016, 8 pages.
Office Action received for Danish Patent Application No. PA201570773, mailed on Aug. 28, 2017, 3 pages.
Office Action received for Danish Patent Application No. PA201570773, mailed on Feb. 15, 2017, 3 pages.
Office Action Received for Danish Patent Application No. PA201570773, mailed on Mar. 18, 2016, 9 pages.
Office Action received for Danish Patent Application No. PA201570773, mailed on Sep. 12, 2016, 3 pages.
Office Action received for Danish Patent Application No. PA201570776, mailed on Aug. 19, 2016, 3 pages.
Office Action received for Danish Patent Application No. PA201570776, mailed on Jan. 26, 2016, 12 pages.
Office Action received for Danish Patent Application No. PA201570781, mailed on Aug. 19, 2016, 3 pages.
Office Action received for Danish Patent Application No. PA201570788, mailed on Apr. 8, 2016, 11 pages.
Office Action received for Danish Patent Application No. PA201570788, mailed on Sep. 13, 2016, 3 pages.
Office action received for Danish Patent Application No. PA201570791, mailed on Apr. 6, 2016, 12 pages.
Office action received for Danish Patent Application No. PA201570791, mailed on Sep. 6, 2016, 4 pages.
Office Action received for Danish Patent Application No. PA201670074, mailed on Apr. 7, 2016, 8 pages.
Office Action received for Danish Patent Application No. PA201670074, mailed on Jun. 28, 2016, 5 pages.
Office Action received for Danish Patent Application No. PA201670074, mailed on Mar. 16, 2017, 2 pages.
Office Action received for Danish Patent Application No. PA201670117, mailed on Jan. 12, 2017, 3 pages.
Office Action received for Danish Patent Application No. PA201670117, mailed on Jun. 13, 2016, 10 pages.
Office Action received for Danish Patent Application No. PA201670595, mailed on Aug. 23, 2018, 5 pages.
Office Action received for Danish Patent Application No. PA201670595, mailed on May 31, 2017, 3 pages.
Office Action received for Danish Patent Application No. PA201670595, mailed on Nov. 30, 2017, 4 pages.
Office Action received for Danish Patent Application No. PA201770103, mailed on Dec. 11, 2018, 2 pages.
Office Action received for Danish Patent Application No. PA201770103, mailed on Jan. 16, 2018, 2 pages.
Office Action received for Danish Patent Application No. PA201770794, mailed on Apr. 5, 2018, 4 pages.
Office Action received for Danish Patent Application No. PA201770794, mailed on Jun. 13, 2019, 2 pages.
Office Action received for Danish Patent Application No. PA201770794, mailed on Oct. 30, 2018, 3 pages.
Office Action received for Danish Patent Application No. PA201970533, mailed on Apr. 20, 2021, 2 pages.
Office Action received for Danish Patent Application No. PA201970533, mailed on Jul. 17, 2020, 6 pages.
Office Action received for Danish Patent Application No. PA202070609, mailed on Dec. 10, 2020, 8 pages.
Office Action received for Danish Patent Application No. PA202070610, mailed on Jun. 18, 2021, 8 pages.
Office Action received for European Patent Application No. 14772001.5, mailed on Feb. 14, 2018, 5 pages.
Office Action received for European Patent Application No. 14772001.5, mailed on May 30, 2017, 10 pages.
Office Action received for European Patent Application No. 15712218.5, mailed on Aug. 3, 2017, 4 pages.
Office Action received for European Patent Application No. 15753796.0, mailed on Aug. 4, 2020, 9 pages.
Office Action received for European Patent Application No. 15787091.6, mailed on Aug. 2, 2019, 8 pages.
Office Action received for European Patent Application No. 15787091.6, mailed on Oct. 8, 2018, 7 pages.
Office Action received for European Patent Application No. 16708003.5, mailed on Feb. 22, 2021, 10 pages.
Office Action received for European Patent Application No. 17184710.6, mailed on Dec. 21, 2018, 7 pages.
Office Action received for European Patent Application No. 17810739.7, mailed on Nov. 25, 2020, 4 pages.
Office Action received for European Patent Application No. 19199004.3, mailed on Nov. 22, 2019, 10 pages.
Office Action received for European Patent Application No. 20192404.0, mailed on Dec. 2, 2020, 8 pages.
Office Action received for European Patent Application No. 20192404.0, mailed on Jun. 8, 2021, 7 pages.
Office Action received for European Patent Application No. 20217518.8, mailed on Apr. 30, 2021, 8 pages.
Office Action received for Indian Patent Application No. 201617008296, mailed on Jan. 14, 2020, 7 pages.
Office Action received for Japanese Patent Application No. 2013-550664, mailed on Jun. 10, 2016, 3 pages (Official Copy only) See Communication under 37 CFR § 1.98(a) (3).
Office Action received for Japanese Patent Application No. 2013-550664, mailed on Aug. 24, 2015, 9 pages (4 pages of English Translation and 5 pages of Official Copy).
Office Action received for Japanese Patent Application No. 2013-550664, mailed on Sep. 12, 2014, 10 pages (6 pages of English Translation and 4 pages of Official Copy).
Office Action received for Japanese Patent Application No. 2016-537946, mailed on Aug. 7, 2017, 8 pages (4 pages of English Translation and 4 pages of Official Copy).
Office Action received for Japanese Patent Application No. 2016-537946, mailed on Jan. 30, 2017, 12 pages (6 pages of English Translation and 6 pages of Official Copy).
Office Action received for Japanese Patent Application No. 2017-545733, mailed on Feb. 13, 2018, 7 pages (3 pages of English Translation and 4 pages of Official Copy).
Office Action received for Japanese Patent Application No. 2018-083313, mailed on Feb. 12, 2019, 4 pages (2 pages of English Translation and 2 pages of Official Copy).

(56) References Cited

OTHER PUBLICATIONS

Office Action received for Japanese Patent Application No. 2018-126311, mailed on Nov. 2, 2018, 4 pages (2 pages of English Translation and 2 pages of official copy).
Office Action received for Japanese Patent Application No. 2019-138053, mailed on Oct. 2, 2020, 6 pages(3 pages of English Translation and 3 pages of Official Copy).
Office Action received for Korean Patent Application No. 10-2013-7022057, mailed on May 28, 2014, 7 pages (3 pages of English Translation and 4 pages of Official Copy).
Office Action received for Korean Patent Application No. 10-2014-7033660, mailed on Feb. 23, 2015, 3 pages (Official Copy only) See Communication under 37 CFR § 1.98(a) (3).
Office Action received for Korean Patent Application No. 10-2015-7013849, mailed on Aug. 20, 2015, 5 pages (2 pages of English Translation and 3 pages of Official Copy).
Office Action received for Korean Patent Application No. 10-2016-7008449, mailed on Jan. 12, 2017, 15 pages (6 pages of English translation and 9 pages of official Copy).
Office Action received for Korean Patent Application No. 10-2016-7008449, mailed on Jan. 16, 2018, 10 pages ( 5 pages of English Translation and 5 pages of Official Copy).
Office Action received for Korean Patent Application No. 10-2016-7008449, mailed on Nov. 27, 2017, 6 pages (3 pages of English Translation and 3 pages of Official Copy).
Office Action received for Korean Patent Application No. 10-2016-7017508, mailed on Oct. 20, 2016, 5 pages (2 pages of English Translation and 3 pages of Official Copy).
Office Action received for Korean Patent Application No. 10-2018-7010872, mailed on May 21, 2018, 10 pages (4 pages of English Translation and 6 pages of Official Copy).
Office Action received for Korean Patent Application No. 10-2019-7007748, mailed on Nov. 15, 2019, 9 pages ( 3 pages of English Translation and 6 pages of Official Copy).
Office Action received for Korean Patent Application No. 10-2020-7022802, mailed on Aug. 28, 2020, 7 pages (2 pages of English Translation and 5 pages of Official Copy).
Office Action received for Korean Patent Application No. 10-2020-7028759, mailed on Jun. 29, 2021, 12 pages (5 pages of English Translation and 7 pages of Official Copy).
Office Action received for Korean Patent Application No. 10-2021-7017259, mailed on Jul. 19, 2021, 10 pages (4 pages of English Translation and 6 pages of Official Copy).
Office Action received for Korean Patent Application No. 10-2018-7010872, mailed on Feb. 13, 2019, 7 pages (3 pages of English Translation and 4 pages of Official Copy).
Office Action received for Taiwanese Patent Application No. 103130517, issued on Feb. 6, 2018, 5 pages (2 pages of English Translation and 3 pages of Official Copy).
Office Action received for Taiwanese Patent Application No. 103130517, issued on Feb. 22, 2016, 7 pages (3 pages of English Translation and 4 pages of Official Copy).
Office Action received for Taiwanese Patent Application No. 103130517, issued on Jul. 29, 2016, 7 pages (3 pages of English Translation and 4 pages of Official Copy).
Office Action received for Taiwanese Patent Application No. 104107317, mailed on Mar. 28, 2017., 39 pages (11 pages of English Translation and 28 pages of Official Copy).
Office Action received for Taiwanese Patent Application No. 104107329, mailed on Jul. 24, 2020, 7 pages (3 pages of English Translation and 4 pages of Official Copy).
Office Action received for Taiwanese Patent Application No. 104107329, mailed on Mar. 5, 2020, 22 pages (9 pages of English Translation and 13 pages of Official Copy).
Office Action received for Taiwanese Patent Application No. 104123593, mailed on May 24, 2016, 57 pages (26 pages of English Translation and 31 pages of Official Copy).
Office Action received for Taiwanese Patent Application No. 104123593, mailed on Sep. 13, 2016, 8 pages (3 pages of English Translation and 5 pages of Official Copy).
Office Action received for Taiwanese Patent Application No. 104128700, mailed on Aug. 31, 2016, 13 pages (6 pages of English Translation and 7 pages of Official Copy).
Office Action received for Taiwanese Patent Application No. 104128701, issued on Jul. 22, 2016, 25 pages (9 pages of English Translation and 16 pages of Official Copy).
Office Action received for Taiwanese Patent Application No. 104128701, mailed on Mar. 16, 2017., 8 pages (3 pages of English Translation and 5 pages of Official Copy).
Office Action received for Taiwanese Patent Application No. 104133756, issued on May 17, 2017, 13 pages (6 pages of English Translation and 7 pages of Official Copy).
Office Action received for Taiwanese Patent Application No. 104133757, issued on Jul. 6, 2016, 22 pages (9 pages of English Translation and 13 pages of Official Copy).
Office Action received for Taiwanese Patent Application No. 104107328, mailed on Dec. 28, 2016., 4 pages (1 page of Search Report and 3 pages of Official Copy).
Office Action Report received for Australian Patent Application No. 2012209199, mailed on Dec. 17, 2015, 3 pages.
Patel Amit, "Amit's Thoughts on Grids", Available online at: http://www-cs-students.stanford.edu/~amitp/game-programming/grids/, Jan. 9, 2006, 22 pages.
Patel Amit, "Hexagonal Grids", Available online at: http://www.redblobgames.com/grids/hexagons/, 2013, 36 pages.
PlayMemories Camera Apps, "PlayMemories Camera Apps Help Guide", available at: https://www.playmemoriescameraapps.com/portal/manual/IS9104-NPIA09014_00-F00002/en/index.html, 2012, 3 pages.
Qualcomm Toq—smartwatch—User Manual, Available Online at: https://toq.qualcomm.com/sites/default/files/qualcomm_toq_user_manual.pdf [retrieved on Jun. 25, 2015], Nov. 27, 2013, pp. 1-38.
Remote Shot for SmartWatch 2, Available online at: https://play.google.com/store/apps/details?id=net.watea.sw2.rshot&hl=en, Nov. 21, 2017, 3 pages.
Result of Consultation received for European Patent Application No. 17184710.6, mailed on Feb. 21, 2020, 6 pages.
Result of Consultation received for European Patent Application No. 17184710.6, mailed on Feb. 28, 2020, 3 pages.
Search Report and Opinion received for Danish Patent Application No. PA201970533, mailed on Oct. 25, 2019, 9 pages.
Search Report and Opinion received for Danish Patent Application No. PA202070610, mailed on Jan. 8, 2021, 9 pages.
Search Report received for Danish Patent Application No. PA201570781, mailed on Mar. 8, 2016, 10 pages.
Search Report received for Danish Patent Application No. PA201770103, mailed on Jun. 9, 2017, 9 pages.
Shestopalyuk Ruslan, "Hexagonal grid math", Feb. 15, 2011, 7 pages.
Summons to Attend Oral Proceedings received for European Patent Application No. 14772001.5, mailed on Nov. 14, 2018, 5 pages.
Summons to Attend Oral Proceedings received for European Patent Application No. 14772001.5, mailed on Oct. 4, 2018, 15 pages.
Summons to Attend Oral Proceedings received for European Patent Application No. 17184710.6, mailed on Sep. 17, 2019, 7 pages.
Supplemental Notice of Allowance received for U.S. Appl. No. 14/805,403, mailed on Oct. 4, 2018, 3 pages.
Supplemental Notice of Allowance received for U.S. Appl. No. 15/433,238, mailed on Jun. 20, 2018, 2 pages.
Supplemental Notice of Allowance received for U.S. Appl. No. 16/130,838, mailed on Jun. 28, 2021, 2 pages.
Supplemental Notice of Allowance received for U.S. Appl. No. 16/867,002, mailed on Sep. 9, 2021, 2 pages.
Techsmith, "Snagit® 11 Snagit 11.4 Help", available at: http://assets.techsmith.com/Downloads/ua-tutorials-snagit-11/Snagit_11.pdf, Jan. 2014, 146 pages.
The Window Club, "How to Set GIF as Background Windows 7", Online Available at: https://www.youtube.com/watch?v=tUec42Qd7ng, Dec. 24, 2012, pp. 1-5.
Walker Alissa, "Apple Watch's Walking Directions Buzz Your Wrist When It's Time to Turn", available online at: http://gizmodo.com/apple-watch-will-give-you-a-buzz-when-its-time-to-turn-1632557384, Sep. 9, 2014, 2 pages.

(56) References Cited

OTHER PUBLICATIONS

Wearablezone, "How To Set Up Your Fitbit Profile", Online available at: https://youtu.be/jsWPtcDWiJM, Jun. 6, 2016, 3 pages.
Wolfe Joanna, "Annotation Technologies: A Software and Research Review", Computers and Composition, vol. 19, No. 4, 2002, pp. 471-497.
Xdream, "TickTalk Video User Manual", YouTube [online] [video], Online available at: https://youtu.be/jYhq3DwmVzo, Mar. 17, 2017, 3 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at: http://www.xperiablog.net/2014/06/13/action-camera-extension-gives-smartwatchsmartband-owners-ability-to-control-sony-wireless-cameras/, Jun. 13, 2014, 10 pages.
Applicant-Initiated Interview Summary received for U.S. Appl. No. 16/775,528, mailed on Jan. 13, 2022, 4 pages.
Notice of Acceptance received for Australian Patent Application No. 2020285524, mailed on Dec. 17, 2021, 3 pages.
Notice of Allowance received for Korean Patent Application No. 10-2021-7039234, mailed on Dec. 20, 2021, 4 pages (1 page of English Translation and 3 pages of Official Copy).
Office Action received for Chinese Patent Application No. 201910447678.7, mailed on Nov. 29, 2021, 17 pages (7 pages of English Translation and 10 pages of Official Copy).
Corrected Notice of Allowance received for U.S. Appl. No. 14/913,349, mailed on Sep. 1, 2022, 2 pages.
Notice of Allowance received for Japanese Patent Application No. 2022-102840, mailed on Aug. 19, 2022, 4 pages (1 page of English Translation and 3 pages of Official Copy).
Office Action received for Chinese Patent Application No. 202111612841.4, mailed on Jul. 22, 2022, 13 pages (7 pages of English Translation and 6 pages of Official Copy).
Office Action received for Japanese Patent Application No. 2021-126843, mailed on Aug. 29, 2022, 6 pages (3 pages of English Translation and 3 pages of Official Copy).
Supplemental Notice of Allowance received for U.S. Appl. No. 16/147,523, mailed on Aug. 23, 2022, 2 pages.
Applicant-Initiated Interview Summary received for U.S. Appl. No. 17/314,948, mailed on Oct. 21, 2022, 6 pages.
Notice of Allowance received for U.S. Appl. No. 16/679,967, mailed on Nov. 2, 2022, 7 pages.
Notice of Allowance received for U.S. Appl. No. 17/188,228, mailed on Oct. 19, 2022, 6 pages.
Non-Final Office Action received for U.S. Appl. No. 17/508,894, mailed on Dec. 15, 2022, 10 pages.
Non-Final Office Action received for U.S. Appl. No. 17/509,356, mailed on Dec. 22, 2022, 16 pages.
Summons to Attend Oral Proceedings received for European Patent Application No. 16708003.5, mailed on Dec. 13, 2022, 11 pages.
Notice of Acceptance received for Australian Patent Application No. 2021250863, mailed on Jan. 13, 2023, 3 pages.
Notice of Allowance received for Chinese Patent Application No. 202111612841.4, mailed on Jan. 5, 2023, 3 pages (2 pages of English Translation and 1 page of Official Copy).
Notice of Allowance received for Japanese Patent Application No. 2021-126843, mailed on Jan. 6, 2023, 4 pages (1 page of English Translation and 3 pages of Official Copy).
Notice of Allowance received for Japanese Patent Application No. 2022-139320, mailed on Jan. 6, 2023, 4 pages (1 page of English Translation and 3 pages of Official Copy).
Applicant-Initiated Interview Summary received for U.S. Appl. No. 17/188,228, mailed on Sep. 23, 2022, 2 pages.
Notice of Allowance received for U.S. Appl. No. 17/349,226, mailed on Sep. 20, 2022, 7 pages.
Notice of Hearing received for Indian Patent Application No. 201617008296, mailed on Sep. 11, 2022, 3 pages.
Corrected Notice of Allowance received for U.S. Appl. No. 14/913,349, mailed on Nov. 3, 2022, 2 pages.
Office Action received for Chinese Patent Application No. 201780034059.4, mailed on Oct. 9, 2022, 11 pages (5 pages of English Translation and 6 pages of Official Copy).
Applicant-Initiated Interview Summary received for U.S. Appl. No. 14/913,349, mailed on Oct. 12, 2022, 2 pages.
Corrected Notice of Allowance received for U.S. Appl. No. 14/913,349, mailed on Oct. 3, 2022, 3 pages.
Notice of Allowance received for U.S. Appl. No. 16/147,523, mailed on Oct. 4, 2022, 8 pages.
Office Action received for Australian Patent Application No. 2021250863, mailed on Oct. 6, 2022, 6 pages.
Office Action received for Chinese Patent Application No. 202080039642.6, mailed on Sep. 5, 2022, 12 pages (6 pages of English Translation and 6 pages of Official Copy).
Office Action received for European Patent Application No. 20720310.0, mailed on Oct. 4, 2022, 9 pages.
Record of Oral Hearing received for U.S. Appl. No. 14/913,349 mailed on Sep. 23, 2022, 12 pages.
Notice of Allowance received for U.S. Appl. No. 16/147,523, mailed on Nov. 28, 2022, 8 pages.
Intention to Grant received for European Patent Application No. 19722280.5, mailed on Sep. 26, 2023, 9 pages.
Intention to Grant received for European Patent Application No. 20729346.5, mailed on Jul. 10, 2023, 9 pages.
Minutes of the Oral Proceedings received for European Patent Application No. 20729346.5, mailed on Jul. 4, 2023, 6 pages.
Non-Final Office Action received for U.S. Appl. No. 17/746,807, mailed on Jul. 20, 2023, 14 pages.
Non-Final Office Action received for U.S. Appl. No. 17/975,141, mailed on Jul. 6, 2023, 22 pages.
Applicant-Initiated Interview Summary received for U.S. Appl. No. 17/975,141, mailed on Aug. 30, 2023, 4 pages.
International Search Report and Written Opinion received for PCT Patent Application No. PCT/US2023/012260, mailed on Aug. 2, 2023, 22 pages.
Invitation to Pay Additional Fees and Partial International Search Report received for PCT Patent Application No. PCT/US2023/012260, mailed on Jun. 7, 2023, 11 pages.
Office Action received for Australian Patent Application No. 2022235585, mailed on Jul. 27, 2023, 4 pages.
Applicant Initiated Interview Summary received for U.S. Appl. No. 17/746,807, mailed on Jun. 9, 2023, 2 pages.
Corrected Notice of Allowance received for U.S. Appl. No. 17/509,356, mailed on Jun. 13, 2023, 2 pages.
Intention to Grant received for European Patent Application No. 16708003.5, mailed on Jun. 14, 2023, 9 pages.
Corrected Notice of Allowance received for U.S. Appl. No. 17/509,356, mailed on May 24, 2023, 2 pages.
Notice of Acceptance received for Australian Patent Application No. 2022204555, mailed on May 11, 2023, 3 pages.
Notice of Allowance received for U.S. Appl. No. 17/349,226, mailed on May 24, 2023, 7 pages.
Summons to Oral Proceedings received for European Patent Application No. 17184710.6, mailed on May 10, 2023, 3 pages.
Brief Communication regarding Oral Proceedings received for European Patent Application No. 16708003.5, mailed on May 8, 2023, 1 page.
Final Office Action received for U.S. Appl. No. 17/746,807, mailed on Apr. 26, 2023, 16 pages.
Office Action received for European Patent Application No. 20720310.0, mailed on Jul. 25, 2023, 11 pages.
Non-Final Office Action received for U.S. Appl. No. 17/878,792, mailed on Jun. 23, 2023, 19 pages.
Result of Consultation received for European Patent Application No. 20729346.5, mailed on Jun. 21, 2023, 3 pages.
Applicant-Initiated Interview Summary received for U.S. Appl. No. 18/088,309, mailed on Oct. 27, 2023, 2 pages.
Decision to Grant received for European Patent Application No. 16708003.5, mailed on Oct. 19, 2023, 2 pages.
Applicant Initiated Interview Summary received for U.S. Appl. No. 17/508,894, mailed on Mar. 10, 2023, 4 pages.

(56) References Cited

OTHER PUBLICATIONS

Applicant Initiated Interview Summary received for U.S. Appl. No. 17/746,807, mailed on Mar. 31, 2023, 2 pages.
Applicant-Initiated Interview Summary received for U.S. Appl. No. 17/509,356, mailed on Feb. 3, 2023, 3 pages.
Final Office Action received for U.S. Appl. No. 17/314,948, mailed on Mar. 7, 2023, 31 pages.
International Search Report and Written Opinion received for PCT Patent Application No. PCT/US2022/044236, mailed on Mar. 27, 2023, 17 pages.
Non-Final Office Action received for U.S. Appl. No. 17/349,226, mailed on Mar. 16, 2023, 9 pages.
Non-Final Office Action received for U.S. Appl. No. 17/746,807, mailed on Feb. 2, 2023, 14 pages.
Notice of Allowance received for Chinese Patent Application No. 201780034059.4, mailed on Feb. 19, 2023, 2 pages (1 page of English Translation and 1 page of Official Copy).
Notice of Allowance received for Chinese Patent Application No. 202080039642.6, mailed on Apr. 17, 2023, 6 pages (2 pages of English Translation and 4 pages of Official Copy).
Notice of Allowance received for U.S. Appl. No. 17/188,228, mailed on Feb. 1, 2023, 5 pages.
Notice of Allowance received for U.S. Appl. No. 17/508,894, mailed on Apr. 19, 2023, 19 pages.
Notice of Allowance received for U.S. Appl. No. 17/509,356, mailed on Apr. 7, 2023, 11 pages.
Office Action received for Australian Patent Application No. 2022204555, mailed on Feb. 17, 2023, 5 pages.
Office Action received for European Patent Application No. 17810739.7, mailed on Feb. 17, 2023, 8 pages.
Office Action received for European Patent Application No. 20720310.0, mailed on Apr. 11, 2023, 8 pages.
Result of Consultation received for European Patent Application No. 16708003.5, mailed on Apr. 18, 2023, 9 pages.
Summons to Attend Oral Proceedings received for European Patent Application No. 20729346.5, mailed on Jan. 23, 2023, 11 pages.
Han Sangwoo, "AR Glasses interaction prototype", Available Online at: https://sangwoohan.cargo.site/AR-Glasses-interaction-prototype, Oct. 2020, 4 pages.
Applicant-Initiated Interview Summary received for U.S. Appl. No. 17/878,792, mailed on Sep. 8, 2023, 4 pages.
Non-Final Office Action received for U.S. Appl. No. 18/088,309, mailed on Sep. 21, 2023, 11 pages.
Office Action received for European Patent Application No. 20746429.8, mailed on Sep. 20, 2023, 10 pages.
Applicant-Initiated Interview Summary received for U.S. Appl. No. 17/746,807, mailed on Nov. 3, 2023, 2 pages.
Decision to Grant received for European Patent Application No. 20729346.5, mailed on Nov. 16, 2023, 2 pages.
International Search Report and Written Opinion received for PCT Patent Application No. PCT/US2023/022410, mailed on Aug. 31, 2023, 21 pages.
Non-Final Office Action received for U.S. Appl. No. 18/122,625, mailed on Nov. 15, 2023, 14 pages.
Office Action received for Australian Patent Application No. 2023201920, mailed on Nov. 10, 2023, 2 pages.
Office Action received for Japanese Patent Application No. 2022-149476, mailed on Nov. 2, 2023, 9 pages (4 pages of English Translation and 5 pages of Official Copy).
Applicant-Initiated Interview Summary received for U.S. Appl. No. 18/122,625, mailed on Jan. 19, 2024, 2 pages.
Final Office Action received for U.S. Appl. No. 17/878,792, mailed on Jan. 8, 2024, 23 pages.
Final Office Action received for U.S. Appl. No. 18/088,309, mailed on Jan. 9, 2024, 13 pages.
Intention to Grant received for European Patent Application No. 15753796.0, mailed on Jan. 12, 2024, 9 pages.
Notice of Hearing received for Indian Patent Application No. 202018015998, mailed on Dec. 15, 2023, 3 pages.
Notice of Hearing received for Indian Patent Application No. 202018016000, mailed on Dec. 15, 2023, 3 pages.
Summons to Attend Oral Proceedings received for European Patent Application No. 20720310.0, mailed on Jan. 3, 2024, 12 pages.
Non-Final Office Action received for U.S. Appl. No. 17/950,823, mailed on Dec. 18, 2023, 13 pages.
Notice of Allowance received for U.S. Patent Application No. 17/975, 141, mailed on Dec. 7, 2023, 10 pages.
Applicant-Initiated Interview Summary received for U.S. Appl. No. 17/950,823, mailed on Feb. 9, 2024, 4 pages.
Decision to Grant received for European Patent Application No. 19722280.5, mailed on Feb. 1, 2024, 2 pages.
Non-Final Office Action received for U.S. Appl. No. 18/197,681, mailed on Jan. 30, 2024, 32 pages.
Office Action received for Chinese Patent Application No. 202211558100.7, mailed on Jan. 8, 2024, 12 pages (6 pages of English Translation and 6 pages of Official Copy).
Applicant-Initiated Interview Summary received for U.S. Appl. No. 18/228,597, mailed on Aug. 8, 2024, 4 pages.
Final Office Action received for U.S. Appl. No. 18/088,309, mailed on Aug. 1, 2024, 16 pages.
"Mercedes-Benz Command Operating Instructions Manual", Online available at: https://www.mbusa.com/content/dam/mb-nafta/us/owners/manuals/2012/audio-and-comand/MY12_SLK_C_E_CLS_M_COMAND.pdf, 2012, 234 pages.
Notice of Allowance received for Japanese Patent Application No. 2022-149476, mailed on Aug. 2, 2024, 4 pages (1 page of English Translation and 3 pages of Official Copy).
Office Action received for Australian Patent Application No. 2022235585, mailed on Jul. 25, 2024, 5 pages.
Office Action received for Chinese Patent Application No. 202010941320.2, mailed on Jun. 26, 2024, 15 pages (5 pages of English Translation and 10 pages of Official Copy).
Supplemental Notice of Allowance received for U.S. Appl. No. 17/975,141, mailed on Aug. 12, 2024, 2 pages.
Advisory Action received for U.S. Appl. No. 18/197,681, mailed on Aug. 21, 2024, 5 pages.
Applicant-Initiated Interview Summary received for U.S. Appl. No. 18/088,309, mailed on Aug. 27, 2024, 2 pages.
International Preliminary Report on Patentability received for PCT Patent Application No. PCT/US2023/012260, mailed on Aug. 22, 2024, 15 pages.
Final Office Action received for U.S. Appl. No. 18/197,681, mailed on Jun. 27, 2024, 30 pages.
Non-Final Office Action received for U.S. Appl. No. 18/228,597, mailed on Jul. 8, 2024, 17 pages.
Notice of Allowance received for U.S. Appl. No. 17/746,807, mailed on Jul. 3, 2024, 23 pages.
Notice of Allowance received for U.S. Appl. No. 18/122,625, mailed on Jun. 21, 2024, 7 pages.
Applicant-Initiated Interview Summary received for U.S. Appl. No. 18/088,309, mailed on Jun. 7, 2024, 2 pages.
Intention to Grant received for European Patent Application No. 15753796.0, mailed on Jun. 5, 2024, 8 pages.
Intention to Grant received for European Patent Application No. 20720310.0, mailed on Jun. 13, 2024, 13 pages.
Minutes of the Oral Proceedings received for European Patent Application No. 20720310.0, mailed on Jun. 7, 2024, 7 pages.
Notice of Allowance received for U.S. Appl. No. 17/878,792, mailed on Jun. 5, 2024, 10 pages.
Office Action received for Indian Patent Application No. 202218027229, mailed on Jun. 13, 2024, 8 pages.
Result of Consultation received for European Patent Application No. 20720310.0, mailed on Jun. 4, 2024, 3 pages.
Applicant-Initiated Interview Summary received for U.S. Appl. No. 17/746,807, mailed on May 21, 2024, 2 pages.
Applicant-Initiated Interview Summary received for U.S. Appl. No. 18/122,625, mailed on May 22, 2024, 2 pages.
Minutes of the Oral Proceedings received for European Patent Application No. 17184710.6, mailed on May 22, 2024, 4 pages.
Office Action received for Chinese Patent Application No. 202010941320.2, mailed on Apr. 19, 2024, 18 pages (7 pages of English Translation and 11 pages of Official Copy).

(56) References Cited

OTHER PUBLICATIONS

Applicant-Initiated Interview Summary received for U.S. Appl. No. 17/878,792, mailed on Mar. 8, 2024, 3 pages.
Applicant-Initiated Interview Summary received for U.S. Appl. No. 18/088,309, mailed on Feb. 28, 2024, 2 pages.
Applicant-Initiated Interview Summary received for U.S. Appl. No. 18/197,681, mailed on Mar. 18, 2024, 4 pages.
Communication for Board of Appeal received for European Patent Application No. 17184710.6, mailed on Feb. 29, 2024, 13 pages.
Final Office Action received for U.S. Appl. No. 17/746,807, mailed on Feb. 20, 2024, 24 pages.
Final Office Action received for U.S. Appl. No. 17/950,823, mailed on May 7, 2024, 18 pages.
Final Office Action received for U.S. Appl. No. 18/122,625, mailed on Apr. 5, 2024, 12 pages.
International Preliminary Report on Patentability received for PCT Patent Application No. PCT/US2022/044236, mailed on Apr. 4, 2024, 12 pages.
Non-Final Office Action received for U.S. Appl. No. 18/088,309, mailed on Apr. 9, 2024, 14 pages.
Notice of Acceptance received for Australian Patent Application No. 2023201920, mailed on Feb. 9, 2024, 3 pages.
Notice of Allowance received for Chinese Patent Application No. 202010940700.4, mailed on Apr. 23, 2024, 4 pages (1 page of English Translation and 3 pages of Official Copy).
Notice of Allowance received for Chinese Patent Application No. 202211558100.7, mailed on Mar. 29, 2024, 3 pages (2 pages of English Translation and 1 page of Official Copy).
Notice of Allowance received for U.S. Appl. No. 17/975,141, mailed on Apr. 29, 2024, 9 pages.
Office Action received for Australian Patent Application No. 2022235585, mailed on Feb. 27, 2024, 5 pages.
Office Action received for Chinese Patent Application No. 202010940700.4, mailed on Dec. 8, 2023, 11 pages (5 pages of English Translation and 6 pages of Official Copy).
Office Action received for Chinese Patent Application No. 202010941320.2, mailed on Dec. 12, 2023, 18 pages (7 pages of English Translation and 11 pages of Official Copy).
Office Action received for Chinese Patent Application No. 202080039832.8, mailed on Mar. 23, 2024, 22 pages (12 pages of English Translation and 10 pages of Official Copy).
Office Action received for European Patent Application No. 20217518.8, mailed on Feb. 22, 2024, 7 pages.
Office Action received for Japanese Patent Application No. 2022-149476, mailed on Apr. 22, 2024, 8 pages (4 pages of English Translation and 4 pages of Official Copy).
Office Action received for Japanese Patent Application No. 2023-015606, mailed on Mar. 8, 2024, 10 pages (5 pages of English Translation and 5 pages of Official Copy).
Office Action received for Korean Patent Application No. 10-2022-7032414, mailed on Mar. 26, 2024, 11 pages (5 pages of English Translation and 6 pages of Official Copy).
Result of Consultation received for European Patent Application No. 20720310.0, mailed on Apr. 17, 2024, 9 pages.
Supplemental Notice of Allowance received for U.S. Appl. No. 17/975,141, mailed on Feb. 26, 2024, 2 pages.
Non-Final Office Action received for U.S. Appl. No. 18/236,340, mailed on Jul. 18, 2024, 8 pages.
Notice of Allowance received for Japanese Patent Application No. 2023-015606, mailed on Jul. 12, 2024, 4 pages (1 page of English Translation and 3 pages of Official Copy).
Office Action received for Australian Patent Application No. 2022235585, mailed on Jul. 8, 2024, 3 pages.
Office Action received for Australian Patent Application No. 2023204647, mailed on Jul. 5, 2024, 3 pages.
Office Action received for Chinese Patent Application No. 202310508332.X, mailed on Jun. 26, 2024, 13 pages (7 pages of English Translation and 6 pages of Official Copy).
Office Action received for European Patent Application No. 17810739.7, mailed on Jul. 8, 2024, 9 pages.
Office Action received for Japanese Patent Application No. 2023-015606, mailed on Jun. 21, 2024, 4 pages (2 pages of English Translation and 2 pages of Official Copy).
Applicant-Initiated Interview Summary received for U.S. Appl. No. 18/102,036, mailed on Nov. 8, 2024, 4 pages.
Decision to Grant received for European Patent Application No. 15753796.0, mailed on Sep. 26, 2024, 3 pages.
Intention to Grant received for European Patent Application No. 20720310.0, mailed on Oct. 7, 2024, 14 pages.
Non-Final Office Action received for U.S. Appl. No. 18/102,036, mailed on Sep. 29, 2024, 16 pages.
Notice of Acceptance received for Australian Patent Application No. 2023204647, mailed on Oct. 28, 2024, 3 pages.
Notice of Allowance received for U.S. Appl. No. 17/950,823, mailed on Nov. 7, 2024, 6 pages.
Notice of Allowance received for U.S. Appl. No. 18/236,340, mailed on Oct. 30, 2024, 7 pages.
Notice of Allowance received for U.S. Appl. No. 17/878,792, mailed on Sep. 6, 2024, 8 pages.
Notice of Allowance received for U.S. Appl. No. 18/122,625, mailed on Sep. 20, 2024, 5 pages.
Office Action received for Australian Patent Application No. 2023204647, mailed on Sep. 19, 2024, 2 pages.
Office Action received for Chinese Patent Application No. 202310794146.7, mailed on Aug. 30, 2024, 18 pages (11 pages of English Translation and 7 pages of Official Copy).
Advisory Action received for U.S. Appl. No. 18/228,597, mailed on Jul. 7, 2025, 3 pages.
Applicant-Initiated Interview Summary received for U.S. Appl. No. 18/102,036, mailed on Jun. 27, 2025, 3 pages.
Applicant-Initiated Interview Summary received for U.S. Appl. No. 18/102,036, mailed on Mar. 10, 2025, 3 pages.
Applicant-Initiated Interview Summary received for U.S. Appl. No. 18/197,681, mailed on Apr. 21, 2025, 4 pages.
Applicant-Initiated Interview Summary received for U.S. Appl. No. 18/228,597, mailed on Apr. 1, 2025, 5 pages.
Applicant-Initiated Interview Summary received for U.S. Appl. No. 18/228,597, mailed on Jan. 29, 2025, 4 pages.
Applicant-Initiated Interview Summary received for U.S. Appl. No. 18/228,597, mailed on Jun. 23, 2025, 4 pages.
Applicant-Initiated Interview Summary received for U.S. Appl. No. 18/441,971, mailed on Jul. 15, 2025, 4 pages.
Applicant-Initiated Interview Summary received for U.S. Appl. No. 18/674,435, mailed on Sep. 29, 2025, 4 pages.
Corrected Notice of Allowance received for U.S. Appl. No. 17/746,807, mailed on Feb. 26, 2025, 3 pages.
Corrected Notice of Allowance received for U.S. Appl. No. 18/228,597, mailed on Sep. 17, 2025, 2 pages.
Corrected Notice of Allowance received for U.S. Appl. No. 18/441,971, mailed on Aug. 21, 2025, 2 pages.
Decision to Grant received for European Patent Application No. 20720310.0, mailed on Dec. 5, 2024, 2 pages.
Decision to Grant received for European Patent Application No. 24211972.5, mailed on Jul. 31, 2025, 2 pages.
Extended European Search Report received for European Patent Application No. 24194531.0, mailed on Nov. 12, 2024, 8 pages.
Extended European Search Report received for European Patent Application No. 24211972.5, mailed on Jan. 2, 2025, 7 pages.
Final Office Action received for U.S. Appl. No. 18/102,036, mailed on Apr. 21, 2025, 19 pages.
Office Action received for U.S. Appl. No. 18/228,597, mailed on Jan. 8, 2025, 19 pages.
Final Office Action received for U.S. Appl. No. 18/228,597, mailed on May 9, 2025, 22 pages.
Intention to Grant received for European Patent Application No. 24211972.5, mailed on Apr. 10, 2025, 9 pages.
To Grant received for European Patent Application No. 24211972.5, mailed on Jun. 16, 2025, 9 pages.
International Preliminary Report on Patentability received for PCT Patent Application No. PCT/US2023/022410, mailed on Nov. 28, 2024, 18 pages.

(56) References Cited

OTHER PUBLICATIONS

International Search Report and Written Opinion received for PCT Patent Application No. PCT/US2024/023602, mailed on Nov. 26, 2024, 17 pages.
Invitation to Pay Additional Fees and Partial International Search Report received for PCT Patent Application No. PCT/US2024/023602, mailed on Aug. 26, 2024, 11 pages.
Non-Final Office Action received for U.S. Appl. No. 18/102,036, mailed on Aug. 25, 2025, 22 pages.
Non-Final Office Action received for U.S. Appl. No. 18/102,036, mailed on Dec. 20, 2024, 16 pages.
Non-Final Office Action received for U.S. Appl. No. 18/197,681, mailed on Apr. 3, 2025, 30 pages.
Non-Final Office Action received for U.S. Appl. No. 18/228,597, mailed on Mar. 6, 2025, 20 pages.
Non-Final Office Action received for U.S. Appl. No. 18/239,021, mailed on Apr. 7, 2025, 17 pages.
Non-Final Office Action received for U.S. Appl. No. 18/441,971, mailed on Apr. 10, 2025, 39 pages.
Non-Final Office Action received for U.S. Appl. No. 18/674,435, mailed on Sep. 10, 2025, 29 pages.
Of Allowance received for Chinese Patent Application No. 202310794146.7, mailed on Sep. 29, 2025, 4 pages (1 page of English Translation and 3 pages of Official Copy).
Of Allowance received for Korean Patent Application No. 10-2022-7032414, mailed on Nov. 27, 2024, 7 pages (2 pages of English Translation and 5 pages of Official Copy).
Of Allowance received for U.S. Appl. No. 17/746,807, mailed on Nov. 14, 2024, 6 pages.
Of Allowance received for U.S. Appl. No. 17/950,823, mailed on Mar. 12, 2025, 6 pages.
Of Allowance received for U.S. Appl. No. 17/950,823, mailed on Mar. 27, 2025, 2 pages.
Of Allowance received for U.S. Appl. No. 18/197,681, mailed on May 20, 2025, 18 pages.
Of Allowance received for U.S. Appl. No. 18/228,597, mailed on Sep. 10, 2025, 10 pages.
Of Allowance received for U.S. Appl. No. 18/239,021, mailed on Jul. 25, 2025, 7 pages.
Of Allowance received for U.S. Appl. No. 18/441,971, mailed on Aug. 5, 2025, 11 pages.
Notice of Hearing received for Indian Patent Application No. 202018015998, mailed on Nov. 27, 2024, 3 pages.
Notice of Hearing received for Indian Patent Application No. 202018016000, mailed on Nov. 27, 2024, 3 pages.
Office Action received for Australian Patent Application No. 2024205135, mailed on Jul. 25, 2025, 7 pages.
Office Action received for Chinese Patent Application No. 202110481400.9, mailed on Apr. 23, 2025, 24 pages (14 pages of English Translation and 10 pages of Official Copy).
Office Action received for Chinese Patent Application No. 202310508332.X, mailed on Dec. 7, 2024, 14 pages (7 pages of English Translation and 7 pages of Official Copy).
Office Action received for Chinese Patent Application No. 202310508332.X, mailed on Feb. 27, 2025, 12 pages (7 pages of English Translation and 5 pages of Official Copy).
Office Action received for Chinese Patent Application No. 202310794146.7, mailed on Apr. 10, 2025, 11 pages (6 pages of English Translation and 5 pages of Official Copy).
Office Action received for Chinese Patent Application No. 202310794146.7, mailed on Nov. 13, 2024, 17 pages (11 pages of English Translation and 6 pages of Official Copy).
Office Action received for European Patent Application No. 17810739.7, mailed on Jan. 20, 2025, 6 pages.
Office Action received for European Patent Application No. 17810739.7, mailed on May 12, 2025, 7 pages.
Office Action received for Japanese Patent Application No. 2024-124777, mailed on Jul. 11, 2025, 6 pages (3 pages of English Translation and 3 pages of Official Copy).
Office Action received for Japanese Patent Application No. 2024-147808, mailed on Aug. 1, 2025, 10 pages (5 pages of English Translation and 5 pages of Official Copy).
Result of Consultation received for European Patent Application No. 17810739.7, mailed on Sep. 23, 2025, 3 pages.
Intention to Grant received for European Patent Application No. 17810739.7, mailed on Oct. 29, 2025, 9 pages.
Notice of Allowance received for Japanese Patent Application No. 2024-124777, mailed on Nov. 7, 2025, 4 pages (1 page of English Translation and 3 pages of Official Copy).
Applicant-Initiated Interview Summary received for U.S. Appl. No. 18/102,036, mailed on Nov. 4, 2025, 4 pages.
Corrected Notice of Allowance received for U.S. Appl. No. 18/228,597, mailed on Nov. 5, 2025, 2 pages.

\* cited by examiner

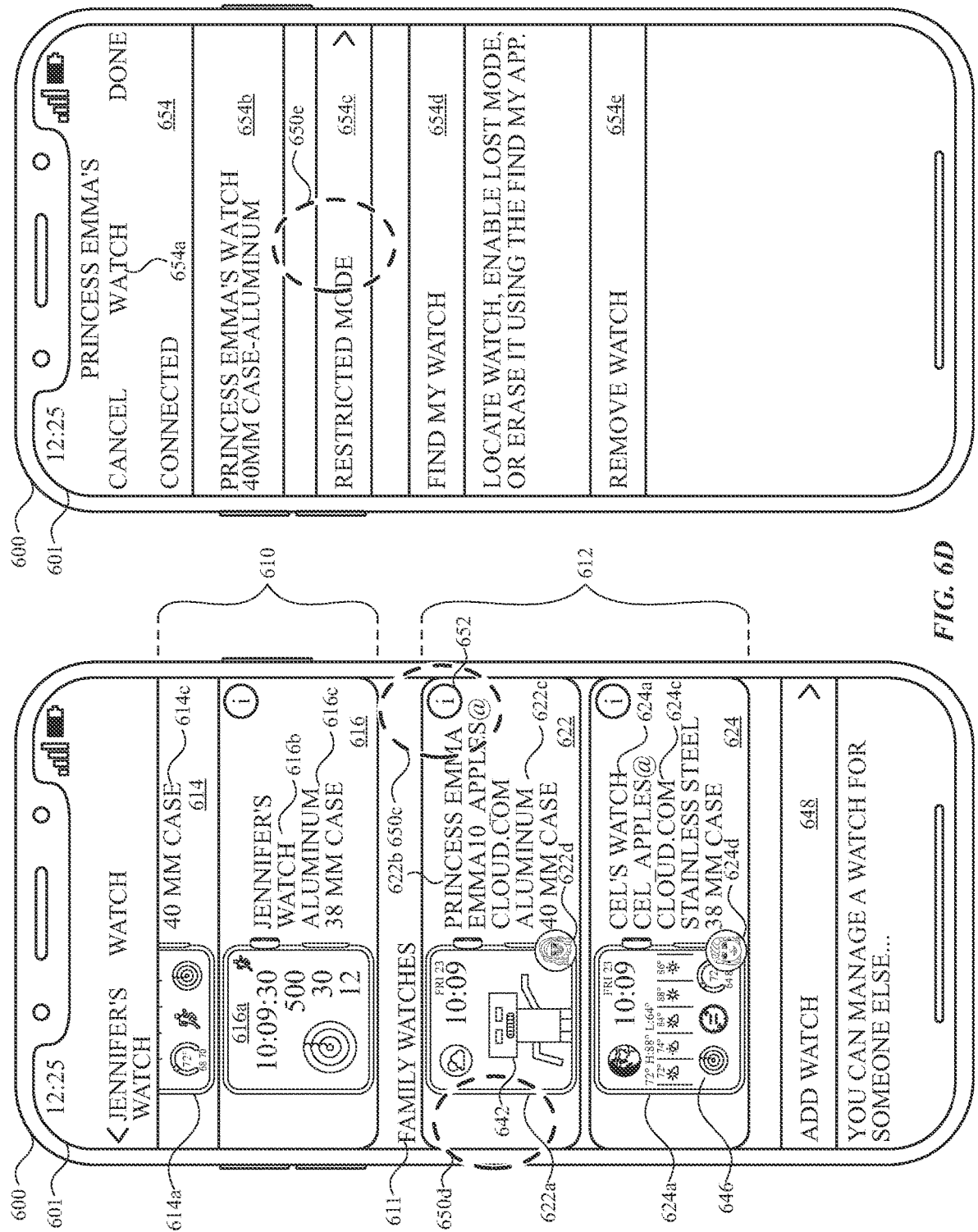

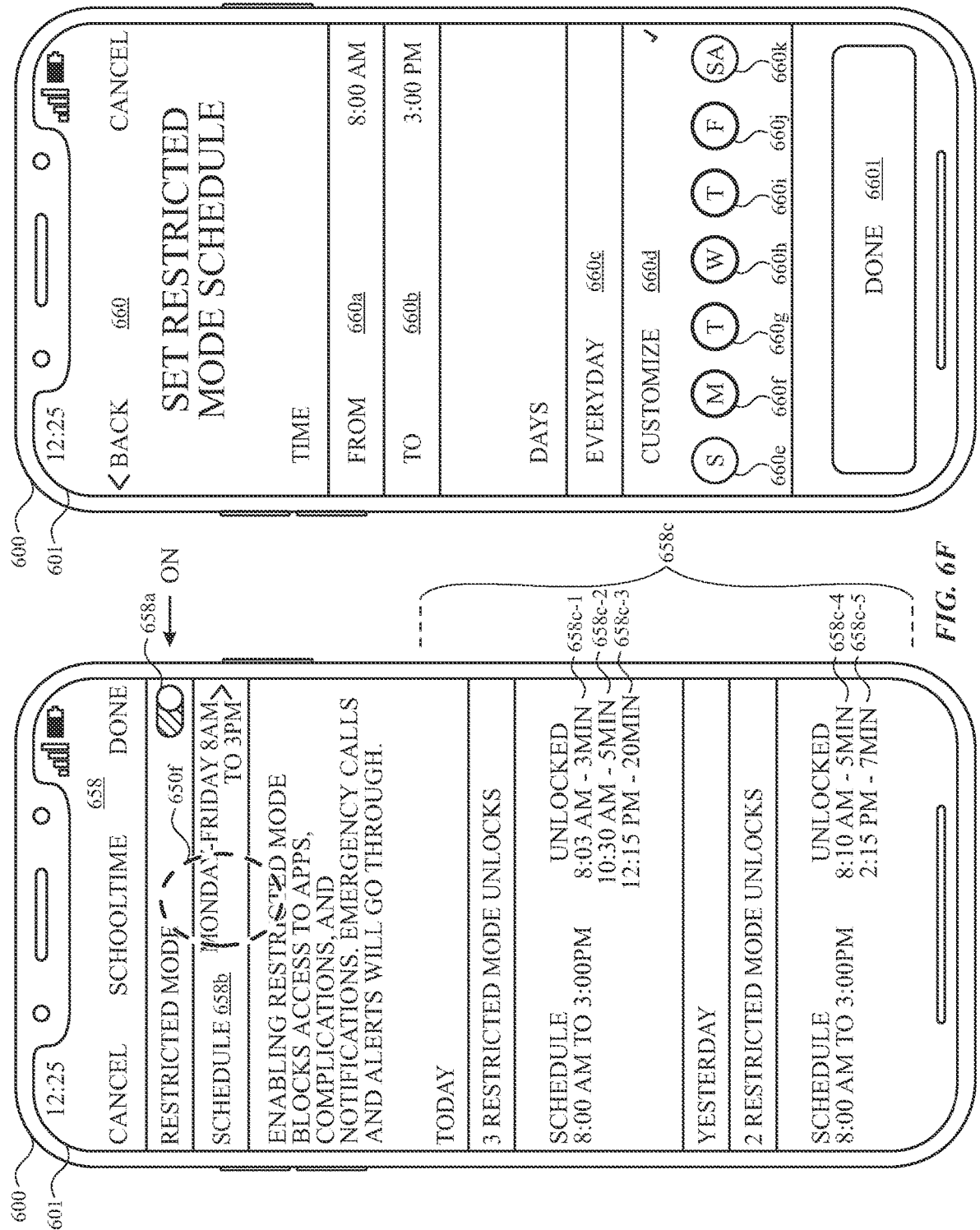

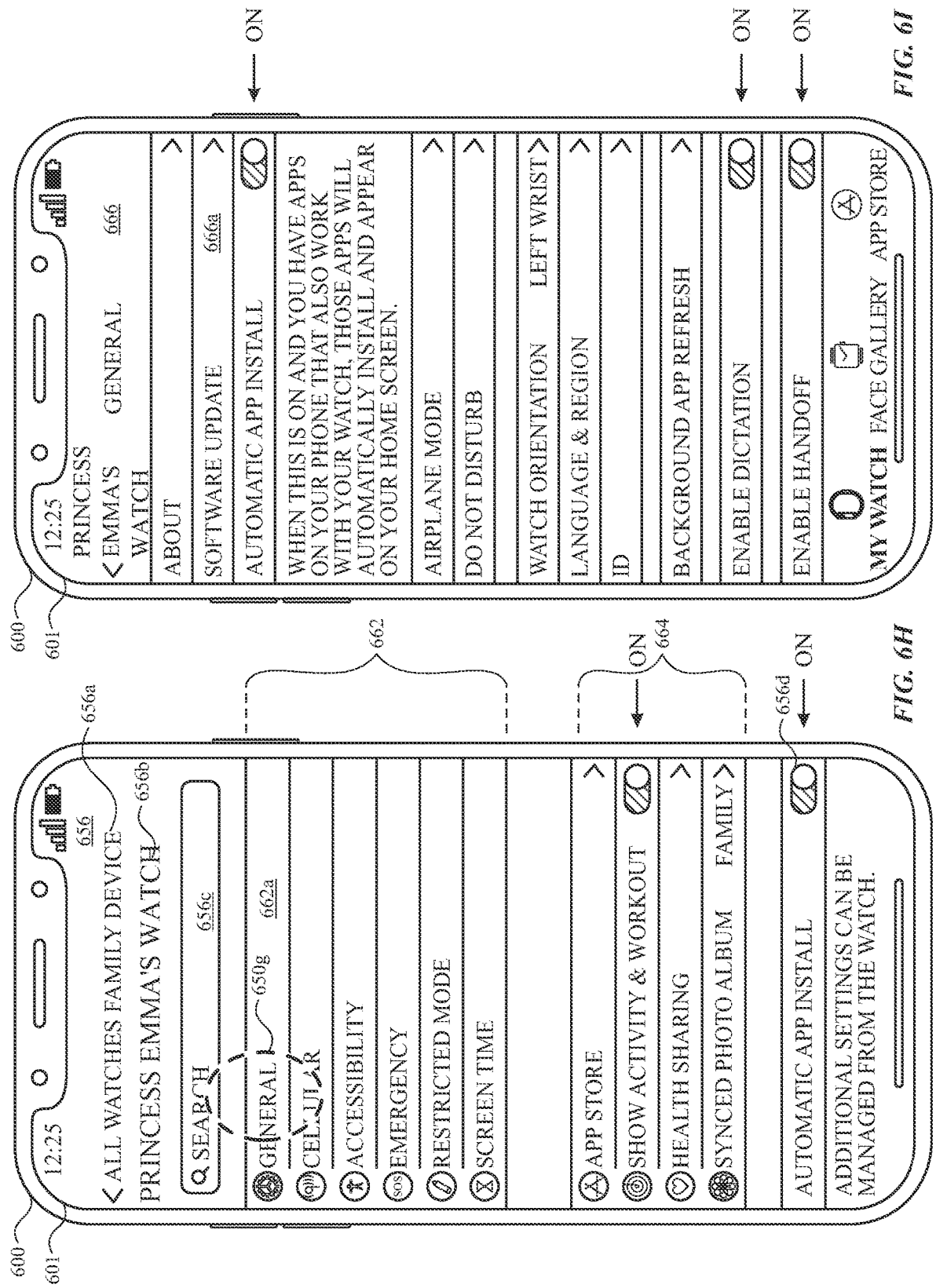

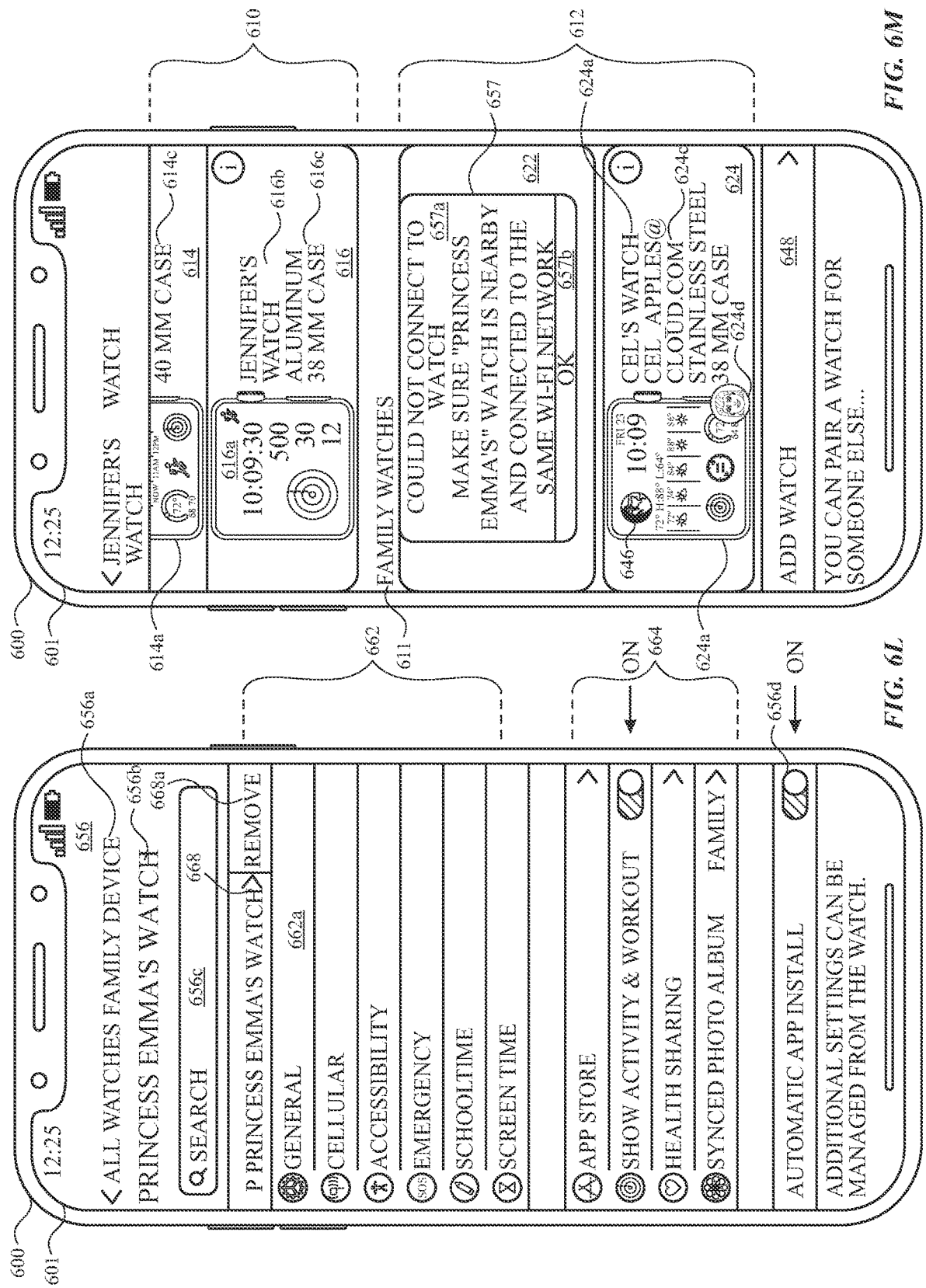

700

702
While a computer system is configured to manage one or more external devices that have a first relationship with the computer system and is configured to manage one or more external devices that have a second relationship with the computer system, where the external devices with the first relationship sync a first type of data with the computer system and external devices with the second relationship do not sync the first type of data with the computer system, receive a request to display a device management user interface for devices managed by the computer system.

704
In response to receiving the request to display the device management user interface, display, via a display generation component, the device management user interface, where displaying the device management user interface includes concurrently displaying:

706
A first user interface object corresponding to a first external device that has the first relationship with the computer system.

708
A second user interface object corresponding to a second external device that has the second relationship with the computer system, where the second user interface object is visually distinguished from the first user interface object in the device management user interface to indicate that the second external device has the second relationship with the computer system.

*FIG. 7*

DEVICE MANAGEMENT USER INTERFACE

CROSS-REFERENCE TO RELATED APPLICATIONS

This application claims priority to U.S. Provisional Application No. 63/078,224, entitled "DEVICE MANAGEMENT USER INTERFACE," filed Sep. 14, 2020, the entire contents of which are hereby incorporated by reference.

FIELD

The present disclosure relates generally to computer user interfaces, and more specifically to techniques for managing external devices.

BACKGROUND

Electronic devices are used to manage and/or control various external devices, such as smart watches, speakers, and/or smart home accessories. For example, an electronic device may be configured to adjust visual appearance settings for a smart watch.

BRIEF SUMMARY

Some techniques for managing external devices using electronic devices, however, are generally cumbersome and inefficient. For example, some existing techniques require that an external device be signed into the same account as the electronic device for the electronic device to manage and/or adjust settings of the external device. In addition, some existing techniques do not enable an electronic device to display a user interface that includes multiple (e.g., all) external devices that the electronic device is configured to manage. In addition, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing external devices. Such methods and interfaces optionally complement or replace other methods for managing external devices. Such methods and interfaces reduce the cognitive burden on a user and produce a more efficient human-machine interface. For battery-operated computing devices, such methods and interfaces conserve power and increase the time between battery charges. Additionally, such methods reduce a number of unnecessary, extraneous, and/or repetitive inputs for managing external devices.

Example methods are disclosed herein. An example method includes at a computer system that is in communication with a display generation component: while the computer system is configured to manage one or more external devices that have a first relationship with the computer system and is configured to manage one or more external devices that have a second relationship with the computer system, where external devices with the first relationship sync a first type of data with the computer system and external devices with the second relationship do not sync the first type of data with the computer system, receiving a request to display a device management user interface for devices managed by the computer system; and in response to receiving the request to display the device management user interface, displaying, via the display generation component, a device management user interface, where displaying the device management user interface includes concurrently displaying: a first user interface object corresponding to a first external device that has the first relationship with the computer system; and a second user interface object corresponding to a second external device that has the second relationship with the computer system, where the second user interface object is visually distinguished from the first user interface object in the device management user interface to indicate that the second external device has the second relationship with the computer system.

Example non-transitory computer-readable storage media are described herein. An example non-transitory computer-readable storage medium stores one or more programs configured to be executed by one or more processors of a computer system that is in communication with a display generation component, the one or more programs including instructions for: while the computer system is configured to manage one or more external devices that have a first relationship with the computer system and is configured to manage one or more external devices that have a second relationship with the computer system, where external devices with the first relationship sync a first type of data with the computer system and external devices with the second relationship do not sync the first type of data with the computer system, receiving a request to display a device management user interface for devices managed by the computer system; and in response to receiving the request to display the device management user interface, displaying, via the display generation component, a device management user interface, where displaying the device management user interface includes concurrently displaying: a first user interface object corresponding to a first external device that has the first relationship with the computer system; and a second user interface object corresponding to a second external device that has the second relationship with the computer system, where the second user interface object is visually distinguished from the first user interface object in the device management user interface to indicate that the second external device has the second relationship with the computer system.

Example transitory computer-readable storage media are described herein. An example transitory computer-readable storage medium stores one or more programs configured to be executed by one or more processors of a computer system that is in communication with a display generation component, the one or more programs including instructions for: while the computer system is configured to manage one or more external devices that have a first relationship with the computer system and is configured to manage one or more external devices that have a second relationship with the computer system, where external devices with the first relationship sync a first type of data with the computer system and external devices with the second relationship do not sync the first type of data with the computer system, receiving a request to display a device management user interface for devices managed by the computer system; and in response to receiving the request to display the device management user interface, displaying, via the display generation component, a device management user interface, where displaying the device management user interface includes concurrently displaying: a first user interface object corresponding to a first external device that has the first relationship with the computer system; and a second user interface object corresponding to a second external device that has the second relationship with the computer system, where the second user interface object is visually distinguished from the first user interface object in the device management user interface to indicate that the second external device has the second relationship with the computer system.

Example computer systems are described herein. An example computer system includes a display generation component; one or more input devices; one or more processors; and memory storing one or more programs configured to be executed by the one or more processors, the one or more programs including instructions for: while the computer system is configured to manage one or more external devices that have a first relationship with the computer system and is configured to manage one or more external devices that have a second relationship with the computer system, where external devices with the first relationship sync a first type of data with the computer system and external devices with the second relationship do not sync the first type of data with the computer system, receiving a request to display a device management user interface for devices managed by the computer system; and in response to receiving the request to display the device management user interface, displaying, via the display generation component, a device management user interface, where displaying the device management user interface includes concurrently displaying: a first user interface object corresponding to a first external device that has the first relationship with the computer system; and a second user interface object corresponding to a second external device that has the second relationship with the computer system, where the second user interface object is visually distinguished from the first user interface object in the device management user interface to indicate that the second external device has the second relationship with the computer system.

An example computer system includes: a display generation component; means, while the computer system is configured to manage one or more external devices that have a first relationship with the computer system and is configured to manage one or more external devices that have a second relationship with the computer system, where external devices with the first relationship sync a first type of data with the computer system and external devices with the second relationship do not sync the first type of data with the computer system, for receiving a request to display a device management user interface for devices managed by the computer system; and means, responsive to receiving the request to display the device management user interface, for displaying, via the display generation component, a device management user interface, where displaying the device management user interface includes concurrently displaying: a first user interface object corresponding to a first external device that has the first relationship with the computer system; and a second user interface object corresponding to a second external device that has the second relationship with the computer system, where the second user interface object is visually distinguished from the first user interface object in the device management user interface to indicate that the second external device has the second relationship with the computer system.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing external devices, thereby increasing the effectiveness, efficiency, and user satisfaction with such devices. Such methods and interfaces may complement or replace other methods for managing external devices.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6A-6M illustrate exemplary user interfaces for managing external devices using a device management user interface in accordance with some embodiments.

FIG. 7 is a flow diagram illustrating a method for managing external devices using a device management user interface in accordance with some embodiments.

DESCRIPTION OF EMBODIMENTS

Figure 1A:
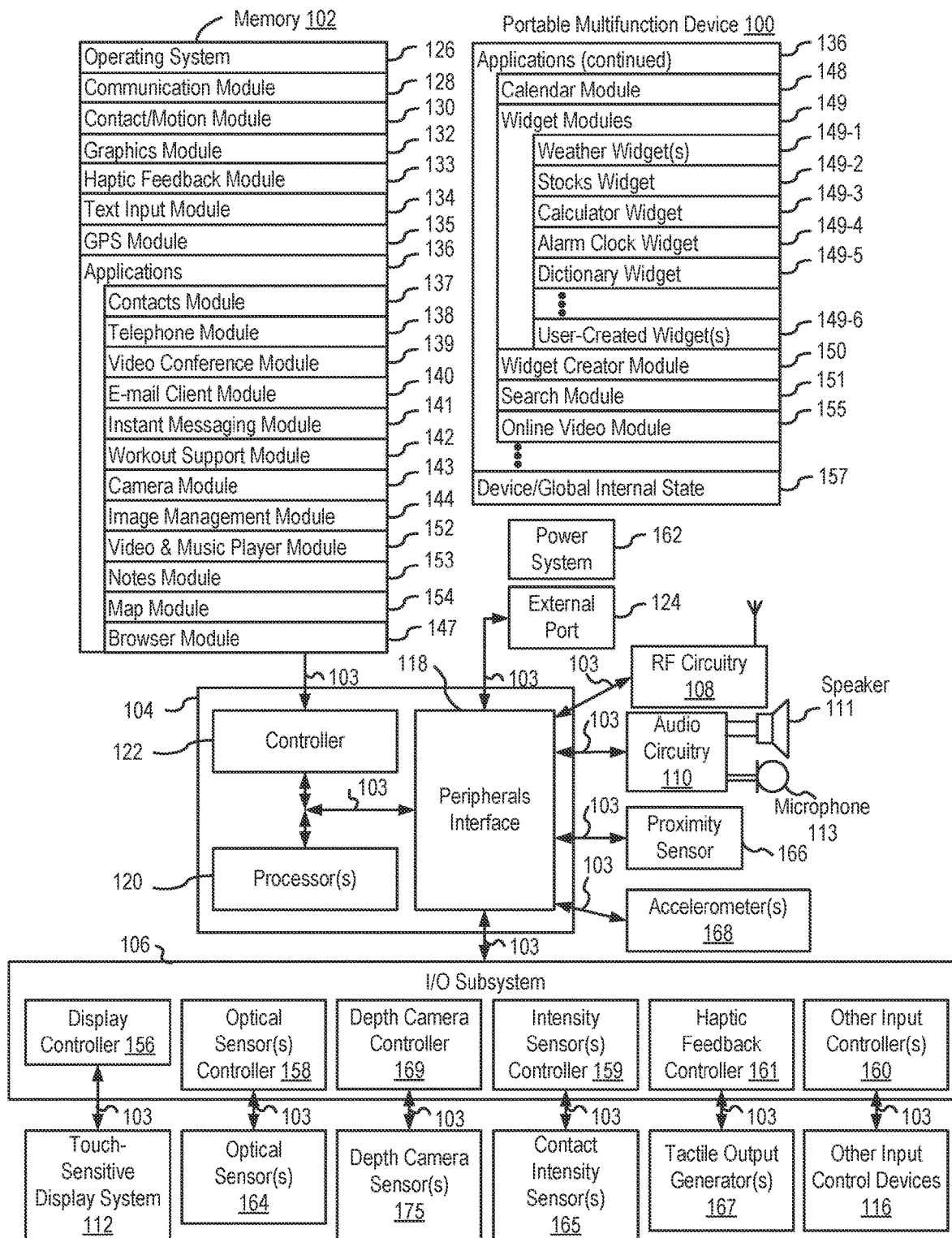
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing external devices. For example, an electronic device is configured to manage a number of external devices by adjusting settings and/or restrictions on the external devices. Displaying all of the external devices in which the electronic device is configured to manage on a single user interface may facilitate a user's ability to find and select a desired external device to control. Such techniques can reduce the cognitive burden on a user who manages external devices, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for managing external devices. FIGS. 6A-6M illustrate exemplary user interfaces for managing external devices. FIG. 7 is a flow diagram illustrating methods of managing external devices in accordance with some embodiments. The user interfaces in FIGS. 6A-6M are used to illustrate the processes described below, including the processes in FIG. 7.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch- Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
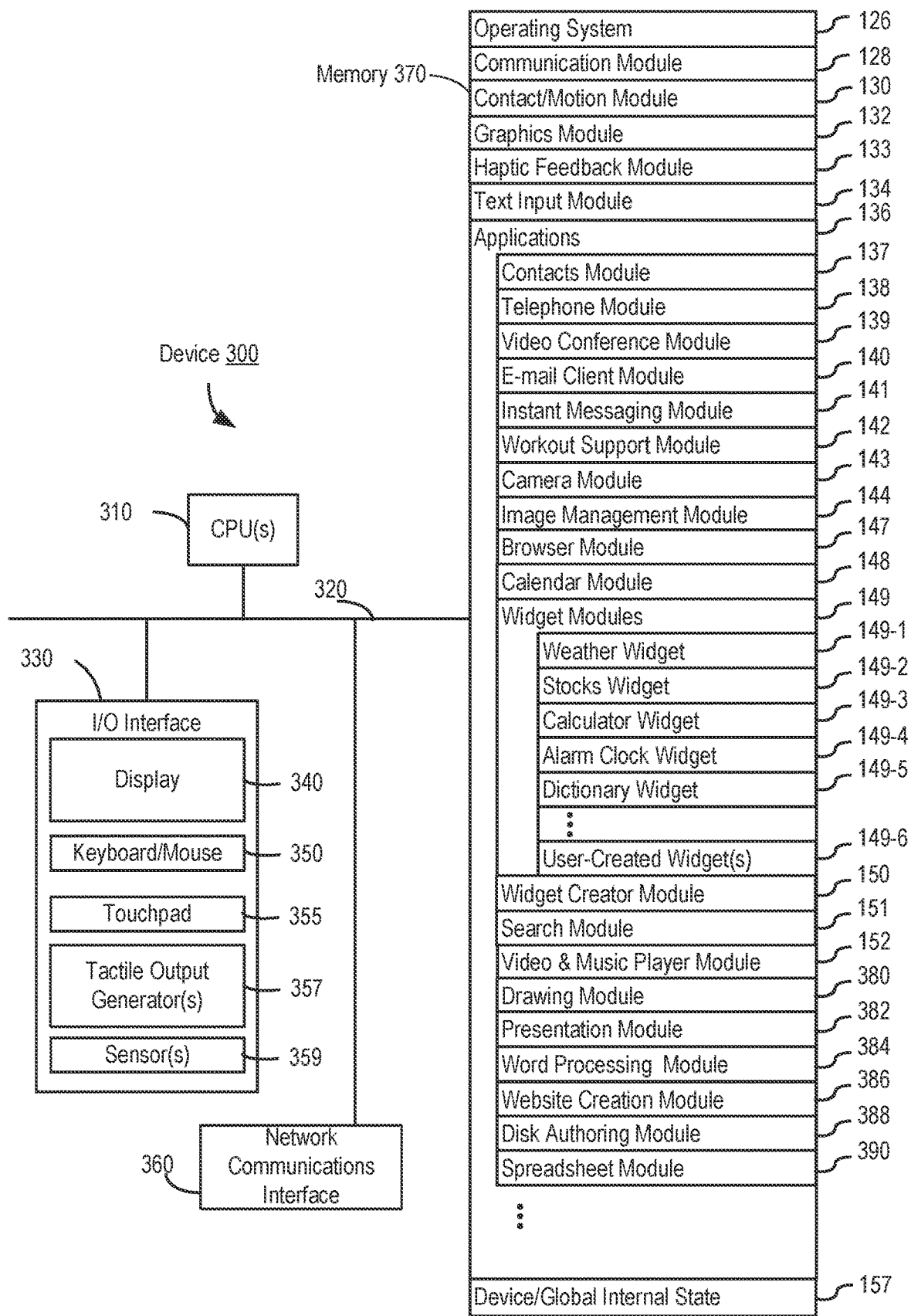
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
    Contacts module 137 (sometimes called an address book or contact list);
    Telephone module 138;
    Video conference module 139;
    E-mail client module 140;
    Instant messaging (IM) module 141;
    Workout support module 142;
    Camera module 143 for still and/or video images;
    Image management module 144;
    Video player module;
    Music player module;
    Browser module 147;
    Calendar module 148;
    Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
    Widget creator module 150 for making user-created widgets 149-6;
    Search module 151;
    Video and music player module 152, which merges video player module and music player module;
    Notes module 153;
    Map module 154; and/or
    Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
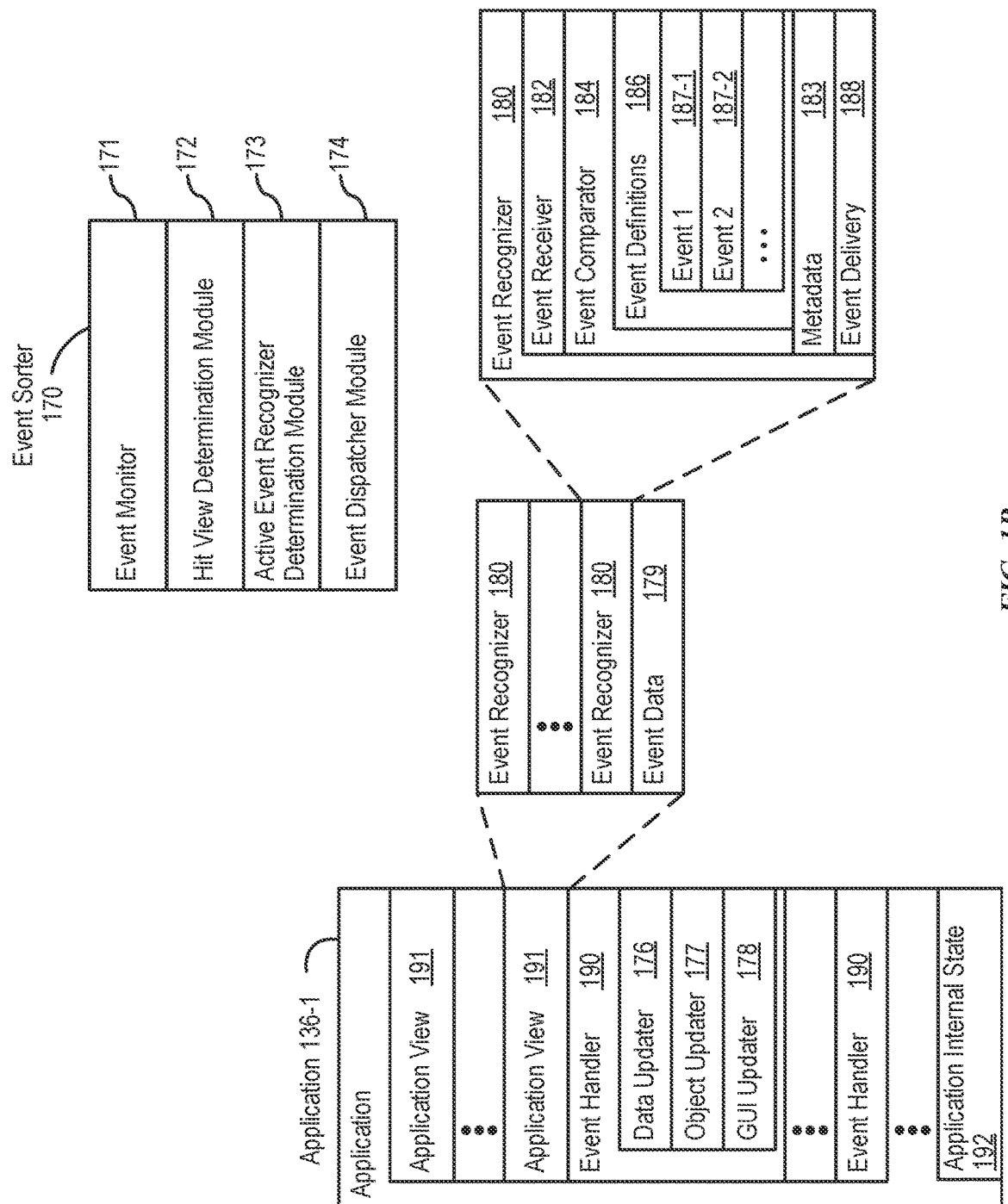
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
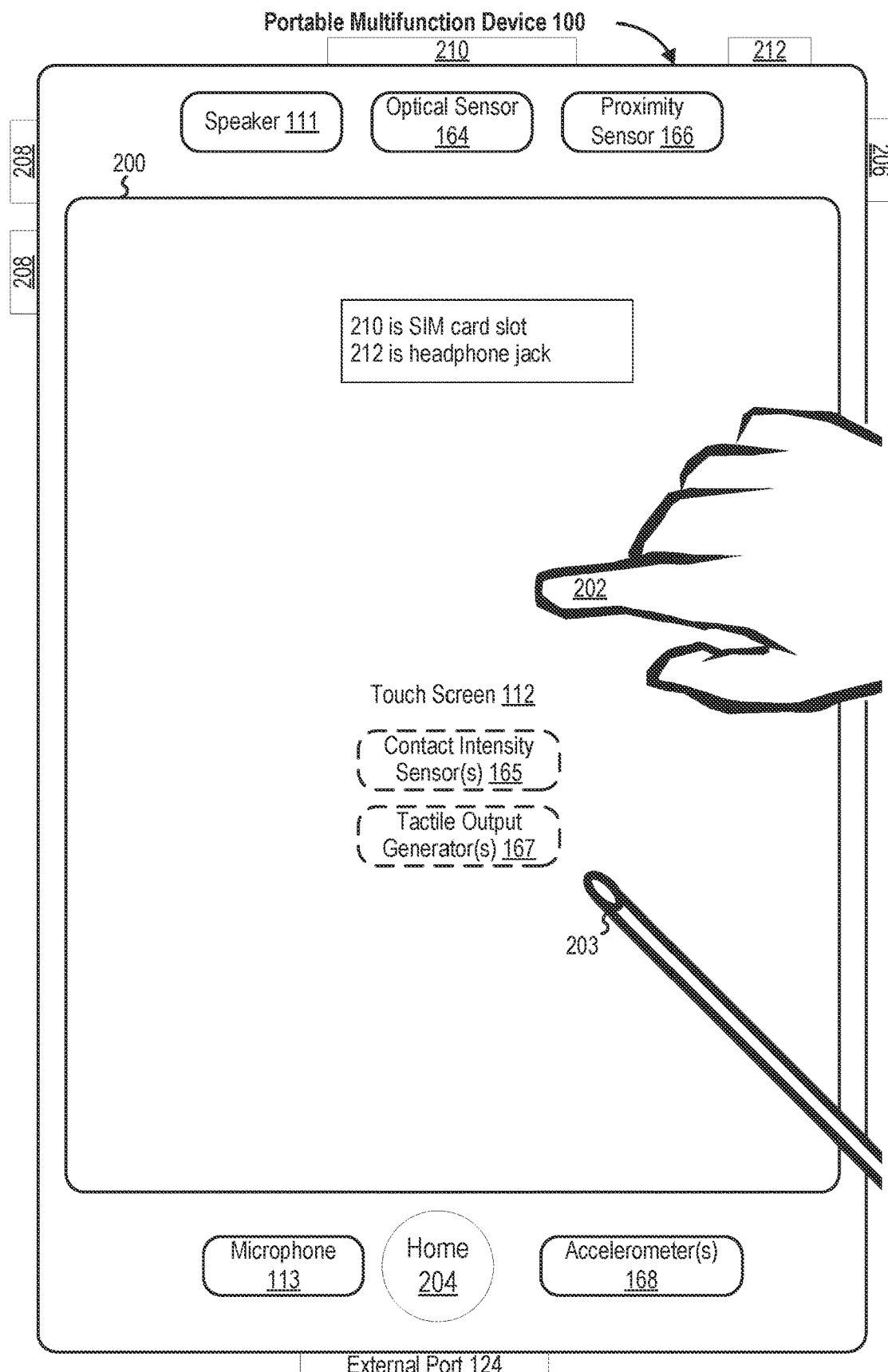
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
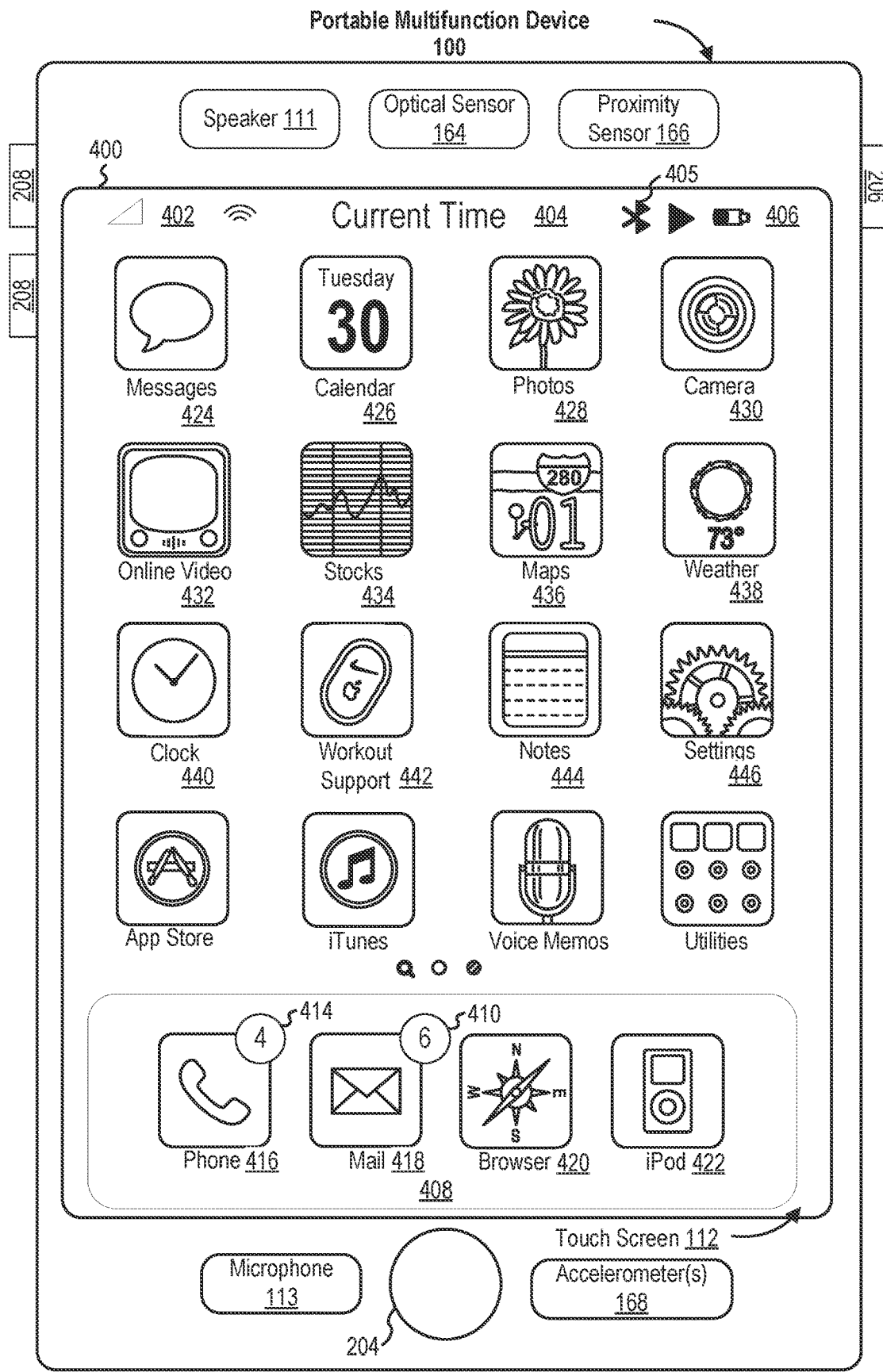
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"

Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
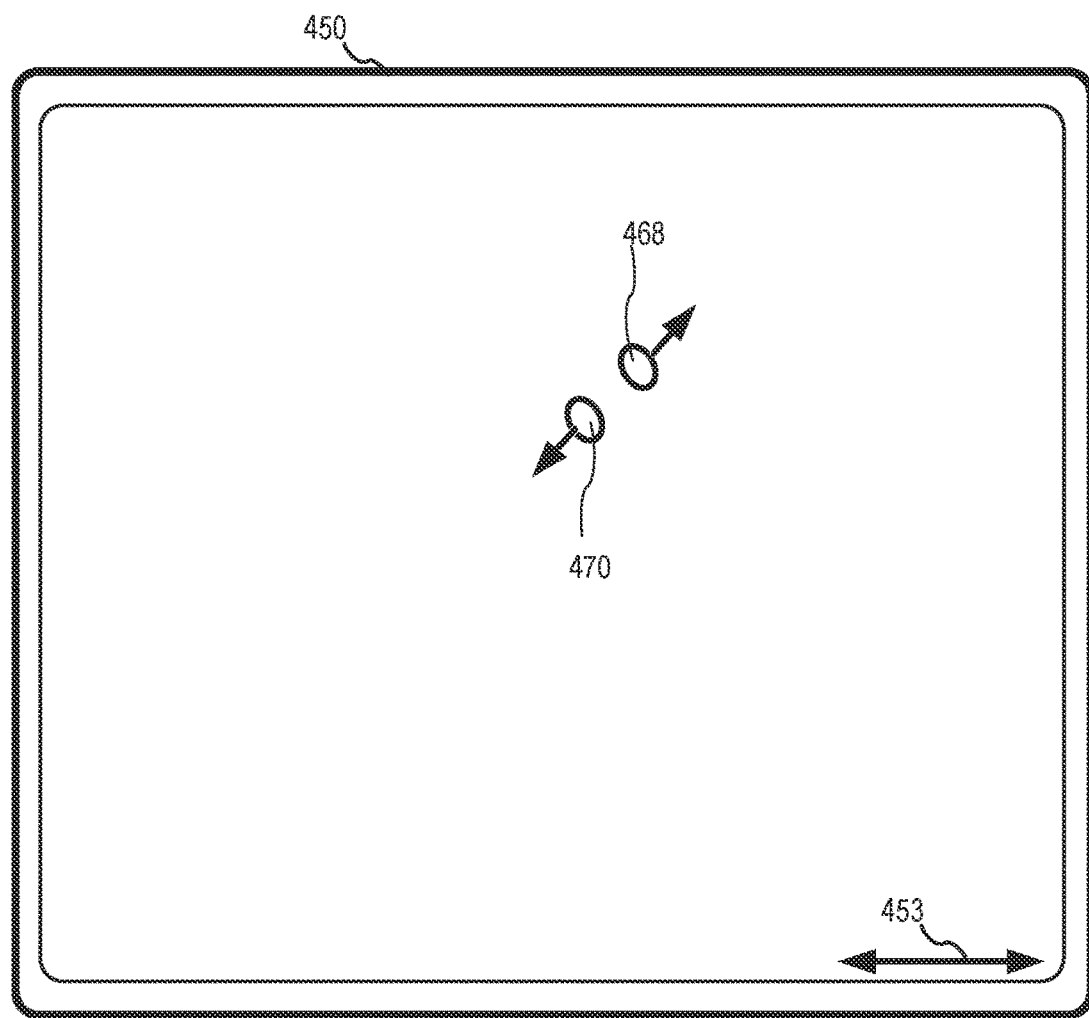
FIG. 4B illustrates an exemplary user interface for a multifunction device with a touch-sensitive surface that is separate from the display in accordance with some embodiments.
Figure 4B:
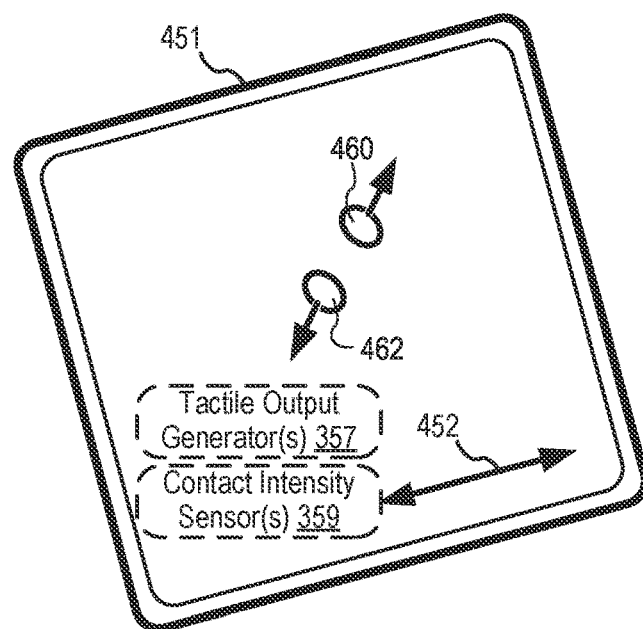

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
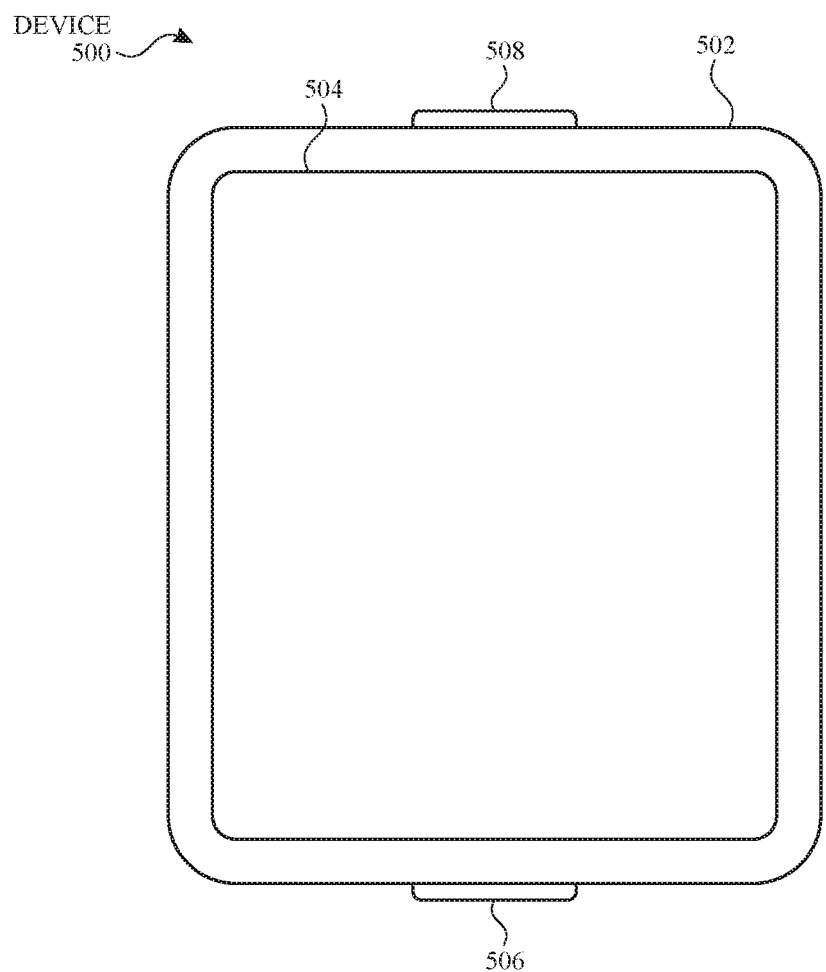
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
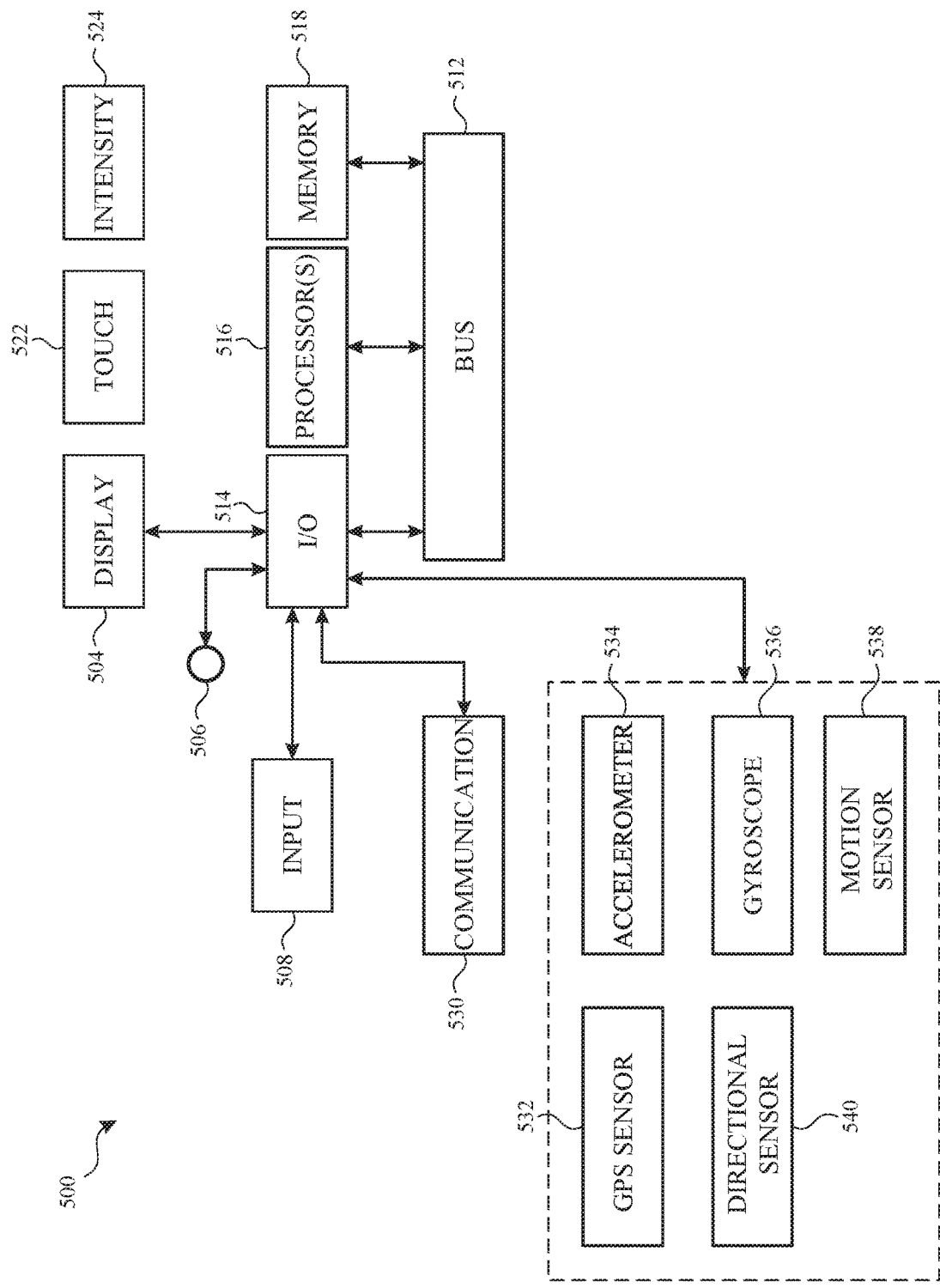
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
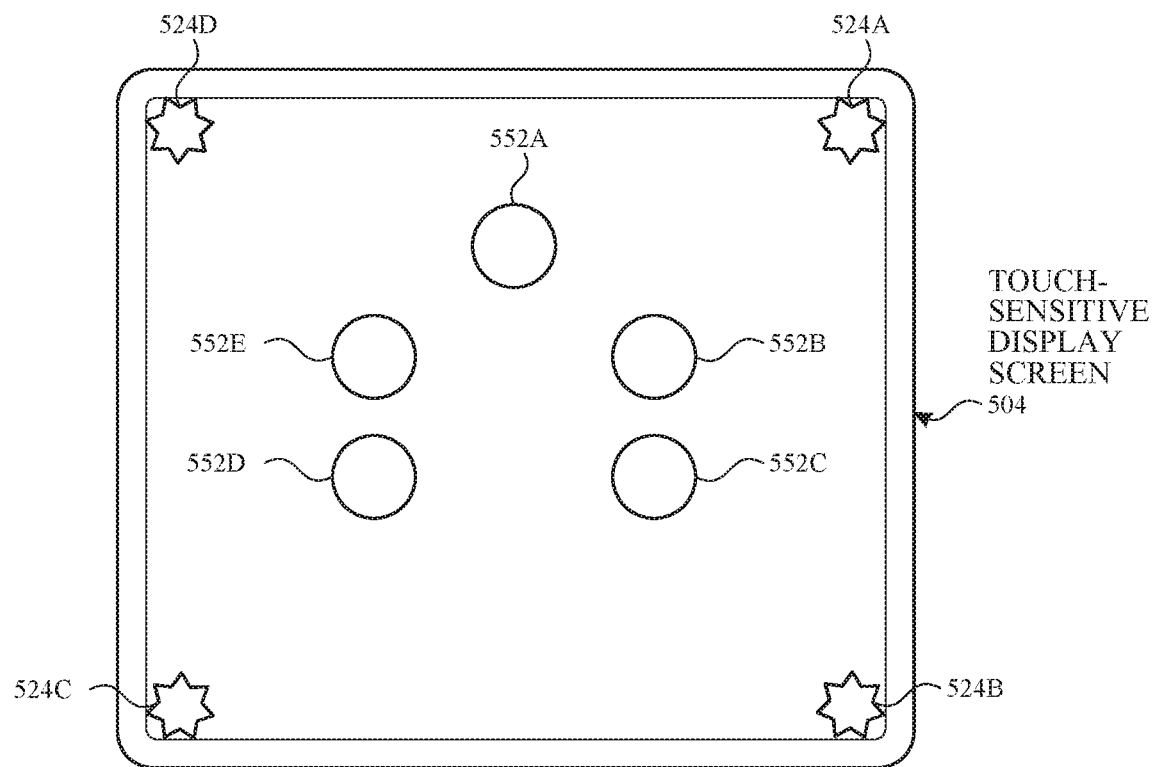
FIGS. 5C-5D illustrate exemplary components of a personal electronic device having a touch-sensitive display and intensity sensors in accordance with some embodiments.
Figure 5C:
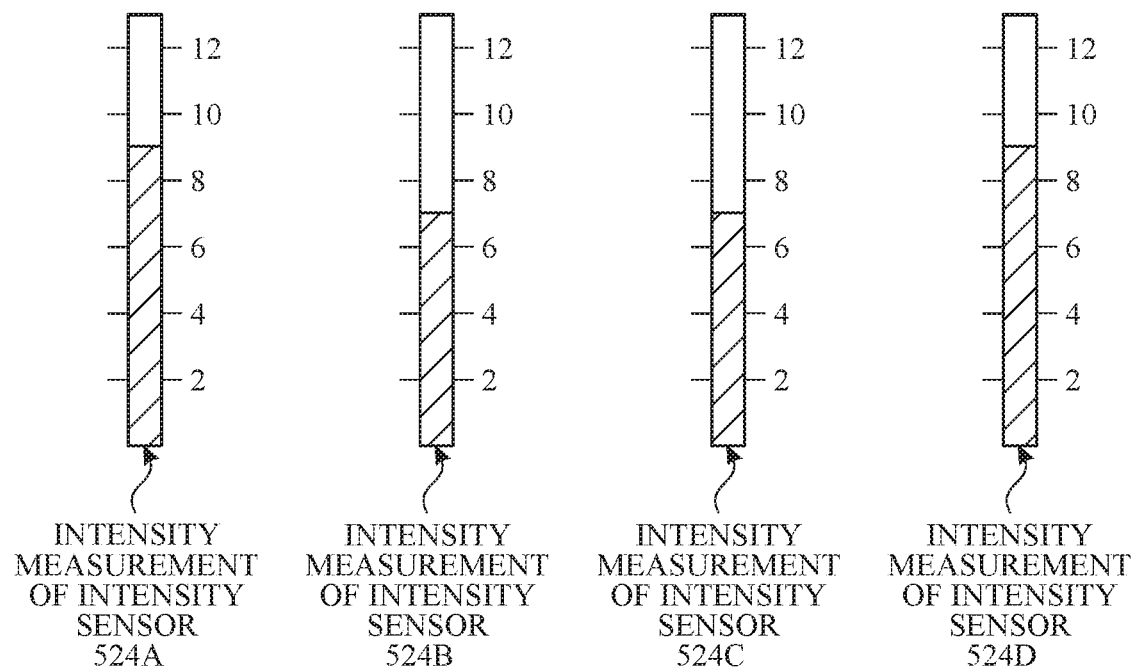
Figure 5D:
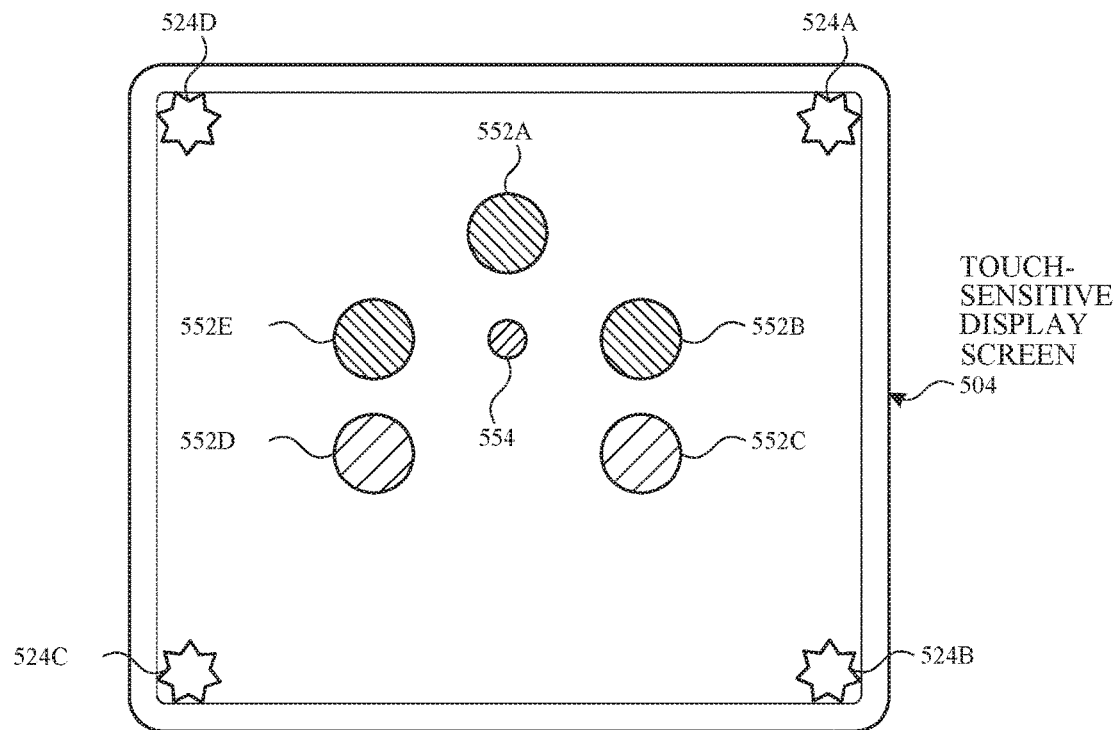
Figure 5D:
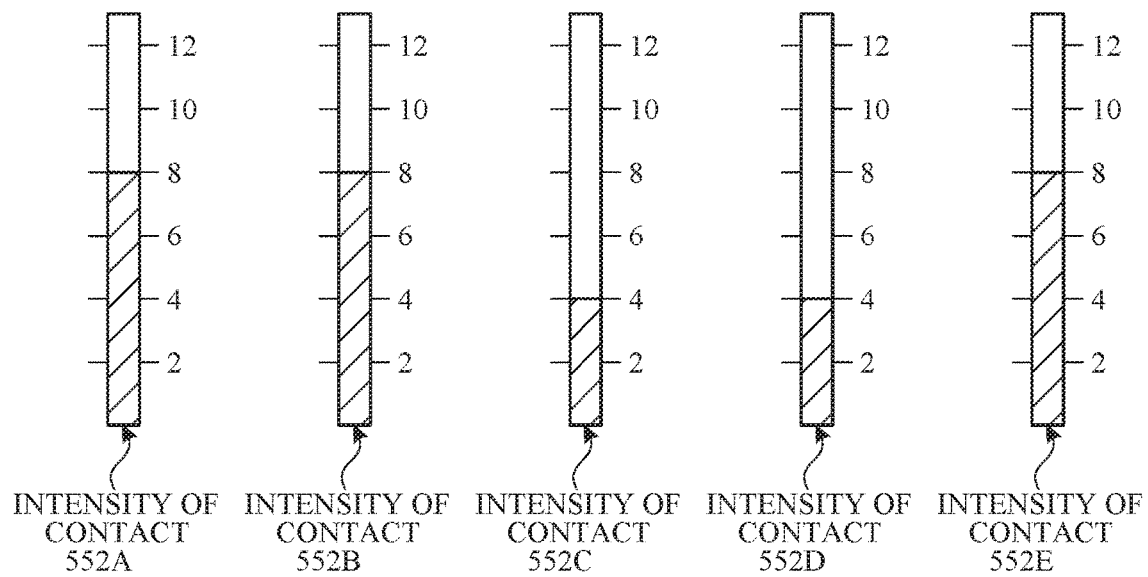

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and/Di is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
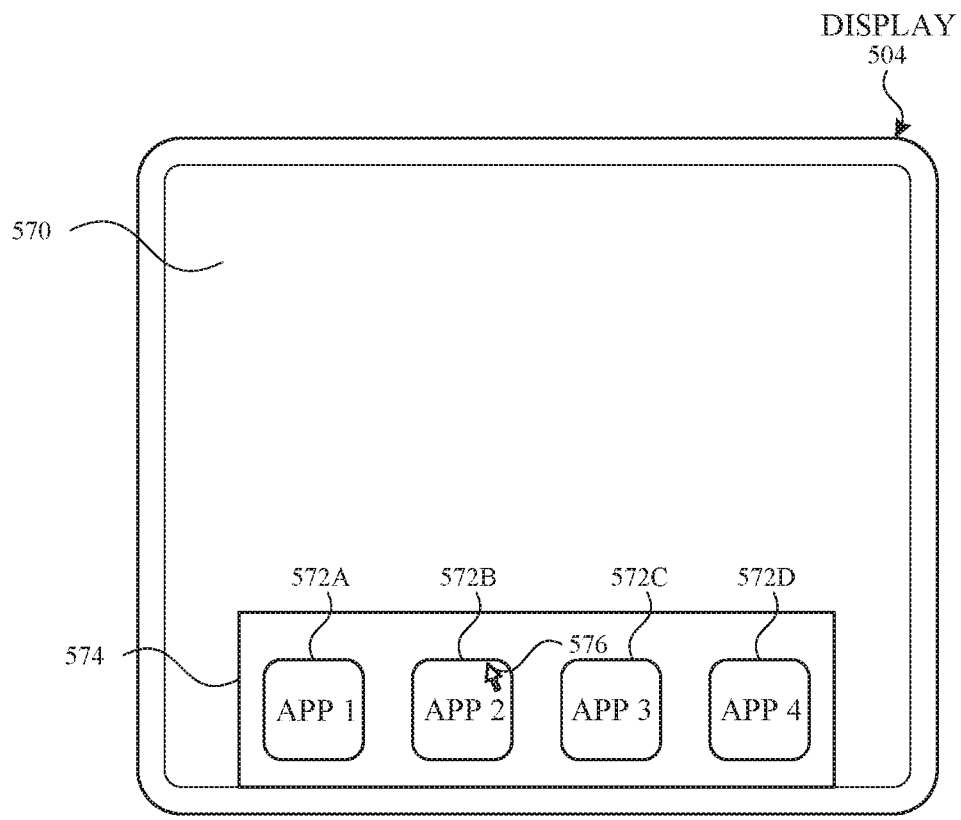
FIGS. 5E-5H illustrate exemplary components and user interfaces of a personal electronic device in accordance with some embodiments.
Figure 5E:
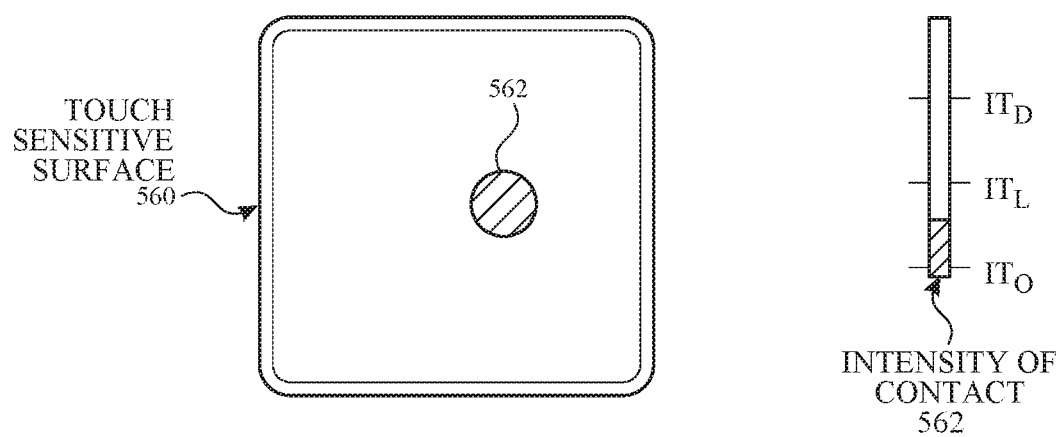
Figure 5F:
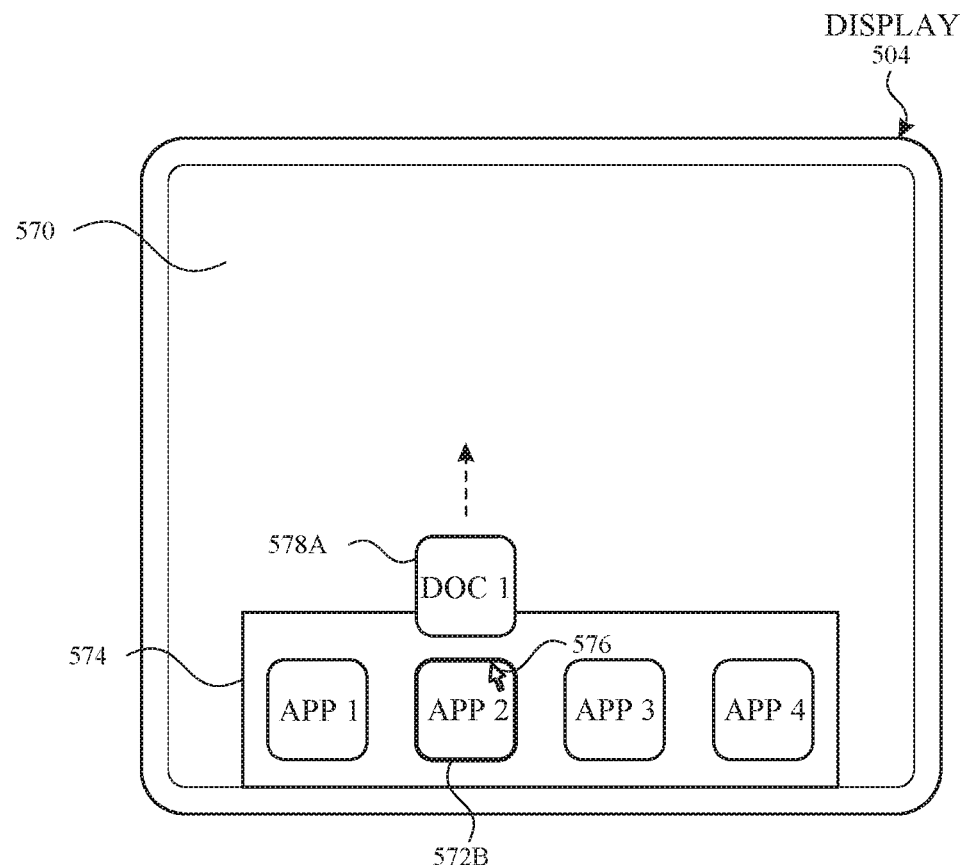
Figure 5F:
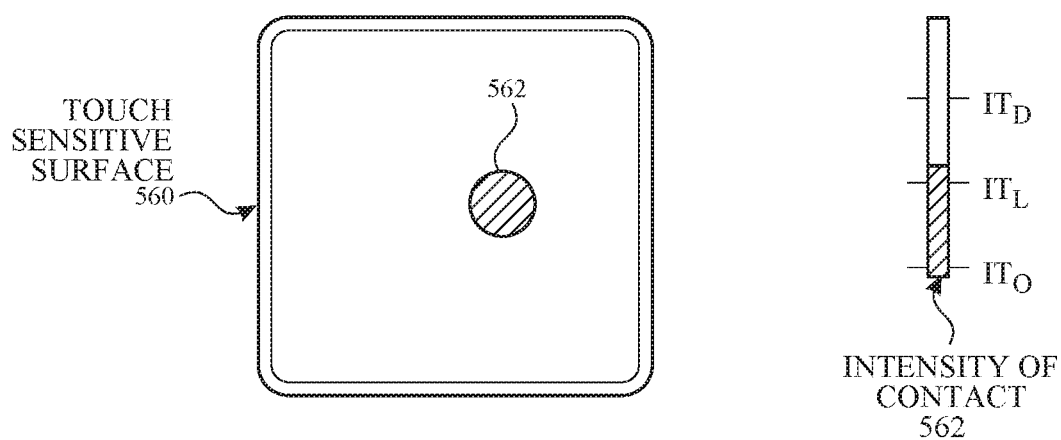
Figure 5G:
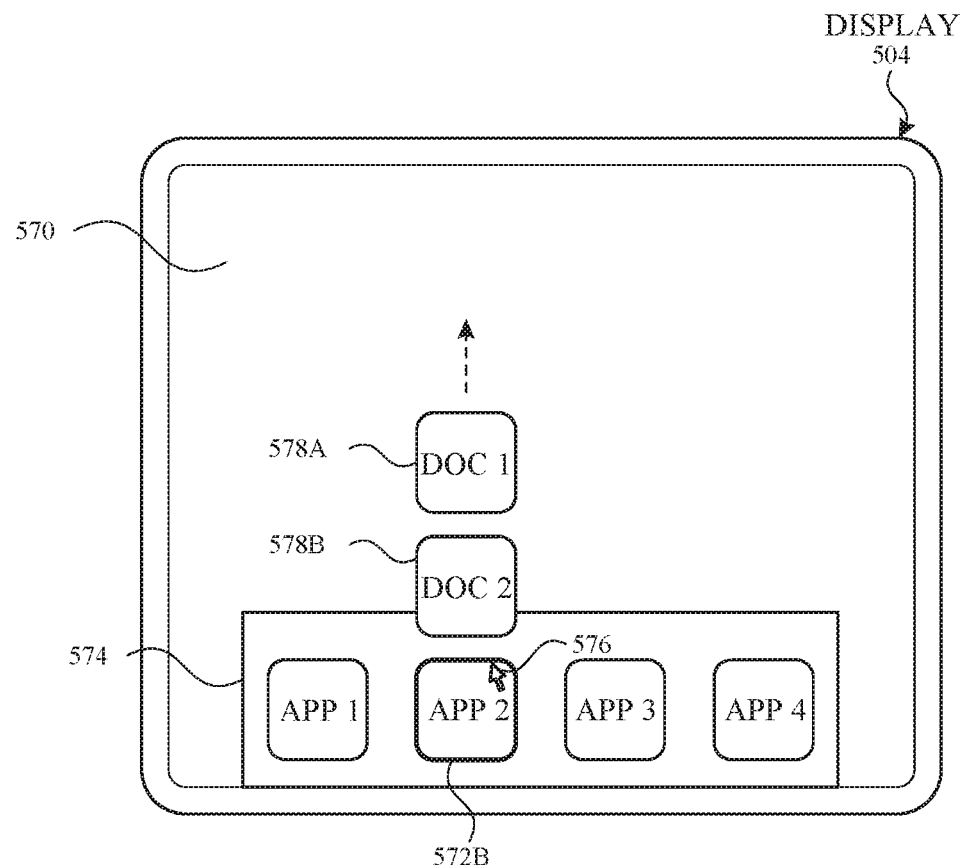
Figure 5G:
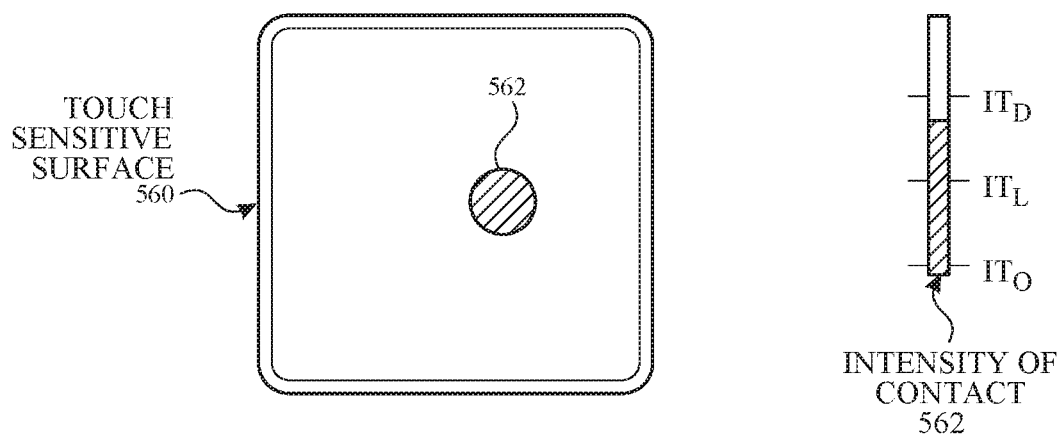
Figure 5H:
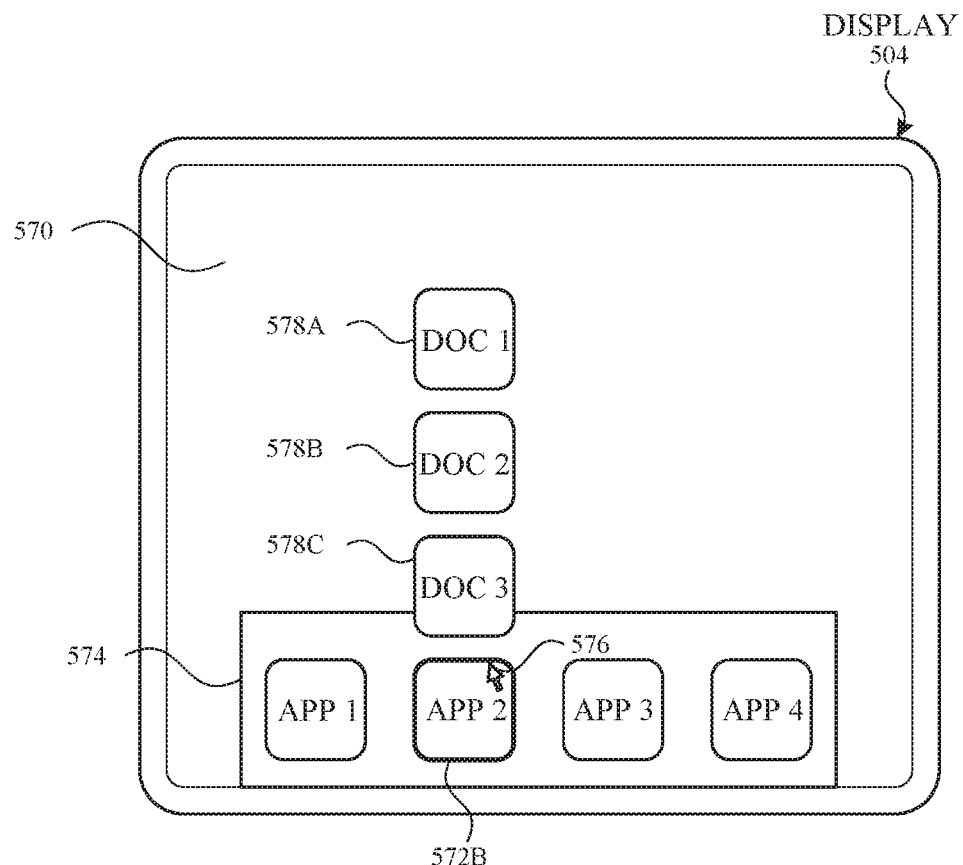
Figure 5H:
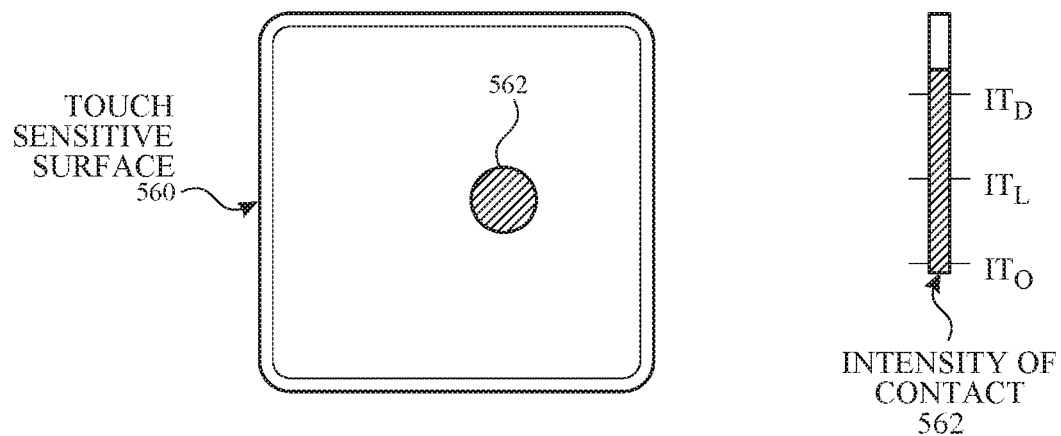

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6M illustrate exemplary user interfaces for managing external devices, in accordance with some embodiments. The user interfaces in these figures are used to illustrate the processes described below, including the processes in FIG. 7.

Figure 6A:
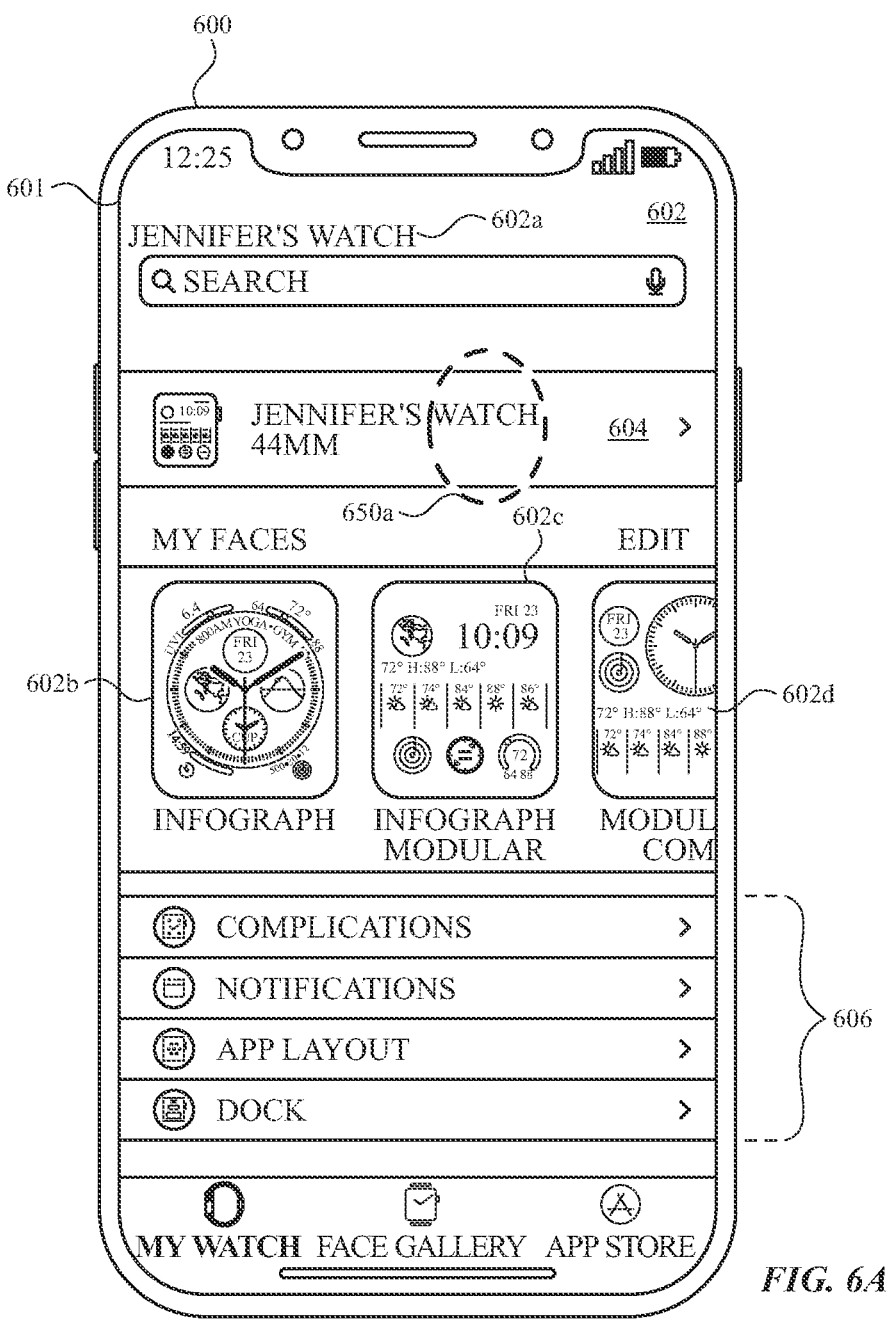

FIG. 6A illustrates electronic device 600 with display 601. At FIG. 6A, electronic device 600 displays user interface 602 of an application on display 601. The application is for configuring settings of an external device, such as a smart watch. At FIG. 6A, user interface 602 includes external device name 602a, such as Jennifer's Watch, management user interface affordance 604, watch face selection user interface objects 602b-602d, and settings area 606. User interface 602 enables a user of electronic device 600 to control and/or adjust settings of the external device. For example, user interface 602 enables a user to control and/or adjust settings related to an appearance of the external device (e.g., via watch face selection user interface objects 602b-602d), notifications output by the external device, and/or applications available on the external device.

At FIG. 6A, electronic device 600 detects tap gesture 650a on management user interface object 604. In response to detecting tap gesture 650a on management user interface object 604, electronic device 600 displays device management user interface 608, as shown at FIG. 6B.

Figure 6B:
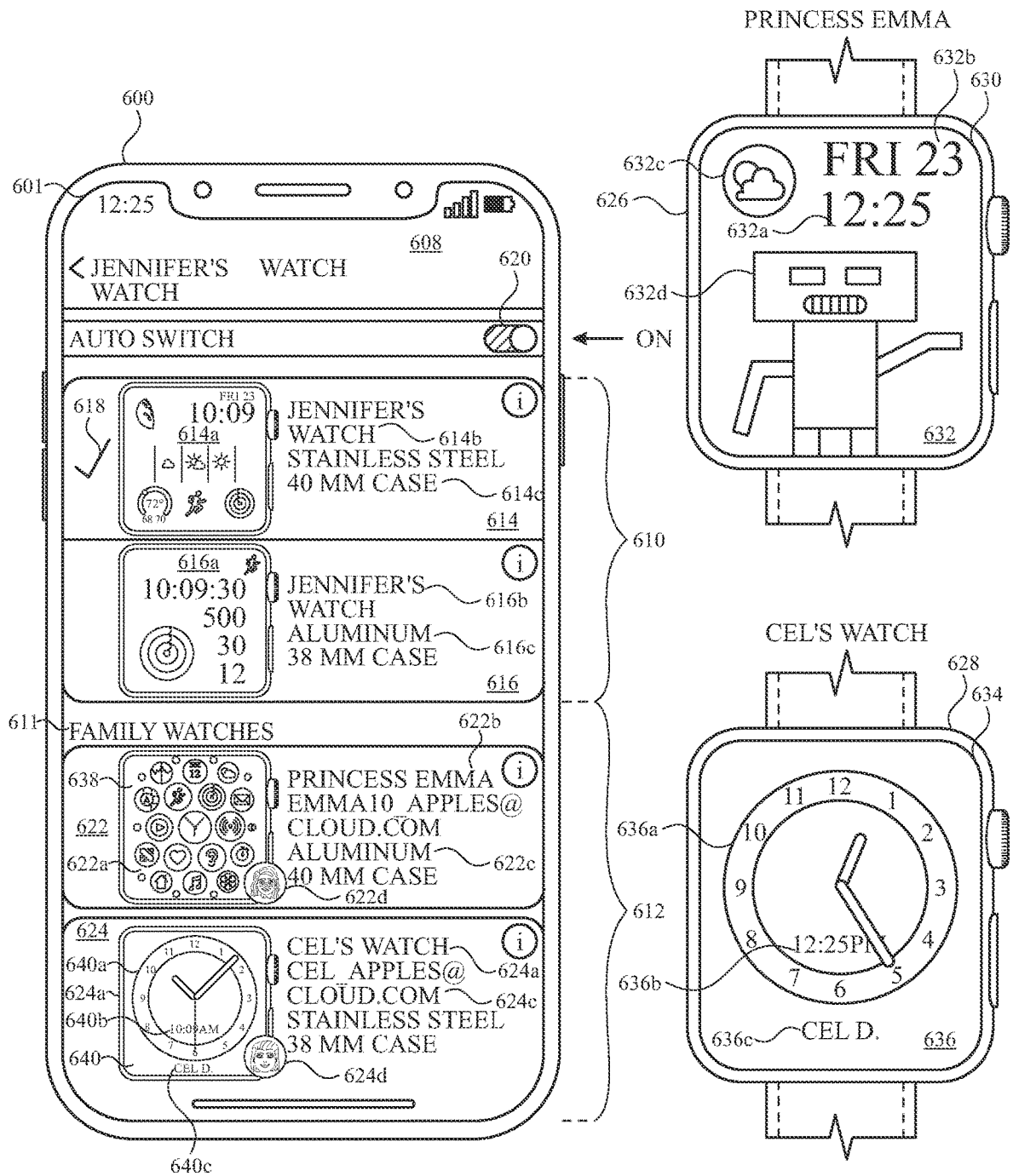

At FIG. 6B, device management user interface 608 includes first area 610 corresponding to external devices managed by electronic device 600 and having a first relationship with electronic device 600 and second area 612 corresponding to external devices managed by electronic device 600 and having a second relationship, different from the first relationship, with electronic device 600. At FIG. 6B, first area 610 and second area 612 are separated by indicator 611 (e.g., "Family Watches") to visually distinguish external devices having the first relationship with electronic device 600 and external devices having the second relationship with electronic device 600. As set forth below, in some embodiments, external devices having the second relationship with electronic device 600 are primarily used by a user that is different from a user of electronic device 600, such as a child of the user of electronic device 600. As such, indicator 611 enables a user to quickly distinguish between external devices that are used by the user of electronic device 600 (e.g., external devices in first area 610) and external devices used by others (e.g., external devices in second area 612).

The first relationship between the external devices and electronic device 600 is a paired relationship that includes syncing (e.g., transmitting and/or receiving) a particular type of data between electronic device 600 and the external devices, such as notifications corresponding to applications installed on electronic device 600 and/or the external devices. The second relationship between the external devices and electronic device 600 is not a paired relationship and does not include syncing (e.g., transmitting and/or receiving) the particular type of data between electronic device 600 and the external devices. The particular type of data includes message notifications associated with a messaging conversation corresponding to a messaging application, coaching notifications corresponding to an activity application, and/or calendar applications corresponding to a calendar application. In some embodiments, the notifications correspond to applications installed on electronic device 600 and are transmitted from electronic device 600 to the external devices having the first relationship with electronic device 600, but are not transmitted to the external devices having the second relationship with electronic device 600. In some embodiments, the notifications correspond to applications installed on the external devices having the first relationship with electronic device 600 and are transmitted from the external devices to electronic device 600. Thus, while electronic device 600 is configured to manage both the external devices having the first relationship and the external devices having the second relationship, electronic device 600 is configured to sync the particular type of data with the external devices having the first relationship but not with the external devices having the second relationship.

In some embodiments, the external devices having the first relationship with electronic device 600 are signed into the same account as electronic device 600, such as a first user account. In some embodiments, the external devices having the second relationship with electronic device 600 are signed into different accounts than the account of electronic device 600 and the external devices having the first relationship. Accordingly, the external devices having the second relationship with electronic device 600 are primarily used by users other than the user associated with the first user account (e.g., the account signed into by electronic device 600). For instance, the external devices having the second relationship with electronic device 600 can be used by children of the user of electronic device 600. Therefore, electronic device 600 is configured to manage the external devices having the second relationship, but electronic device 600 does not sync the particular type of data (e.g., notifications) with the external devices having the second relationship. In particular, electronic device 600 is configured to adjust and/or control features of the external devices having the second relationship with electronic device 600 without syncing the particular type of data between electronic device 600 and the external devices having the second relationship. For example, electronic device 600 controls and/or adjusts a restricted mode, location services, and/or a connection between the external devices having the second relationship and electronic device 600.

In some embodiments, the external devices having the second relationship with electronic device 600 are also in communication with an additional device. For example, an external device having the second relationship with electronic device 600 may be used primarily by a child of the user of electronic device 600. The child of the user of electronic device 600 may also use another external device (e.g., a smart phone) to adjust settings of the external device having the second relationship with electronic device 600. However, the additional device in communication with the external device having the second relationship with electronic device 600 is not configured to adjust and/or control some particular settings of the external device having the second relationship with electronic device 600 (e.g., settings associated with a restricted mode of the external device having the second relationship with electronic device 600).

At FIG. 6B, first area 610 of device management user interface 608 includes first device user interface object 614 and second device user interface object 616. First device user interface object 614 corresponds to a first external device having the first relationship with electronic device 600 and second device user interface object 616 corresponds to a second external device having the first relationship with electronic device 600. First user interface object 614 includes display representation 614a (e.g., a watch face configured to be displayed on first external device), first external device name 614b (e.g., "Jennifer's Watch"), and/or first external device information 614c (e.g., a size of first external device, a material of first external device, and/or a model of first external device). Similarly, second user interface object 616 includes display representation 616a (e.g., a watch face configured to be displayed on second external device), second external device name 616b (e.g., "Jennifer's Watch"), and/or second external device information 616c (e.g., a size of second external device, a material of second external device, and/or a model of second external device).

Additionally, first device user interface object 614 includes indicator 618 representing that a first external device corresponding to first device user interface object 614 is currently paired with electronic device 600 and syncing the particular type of data between electronic device 600 and the first external device. At FIG. 6B, device management user interface 608 includes auto switch user interface object 620. In response to auto switch user interface object 620 being in an active position (e.g., an "ON" position), electronic device 600 is configured to determine whether to sync the particular type of data with the first external device or the second external device. Electronic device 600 detects which of the first external device and the second external device is powered on, which of the first external device and the second external device is within a proximity of electronic device 600 (e.g., a closer proximity to electronic device 600), and/or which of the first external device and the second external device is in an unlocked mode to determine whether to pair to, and sync the particular type of data with, the first external device or the second external device. Alternatively, electronic device 600 detects user input on second device user interface object 616 to switch from being paired to, and syncing the particular type of data with, the first external device to being pairing to, and syncing the particular type of data with, the second external device. In response to pairing to and syncing the particular type of data with the second external device, electronic device 600 displays indicator 618 on second device user interface object 616 and ceases to display indicator 618 on first device user interface object 614. For example, electronic device 600 receives information from the external devices indicating the visual characteristics of the respective external device (e.g., selected watch face, background image, and/or complications selected for display as part of the watch face).

At FIG. 6B, second area 612 includes third device user interface object 622 and fourth device user interface object 624. Third device user interface object 622 corresponds to a third external device 626 having the second relationship with electronic device 600 and fourth device user interface object 624 corresponds to a fourth external device 628 having the second relationship with electronic device 600. Accordingly, electronic device 600 is configured to manage third external device 626 and fourth external device 628, but electronic device 600 is not paired to third external device 626 and fourth external device 628 and does not sync the particular type of data with third external device 626 and fourth external device 628. Electronic device 600 is configured to control and/or adjust a limited amount of settings of third external device 626 and fourth external device 628, such as a schedule of and/or activation of a restricted mode, location services, and/or a connection between electronic device 600 and third external device 626 and fourth external device 628.

At FIG. 6B, third device user interface object 622 includes display representation 622a (e.g., a representation of a watch face configured to be displayed on third external device 626), third external device name 622b (e.g., "Princess Emma"), third external device information 622c (e.g., a size of third external device 626, a material of third external device 626, a model of third external device 626, and/or a user name of an account in which third external device 626 is signed into), and/or visual indication 622d (e.g., an avatar and/or a monogram) of a user associated with third external device 626 (e.g., a user associated with the user account in which third external device 626 is signed into). Similarly, fourth device user interface object 624 includes display representation 624a (e.g., a representation of a watch face configured to be displayed on fourth external device 628), fourth external device name 624b (e.g., "Cel's Watch"), fourth external device information 624c (e.g., a size of fourth external device 628, a material of fourth external device 628, a model of fourth external device 628, and/or a user name of an account in which fourth external device 628 is signed into), and/or visual indication 624d (e.g., an avatar and/or a monogram) of a user associated with fourth external device 628 (e.g., a user associated with the user account in which fourth external device 628 is signed into).

At FIG. 6B, visual indication 622d and visual indication 624d are displayed within third device user interface object 622 and fourth device user interface object 624, respectively. At FIG. 6B, visual indication 622d is overlaid on (e.g., positioned at least partially on top of and/or at least partially overlapping) display representation 622a and visual indication 624d is overlaid on (e.g., positioned at least partially on top of and/or at least partially overlapping) display representation 624a. In some embodiments, visual indication 622d and visual indication 624d are positioned adjacent to (e.g., next to without overlapping) display representation 622a and display representation 624a, respectively, such that visual indication 622d and visual indication 624d do not obstruct display representation 622a and display representation 624a, respectively.

In some embodiments, display representation 622a and display representation 624a are based on information received by electronic device 600 from third external device 626 and fourth external device 628, respectively. In some embodiments, display representation 622a and display representation 624a are partially based on information received by electronic device 600 from third external device 626 and fourth external device 628, respectively. In some embodiments, display representation 622a and display representation 624a are based on information received by electronic device 600 from a server and/or other external device (e.g., an external device other than third external device 626 and fourth external device 628). In some embodiments, display representation 622a and display representation 624a are not based on information received by electronic device 600, but instead include generic representations of user interfaces configured to be displayed on third external device 626 and fourth external device 628. In some embodiments, display representation 622a and display representation 624a are based on a time at which electronic device 600 displays device management user interface (e.g., a time that falls within or outside of a schedule for a restricted mode of third external device 626 and/or fourth external device 628).

For instance, at FIG. 6B, third external device 626 includes a display 630 and is displaying watch face user interface 632 on display 630 (and is configured to display watch face user interface 632 when the device is accessed (e.g., the display is activated)). Additionally, fourth external device 628 includes a display 634 and is displaying watch face user interface 636 on display 634 (and is configured to display watch face user interface 634 when the device is accessed (e.g., the display is activated)). At FIG. 6B, watch face user interface 632 is different from display representation 622a. For example, watch face user interface 632 includes time indicator 632a, date indicator 632b, first user interface object 632c, and image 632d (e.g., a customized image and/or an image selected by user to be included on watch face user interface 632). Third device user interface object 622 includes display representation 622a having a user interface 638 with a plurality of icons corresponding to applications that are configured to be executed by third external device 626. As such, while third external device 626 displays watch face user interface 632, device management user interface 608 displays display representation 622a as being different from watch face user interface 632. Thus, display representation 622a is not based on watch face user interface 632 that is currently displayed (and/or configured to be displayed) on third external device 626. In some embodiments, display representation 622a includes user interface 638 and/or another default user interface (e.g., a default watch face) that is not currently displayed by third external device 626 based on a distance between electronic device 600 and third external device 626. For example, when third external device 626 and electronic device 600 are outside of a threshold range from one another (e.g., a range of distances configured to establish short range communication), electronic device 600 causes display representation 622a to include user interface 638 and/or another default user interface (e.g., a default watch face). In some embodiments, electronic device 600 causes display representation 622a to include user interface 638 and/or another default user interface regardless of whether third external device 626 and electronic device 600 are inside of or outside of the threshold range.

As set forth above, at FIG. 6B, fourth external device 628 displays watch face user interface 636. Watch face user interface 636 corresponds to a restricted mode of fourth external device 628, where the restricted mode limits functions configured to be performed by fourth external device 628. For example, the restricted mode limits an ability of fourth external device 628 to launch (e.g., some) applications installed on fourth external device 628 and/or to output notifications corresponding to applications installed on fourth external device 628. At FIG. 6B, watch face user interface 636 includes analog time indicator 636a, digital time indicator 636b, and user indicator 636c (e.g., "Cel D"). Similarly, display representation 624a includes watch face user interface 640 corresponding to the restricted mode of fourth external device 628. At FIG. 6B, watch face user interface 640 includes analog time indicator 640a, digital time indicator 640b, and user indicator 640c. Analog time indicator 640a and digital time indicator 640b correspond to a default time (e.g., 10:09) instead of a current time (e.g., 12:25) represented by analog time indicator 636a and digital time indicator 636b. In some embodiments, analog time indicator 640a and digital time indicator 640b correspond to the current time as opposed to the default time.

At FIG. 6B, watch face user interface 636 and watch face user interface 640 correspond to each other and are similar in appearance, but do not include and/or indicate the same time of day. In some embodiments, electronic device 600 displays display representation 624a based on watch face information received from fourth external device 628 and/or another external device (e.g., a server). In other words, electronic device 600 determines an appearance of display representation 624a based on watch face information received from fourth external device 628 and/or another external device (e.g., a server). In some embodiments, electronic device 600 receives watch face information from fourth external device 628 in response to electronic device 600 and fourth external device 628 being positioned within a threshold distance from one another (e.g., a distance for establishing a short range communication connection). In some embodiments, electronic device 600 determines an appearance of display representation 624a based on a time at which electronic device 600 displays device management user interface 608. For instance, watch face user interface 636 corresponds to a restricted mode of fourth external device 628. As such, in response to a determination that a time at which device management user interface 608 is displayed is within a predetermined schedule for the restricted mode of fourth external device 628, electronic device 600 displays display representation 624a as having watch face user interface 640. Thus, electronic device 600 causes display representation 624a to include watch face user interface 640 based on a current time and not based on a proximity between electronic device 600 and fourth external device 628.

Electronic device 600 optionally receives updated watch face information about the configuration of external devices and/or updates display representation 622a and/or display representation 624a when third external device 626 and/or fourth external device 628 are positioned within a threshold range (e.g., a range for establishing short range communication) from electronic device 600 and/or in response to electronic device 600 receiving (e.g., updated) watch face information from the respective external device and/or another external device (e.g., a server). At FIG. 6C, electronic device 600 receives watch face information and, as a result, display representation 622a is updated to display watch face user interface 642, which corresponds to and is similar to watch face user interface 632 currently configured to be displayed (and, optionally, is displayed) on third external device 626. For example, watch face user interface 642 includes time indicator 642a, date indicator 642b, first user interface object 642c, and image 642d. At FIG. 6C, a distance between third external device 626 and electronic device 600 is within the threshold range from one another (e.g., a range for establishing short range communication). As such, electronic device 600 receives updated watch face information and updates display representation 622a in response to receiving watch face information from third external device 626. In some embodiments, electronic device 600 updates display representation 622a in response to receiving watch face information from the respective external device or another external device (e.g., a server). At FIG. 6C, time indicator 642a and date indicator 642b are different from time indicator 632a and date indicator 632b, respectively. Thus, while electronic device 600 displays display representation 622a to include substantially the same appearance as watch face user interface 632, electronic device 600 does not update time indicator 642a and date indicator 642b to reflect a current time and date, respectively. In some embodiments, electronic device displays time indicator 642a and date indicator 642b to represent the current time and date to match time indicator 632a and date indicator 632b, respectively.

Figure 6C:
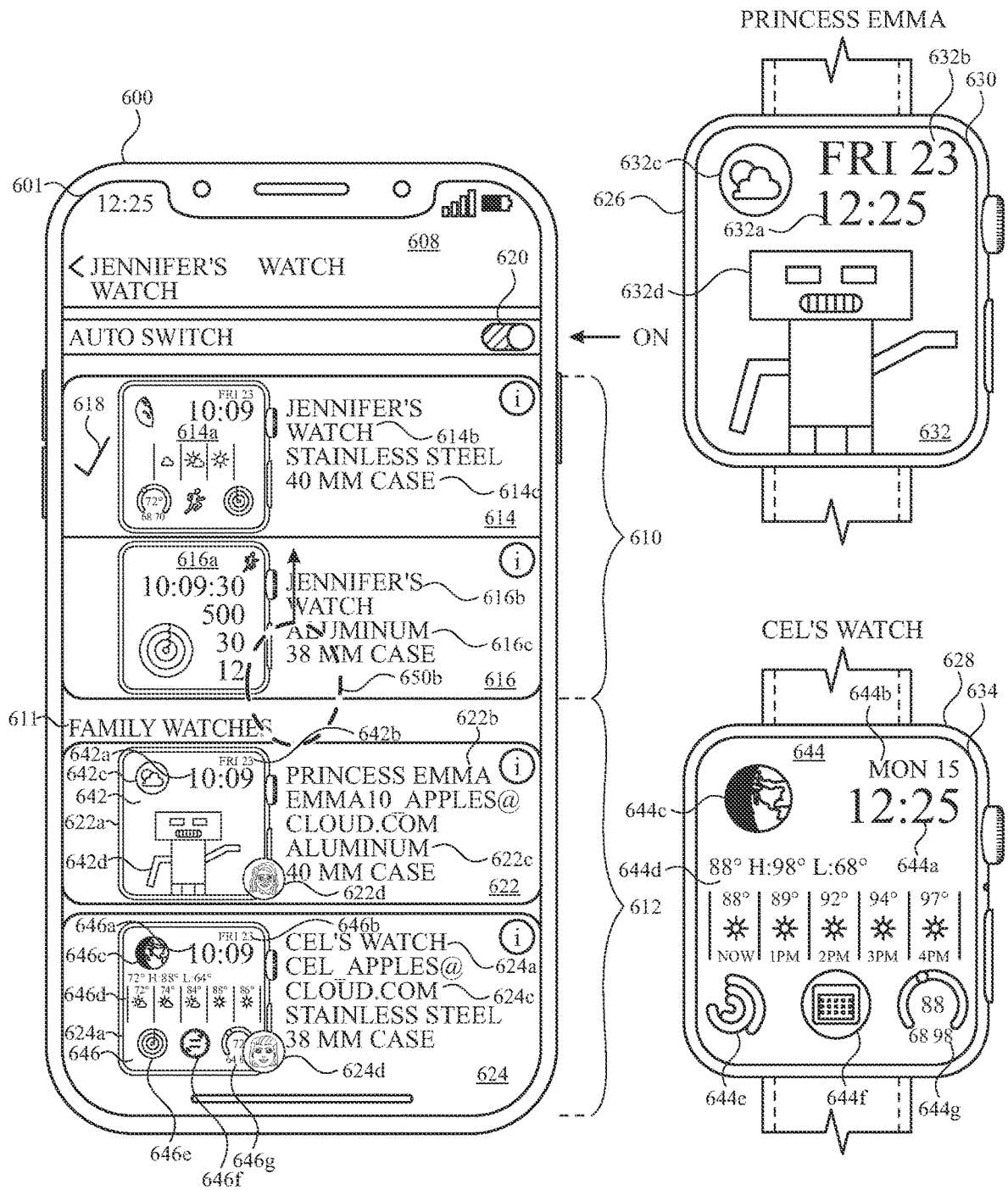

At FIG. 6C, first user interface object 642c and image 642d are the same as first user interface object 632c and image 632d. In some embodiments, first user interface object 632c and image 632d are set and/or selected via user input received by third external device 626. For example, a user of third external device 626 (e.g., a user that is different from a primary user of electronic device 600) selects, via one or more user inputs detected by third external device 626, first user interface object 632c and image 632d to include on watch face user interface 632. First user interface object 632c includes information that corresponds to an application installed on third external device 626. The user of third external device 626 can select a particular user interface object corresponding to a particular application to customize watch face user interface 632. Similarly, image 632d can be selected by the user of third external device 626 from a photo library and/or an image library of third external device 626. Thus, watch face user interface 632 includes customized features that are also included in watch face user interface 642. In some embodiments, information currently displayed and/or included in first user interface object 632c is not included in first user interface object 642c. Instead, first user interface object 642c includes default information that does not represent current, context-specific information that is displayed by first user interface object 632c on third external device 626.

At FIG. 6C, fourth external device 628 is no longer operating in the restricted mode and displays watch face user interface 644. Watch face user interface 644 is not associated with the restricted mode, thereby enabling fourth external device 628 to operate normally (e.g., access to applications and/or output of notifications by fourth external device 628 is not restricted and/or limited). At FIG. 6C, watch face user interface 644 includes time indicator 644a, date indicator 644b, first user interface object 644c, second user interface object 644d, third user interface object 644e, fourth user interface object 644f, and fifth user interface object 644g. First user interface object 644c corresponds to a first application of fourth external device 628, such as a lunar application configured to display a current phase of the moon. Second user interface object 644d and fifth user interface object 644g correspond to a second application of fourth external device 628, such as a weather application. Third user interface object 644e corresponds to a third application of fourth external device 628, such as an activity or workout application. Fourth user interface object 644f corresponds to a fourth application of fourth external device 628, such as a calendar application.

The user of fourth external device 628 (e.g., a user that is different from a primary user of electronic device 600) can select the user interface objects displayed on watch face user interface 644 to represent information that is relevant to the user of fourth external device 628. Fourth external device 628 displays various elements (e.g., complications, affordances, and/or user interface objects) on watch face user interface 644 in response to detecting one or more user inputs corresponding to selection of a particular element. In some embodiments, fourth external device 628 includes predetermined watch faces that a user can select and/or customize. In some embodiments, display representation 624a does not include customizations to predetermined watch faces that are set by the user of fourth external device 628, but does include the un-customized selected predetermined watch face.

At FIG. 6C, display representation 624a includes watch face user interface 646 that corresponds to and is similar in appearance to watch face user interface 644. However, watch face user interface 646 includes generic elements and/or components that are not included in watch face user interface 644 and/or are not updated to reflect current information displayed by watch face user interface 644. For example, watch face user interface 646 includes time indicator 646a, date indicator 646b, first user interface object 646c, second user interface object 646d, third user interface object 646e, fourth user interface object 646f, and fifth user interface object 646g. At FIG. 6C, time indicator 646a represents a first time (e.g., 10:09) that is different from a second time (e.g., 12:25) represented by time indicator 644a. Additionally, date indicator 646b represents a first date (e.g., FRI 23) that is different from a second date (e.g., MON 15) represented by date indicator 644b. In some embodiments, the first time and the first date are default dates that are displayed by fourth device user interface object 624 regardless of the current time and current date when device management user interface 608 is displayed. In some embodiments, electronic device 600 updates time indicator 646a and date indicator 646b to represent the current time and date when device management user interface 608 is displayed.

At FIG. 6C, first user interface object 646c corresponds to the first application of fourth external device 628, which is the same application as first user interface object 644c. However, first user interface object 646c includes default information that is not context-specific and/or based on current data from the first application. At FIG. 6C, first user interface object 644c is representative of current data from the first application (e.g., a current moon phase for the current time and current date) as indicated by a first amount of shading in first user interface object 644c. First user interface object 646c includes a second amount of shading, different from the first amount of shading, indicating a default state of first user interface object 646c. Accordingly, while first user interface object 646c represents the same application as first user interface object 644c, first user interface object 646c is not updated with current data on device management user interface 608.

Similarly, second user interface object 646d and fifth user interface object 646g correspond to the second application of fourth external device 628, which is the same application as second user interface object 644d and fifth user interface object 644g. However, second user interface object 646d and fifth user interface object 646g include default information that is not context-specific and/or based on current data from the second application. At FIG. 6C, second user interface object 646d and fifth user interface object 646g include default temperatures and times corresponding to a weather application (e.g., predetermined temperature values at predetermined times that do not correspond to current temperature values at a current time of day). For example, second user interface object 646d and fifth user interface object 646g indicate a current temperature of 72 degrees Fahrenheit (° F.), a high temperature of 88° F., and a low temperature of 64° F., while second user interface object 644d and fifth user interface object 644g indicate a current temperature of 88° F., a high temperature of 98° F., and a low temperature of 68° F. Further, second user interface object 646d includes temperatures for different times (e.g., now, 11 AM, 12 PM, 1 PM, and 2 PM) than second user interface object 644d (e.g., now, 1 PM, 2 PM, 3 PM, 3 PM). Accordingly, while second user interface object 646d and fifth user interface object 646g represent the same application as second user interface object 644d and fifth user interface object 644g, second user interface object 646d and fifth user interface object 646g are not updated with current, context-specific data from the second application on device management user interface 608.

Further still, third user interface object 646e corresponds to the third application of fourth external device 628, which is the same application as third user interface object 644e. However, third user interface object 646e includes default information that is not context-specific and/or based on current data from the third application. At FIG. 6C, third user interface object 646e includes default activity metrics corresponding to an activity application (e.g., predetermined activity metrics that do not correspond to current activity metrics for the user of fourth external device 628). For example, third user interface object 646e indicates that goals for three activity metrics have been fully completed (e.g., concentric rings representing the activity metrics are completely filled and/or extend at least 360 degrees about a center point), whereas third user interface object 644e indicates that the goals for the same three activity metrics are partially completed (e.g., concentric rings representing the activity metrics are partially filled and/or extend less than 360 degrees around a center point). Accordingly, while third user interface object 646e corresponds to the same application as third user interface object 644e, third user interface object 646e is not updated with current, context-specific data from the third application when displayed on device management user interface 608.

At FIG. 6C, fourth user interface object 646f corresponds to a fifth application, which is not the same as the fourth application represented by fourth user interface object 644f. For instance, fourth user interface object 646f corresponds to a compass or navigation application, whereas fourth user interface object 644f corresponds to a calendar application. As such, the user of fourth external device 628 customized fourth user interface object 644f (e.g., via one or more user inputs detected by fourth external device 628) and that customization is not updated on fourth device user interface object 624 of device management user interface 608. Thus, in some embodiments, electronic device 600 maintains default elements on watch face user interface 646 instead of updating watch face user interface 646 to display customizations displayed on the current watch face (e.g., watch face user interface 644) of fourth external device 628.

At FIG. 6C, electronic device 600 detects user input 650b (e.g., an upward swipe gesture) on device management user interface 608. In response to detecting user input 650b, electronic device 600 translates device management user interface 608, as shown at FIG. 6D. At FIG. 6D, electronic device 600 displays device management user interface 608, which includes first area 610, second area 612, and add watch affordance 648. First area 610 includes first device user interface object 614 (e.g., partial display of first device user interface object) and second device user interface object 616. Second area 612 includes third device user interface object 622 and fourth device user interface object 624. In response to detecting user input corresponding to selection of add watch affordance 648, electronic device 600 initiates a process for connecting an additional external device to electronic device 600. In other words, electronic device 600 initiates a process to establish the first relationship or the second relationship with the additional external device in response to detecting user input corresponding to selection of add watch affordance 648. To initiate the process for connecting the additional external device to electronic device 600, electronic device 600 ceases to display device management user interface 608 and displays an add watch user interface that enables a connection between the additional external device and electronic device 600 to be established.

At FIG. 6D, electronic device 600 detects user input 650c (e.g., a tap gesture) on settings user interface object 652 of third device user interface object 622. In response to detecting user input 650c, electronic device 600 displays limited settings user interface 654, as shown at FIG. 6E. Also, at FIG. 6D, electronic device detects user input 650d (e.g., a tap gesture) on third device user interface object 622. In response to detecting user input 650d, electronic device 600 displays settings user interface 656 when device management user interface 608 is displayed and when third external device 626 is within a threshold range from electronic device 600 (e.g., a range that enables short range communication to be established), as shown at FIG. 6H. In response to detecting user input 650d, electronic device 600 displays notification 657 on device management user interface 608 when third external device is outside of the threshold range from electronic device, as shown at FIG. 6M.

At FIG. 6E, limited settings user interface 654 includes third external device name 654a (e.g., "Princess Emma"), third external device information 654b (e.g., a name of third external device 626, such as "Princess Emma," a size of third external device 626, and/or a material of third external device 626), restricted mode user interface object 654c, location user interface object 654d, and disconnect user interface object 654e. As set forth below with reference to FIGS. 6F and 6G, restricted mode user interface object 654c enables a user of electronic device 600 to view, adjust, and/or control settings of a restricted mode of third external device 626. In response to detecting user input corresponding to selection of location user interface object 654d, electronic device 600 determines location information associated with third external device 626. For example, in response to detecting user input corresponding to selection of location user interface object 654d, electronic device 600 receives location information (e.g., coordinates) of third external device 626 (e.g., from a server, from third external device 626, and/or from another external device that is different from third external device 626). In some embodiments, electronic device 600 launches an application (e.g., a maps application) to display the location information of third external device 626 in response to detecting user input corresponding to selection of location user interface object 654d. Further, in response to detecting user input corresponding to selection of disconnect user interface object 654e, electronic device 600 initiates a process to terminate a connection between and/or the second relationship between electronic device 600 and third external device 626.

At FIG. 6E, electronic device 600 detects user input 650e (e.g., a tap gesture) on restricted mode user interface object 654c. In response to detecting user input 650e on restricted mode user interface object 654c, electronic device displays restricted mode user interface 658, as shown at FIG. 6F. At FIG. 6F, restricted mode user interface 658 includes information for a restricted mode for third external device 626. Restricted mode user interface 658 includes user interface object 658a (e.g., toggle button) for activating and deactivating a restricted mode for third external device 626. In some embodiments, user input selecting user interface object 658a causes electronic device 600 to initiate a process for activating the restricted mode on third external device 626 (e.g., user input selecting user interface object 658a causes electronic device 600 to send data to third external device 626 that causes third external device 626 to activate the restricted mode). In some embodiments, user input selecting user interface object 658a causes electronic device 600 to initiate a process for activating the restricted mode for third external device 626 according to a predetermined schedule (e.g., during a certain time range on one or more days).

At FIG. 6F, restricted mode user interface 658 includes schedule user interface object 658b, which enables a user of electronic device 600 to adjust and/or set the predetermined schedule for the restricted mode of third external device 600. Schedule user interface object 658b includes visual indications (e.g., text) of the schedule for when third external device 626 operates in the restricted mode. At FIG. 6F, schedule user interface object 658b indicates that the restricted mode of third external device 626 is configured to be activated from 8 AM to 3 PM on Monday through Friday of each week (e.g., the restricted mode for third external device 626 has a predefined time range of 8 AM to 3 PM on Monday through Friday, such that third external device 626 operates in the restricted mode between 8 AM and 3 PM on Monday through Friday of each week). At FIG. 6F, electronic device 600 detects user input 650f (e.g., tap gesture) on schedule user interface object 658b. In response to detecting user input 650f on schedule user interface object 658b, electronic device 600 displays scheduling user interface 660 for editing/setting a customizable schedule according to which third external device 626 will operate in the restricted mode, as shown at FIG. 6G.

At FIG. 6G, scheduling user interface 660 enables a user of electronic device 600 to edit and/or customize the schedule indicated on schedule user interface object 658b. Scheduling user interface 660 includes start time user interface object 660a, end time user interface object 660b, every day user interface object 660c, custom day user interface object 660d, days of the week user interface objects 660e-660k, and set schedule user interface object 660l. In response to detecting user input on start time user interface object 660a, electronic device 600 enables a user to adjust a start time for which the restricted mode of third external device 626 will be activated (e.g., on selected days of the week). Similarly, in response to detecting user input on end time user interface object 660b, electronic device 600 enables a user to adjust an end time for which the restricted mode of third external device 626 will be deactivated (e.g., on selected days of the week). In response to detecting user input on every day user interface object 660c, electronic device initiates a process to activate the restricted mode on third external device 626 from the start time indicated by start time user interface object 660a to the end time indicated by end time user interface object 660b for every day of each week. In response to detecting user input on custom day user interface object 660d, electronic device displays and/or otherwise enables user interaction with days of the week user interface objects 660e-660k. As such, when custom day user interface object 660d is selected (e.g., activated), electronic device 600 detects user input corresponding to one or more of the days of the week user interface objects 660e-660k to determine which days of each week to initiate the process for activating the restricted mode on third external device 626 from the start time to the end time. In response to detecting user input on set schedule user interface object 660l, electronic device 600 displays restricted mode user interface 658 and updates schedule user interface object 658b to visually indicate any changes and/or updates to the predetermined schedule set while electronic device 600 displayed scheduling user interface 660.

Turning back to FIG. 6F, restricted mode user interface 658 includes report log 658c showing exit events (referred to in restricted mode user interface 658 as "UNLOCKS") indicating times and durations when third external device 626 exited the restricted mode. In some embodiments, third external device 626, which is remote from electronic device 600, can record data representing an indication that third external device 626 has ceased operating in the restricted mode (and/or was unlocked while in the restricted mode). This data is obtained by electronic device 600 and used to generate report log 658c. In some embodiments, the recorded data is transmitted (directly or indirectly) from third external device 626 to electronic device 600. In some embodiments, the recorded data is obtained when third external device 626 exits the restricted mode during the predetermined schedule. In some embodiments, the recorded data is obtained when third external device 626 re-enters the restricted mode during the predetermined schedule. In some embodiments, the recorded data is obtained periodically (e.g., every five minutes, every hour, or at the end of the day or the end of the week).

Report log 658c groups exit events by day (e.g., "TODAY", "YESTERDAY"). In some embodiments, restricted mode user interface 658 can be scrolled to display additional exit events (e.g., exit events for days prior to "YESTERDAY"). In some embodiments, report log 658c groups exit events by restricted mode period (e.g., if the predetermined schedule includes more than one predefined time range in a day (e.g., 8 AM-1 PM and 2 PM-3:30 PM), report log 658c groups exit events by predefined time range). At FIG. 6F, report log 658c indicates a number of exit events for each day (e.g., 3 unlocks for "TODAY" and 2 unlocks for "YESTERDAY"). Report log 658c includes exit event items 658c-1 through 658c-5 that indicate the time the restricted mode was exited (e.g., deactivated and/or unlocked) and the duration of the exit event (e.g., how long the restricted mode was deactivated and/or unlocked). As such, electronic device 600 displays report log 658c including exit event items corresponding to times and durations when third external device 626 exited the restricted mode during the predetermined schedule.

As set forth above, in response to detecting user input 650d, electronic device 600 displays settings user interface 656 when device management user interface 608 is displayed and when third external device 626 is within the threshold range from electronic device 600 (e.g., a range that enables short range communication to be established), as shown at FIG. 6H. At FIG. 6H, settings user interface 656 includes device relationship indicator (e.g., "Family Watches"), third device name 656b (e.g., "Princess Emma"), search user interface object 656c, first settings area 662, second settings area 664, and automatic application install user interface object 656d. As set forth above, electronic device 600 displays settings user interface 656 in response to a determination that third electronic device 626 is within the threshold range from electronic device 600. Accordingly, electronic device 600 displays limited settings user interface 654 regardless of a distance between electronic device 600 and third external device 600, but displays settings user interface 656 in response to third external device 626 being within the threshold range from electronic device 600. In some embodiments, settings user interface 656 enables electronic device 600 to cause adjustment to settings of third external device 626 that involve a particular connection (e.g., short range communication connection) between third external device 626 and electronic device 600. In some embodiments, settings that are available and/or accessible via limited settings user interface 654 are also available and/or accessible via settings user interface 656. Thus, settings user interface 656 includes additional settings that electronic device 600 is configured to adjust and/or control when third external device 626 is positioned within the threshold range from electronic device 600.

At FIG. 6H, electronic device 600 detects user input 650g (e.g., a tap gesture) on first settings user interface object 662a of first settings area 662 of settings user interface 656. In response to detecting user input 650g, electronic device 600 displays general settings user interface 666, as shown at FIG. 6I. General settings user interface 666 enables electronic device 600 to adjust and/or control various settings of third external device 626 that are different from the restricted mode settings, location settings, and/or a connection setting between electronic device and third external device 626 (e.g., settings provided in limited settings user interface 654). For example, general settings user interface 666 includes software update user interface object 666a. In response to detecting user input corresponding to software update user interface object 666a, electronic device 600 initiates a process (e.g., displays a software update user interface) for updating software (e.g., operating software) installed on third external device 626.

In some embodiments, third external device 626 (and fourth external device and/or other external devices having the second relationship with electronic device) is not in communication with (e.g., paired to and/or having the first relationship with) another device. In other words, third external device 626 is in communication with electronic device 600 (e.g., via the second relationship), but third external device 626 is not in communication with and/or have other relationships of the first type with other devices. Thus, settings user interface 656 enables settings, such as software updates, of third external device 626 to be adjusted and/or controlled via electronic device 600. In some embodiments, one or more of the settings available via settings user interface 656 can be controlled and/or adjusted directly on third external device 626 (e.g., via one or more user inputs detected by third external device 626). In some embodiments, one or more of the settings available via settings user interface 656 are controlled solely by electronic device 600.

In some embodiments, electronic device 600 controls a setup process for third external device 626. For instance, electronic device 600 displays one or more user interfaces associated with the setup process for third external device 626. In some embodiments, electronic device 600 displays the one or more user interfaces of the setup process for third external device 626 in response to user input on add watch affordance 648. In some embodiments, electronic device 600 displays the one or more user interfaces of the setup process for third external device 626 in response to third external device 626 being positioned within a threshold distance from electronic device 600. The setup process of third external device 626 enables operating settings (e.g., location settings, network settings, and/or cellular settings) of third external device 626 to be set when third external device 626 is first powered on and/or in a default mode (e.g., an initial mode where third external device 626 is not signed into a user account). In some embodiments, the setup process enables third external device 626 to be associated with (e.g., signed into) a user account of a user that is different from a user account signed into by electronic device 600. As such, third external device 626 can be signed into a user account that is different from a user account signed into by electronic device 600, but electronic device 600 still manages third external device 626.

Figure 6J:
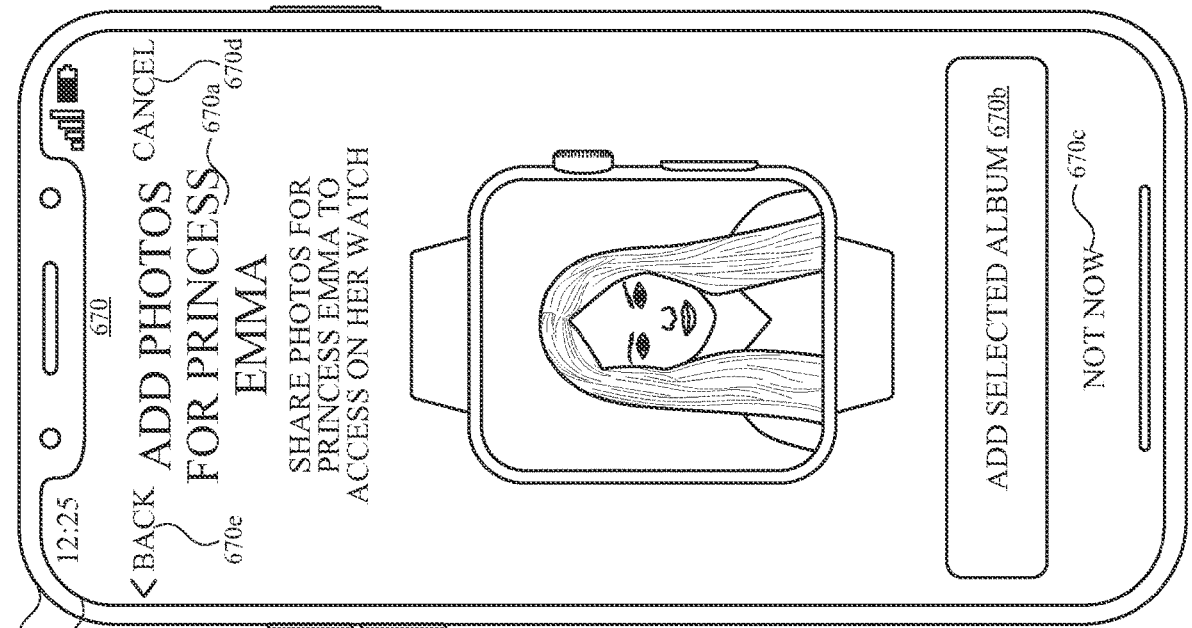

The setup process of third external device 626 enables a user (e.g., a user of electronic device 600) to skip various steps, such that the user can complete some steps of the setup process and leave other steps of the setup process incomplete. Electronic device 600 detects when one or more of the steps of the setup process are left incomplete and enables the user of electronic device 600 to complete the skipped steps at a later time (e.g., a time after electronic device 600 initially activates the setup process for third external device 626). In response to detecting that the one or more steps of the setup process are incomplete, electronic device 600 displays setup user interface object 668 on settings user interface 656, as shown at FIG. 6J. At FIG. 6J, setup user interface object 668 includes an indication (e.g., a textual indication) that the setup process for third external device 626 is incomplete (e.g., "Finish setting up Princess Emma"). Setup user interface object 668 enables electronic device 600 to re-initiate the setup process at the steps of the setup process that were skipped and/or left incomplete.

Figure 6K:
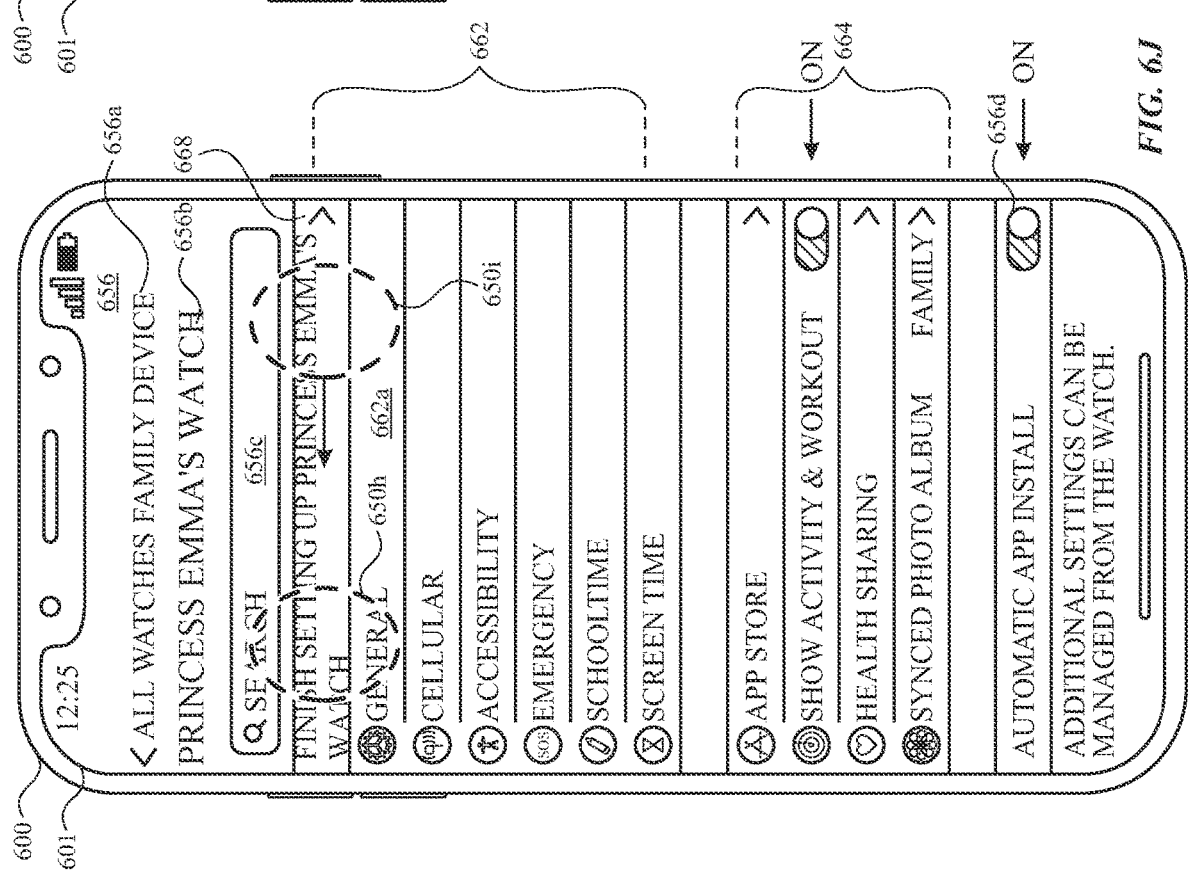

At FIG. 6J, electronic device 600 detects user input 650h (e.g., a tap gesture) corresponding to selection of setup user interface object 668. In response to detecting user input 650h, electronic device 600 displays setup user interface 670, as shown at FIG. 6K. Alternatively, electronic device 600 can remove (e.g., cease to display) setup user interface object 668 in response to detecting user input 650i (e.g., a left swipe gesture), as shown at FIG. 6L. In some embodiments, the user of electronic device 600 can remove setup user interface object 668 and skip one or more steps of the setup process entirely when the one or more steps of the setup process are associated with features that are not used by third electronic device 626 (e.g., transferring photos from electronic device 600 to third external device 626).

At FIG. 6K, electronic device 600 displays setup user interface 670 in response to detecting user input 650h. Setup user interface 670 is associated with a step of the setup process corresponding to transferring photos from electronic device 600 to third external device 626. At FIG. 6K, setup user interface 670 includes step indicator 670a (e.g., "Add photos for Emma"), add photos affordance 670b, skip affordance 670c, cancel affordance 670d, and back affordance 670e. In response to detecting user input corresponding to selection of add photos affordance 670b, electronic device 600 displays a user interface of a photo application of electronic device 600, thereby enabling a user to select photos to transfer from electronic device 600 to third external device 626. In some embodiments, in response to detecting user input corresponding to skip affordance 670c, electronic device 600 displays another setup user interface associated with a different step of the setup process that has not been completed for third external device 626. In some embodiments, in response to detecting user input corresponding to skip affordance 670c, electronic device displays settings user interface 656.

As set forth above, in some embodiments, the user of electronic device 600 can clear setup user interface object 668 when the user does not wish to complete any incomplete steps in the setup process. For example, when electronic device 600 does not include any photos that are desired to be transferred to third external device 626, the user can clear setup user interface object 668 on settings user interface 656. At FIG. 6L, in response to detecting user input 650i, electronic device 600 displays remove user interface object 668a adjacent to setup user interface object 668. In some embodiments, electronic device 600 translates (e.g., moves) at least a portion of setup user interface object 668 in a direction associated with user input 650i (e.g., to the left) to display remove user interface object 668a. In response to detecting user input corresponding to selection of remove user interface object 668a, electronic device 600 ceases to display setup user interface object 668 on settings user interface 656.

As set forth above, in response to detecting user input 650d, electronic device 600 displays notification 657 on device management user interface 608 when third external device is outside of the threshold range from electronic device (e.g., no direct or peer-to-peer communication can be established), as shown at FIG. 6M. At FIG. 6M, notification 657 includes indicator 657a (e.g., a textual indicator) indicating that third external device 626 is not within range of electronic device 600. Further, notification 657 includes user interface object 657b (e.g., "OK"), which when selected via user input, causes electronic device 600 to cease display of notification 657 and display device management user interface 608. Accordingly, notification 657 enables a user to quickly comprehend that third external device 626 is not within range of electronic device 600, such that the user can position electronic device 600 and third external device 626 closer to one another and within the threshold range (e.g., a range suitable for establishing short range communication between electronic device and third external device 626).

FIG. 7 is a flow diagram illustrating a method for managing external devices using an electronic device in accordance with some embodiments. Method 700 is performed at a computer system (e.g., 100, 300, 500, 600) with a display generation component (e.g., display 601). Some operations in method 700 are, optionally, combined, the orders of some operations are, optionally, changed, and some operations are, optionally, omitted.

The computer system (e.g., a smart device, such as a smartphone or a smartwatch; and/or a mobile device) (e.g., 600) is in communication with a display generation component (e.g., a touch-sensitive display or a touch screen) (e.g., 601).

While the computer system (e.g., 600) is configured to manage (e.g., adjust one or more settings of) one or more external devices that have a first relationship with the computer system and is configured to manage (e.g., adjust one or more settings of) one or more external devices (e.g., 626 and/or 628) that have a second relationship with the computer system, the computer system (e.g., 600) receives (702) a request (e.g., user input and/or tap input on an affordance) to display a device management user interface (e.g., 608) for devices managed by the computer system. The external devices with the first relationship sync a first type of data (e.g., notifications corresponding to one or more applications, such as messaging notifications corresponding to a messaging conversation of a messaging application, coaching notifications corresponding to a fitness application, and/or calendar notifications corresponding to a calendar application) with the computer system (e.g., 600) and external devices (e.g., 626 and/or 628) with the second relationship do not sync the first type of data (e.g., notifications corresponding to one or more applications, such as messaging notifications corresponding to a messaging conversation of a messaging application, coaching notifications corresponding to a fitness application, and/or calendar notifications corresponding to a calendar application) with the computer system (e.g., 600).

In response to receiving the request to display the device management user interface (e.g., 608), the computer system (e.g., 600) displays (704), via the display generation component (e.g., 601), the device management user interface (e.g., 608) (e.g., a watch management user interface).

Displaying the device management user interface (e.g., 608) includes the computer system (e.g., 600) concurrently displaying (706) a first user interface object (708) (e.g., 614 and/or 616) (e.g., a first affordance that, when selected, displays a first control user interface for adjusting settings (e.g., all available settings) of the first external device) corresponding to a first external device that has the first relationship with the computer system (e.g., 600) (e.g., the first external device is different from the computer system, such as a first watch) and a second user interface object (710) (e.g., 622 and/or 624) (e.g., a second affordance that, when selected, displays a second control user interface for adjusting a limited amount of settings (e.g., the second control user interface is different from the first control user interface and does not enable adjustment and/or control of all available settings) of the second external device) corresponding to a second external device (e.g., 626 and/or 628) that has the second relationship with the computer system (e.g., 600). The second user interface object (e.g., 622 and/or 624) is visually distinguished from the first user interface object (e.g., 614 and/or 616) in the device management user interface (e.g., 608) to indicate that the second external device (e.g., 626 and/or 628) has the second relationship with the computer system (e.g., 600).

Concurrently displaying user interface objects that correspond to external devices that have both the first and the second relationship with the computer system provides the user with feedback about the external devices with which the computer system has the first and second type of relationships and are therefore available to be managed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the computer system by enabling the user to use the device more quickly and efficiently.

In some embodiments, the one or more external devices (e.g., watches) that have the first relationship with the computer system are paired to the computer system. External devices that are paired to the computer system sync the first type of data with the computer system, the first type of data including notifications (e.g., notifications of instant messages that are part of a messaging conversation) from the computer system (e.g., via a communication connection, such as Bluetooth) and/or notifications directed to a first account (e.g., from an external device, different from the computer system, such as over a network and/or via a server) that both the external device and the computer system are signed into. In some embodiments, the computer system receives a notification (e.g., notification of an instant message) and transmits the notification (or an indication thereof) to the paired external device, such that the paired external device presents the notification (or indication thereof) to the user (e.g., with or without the computer system also presenting the notification to the user). The one or more external devices having the first relationship with the computer system are signed into the same account as the computer system, thereby providing the computer system with the ability to fully control and adjust all available settings of each of the one or more external devices having the first relationship. In some embodiments, a paired external device remains paired with the computer system independent of whether the computer system and the external device are in communication.

In some embodiments, the one or more (e.g., a plurality of) external devices (e.g., watches) having the second relationship with the computer system are not paired to the computer system, and thus, the first type of data is not synced between the external device and the computer system (e.g., the computer system does not transmit received notifications (e.g., notifications of received instant messages that are part of a messaging conversation) to the external device), even when the computer system is in communication with the one or more external devices having the second relationship with the computer system. The one or more external devices having the second relationship with the computer system are each signed into accounts that are different from the account that the computer system is signed into. In some embodiments, the one or more external devices having the second relationship with the computer system are optionally signed into different accounts from one another. In some embodiments, the computer system is configured to manage (e.g., set restrictions on the external devices having the second relationship and/or utilize location services for the external devices having the second relationship) the one or more external devices having the second relationship with the computer system. In some embodiments, the computer system is not enabled to (e.g., does not have permissions to) adjust at least some of the settings of the one or more external devices having the second relationship (e.g., appearance settings, watch face settings, complication settings, application settings, and/or notification settings).

In some embodiments, displaying the device management user interface (e.g., 608) includes the computer system (e.g., 600) concurrently displaying a first visual indication (e.g., 614*b* and/or 616*b*) (e.g., an avatar, a monogram, and/or another visual representation of the first user displayed next to, adjacent to, and/or overlapping with the first user interface object) of a first user signed into a first account (e.g., the same account that the computer system is signed into) on the first external device and a second visual indication (e.g., 622*b*, 622*c*, 622*d*, 624*b*, 624*c*, and/or 624*d*) (e.g., an avatar, a monogram, and/or another visual representation of the second user displayed next to, adjacent to, and/or overlapping with the second user interface object) of a second user signed into a second account (e.g., a different account from which the computer system and the first external device are signed into), different from the first account, on the second external device. The first visual indication (e.g., 614*b* and/or 616*b*) visually corresponds to the first external device (e.g., next to, adjacent to, and/or partially overlapping the first user interface object). The second visual indication (e.g., 622*b*, 622*c*, 622*d*, 624*b*, 624*c*, and/or 624*d*) visually corresponds to the second external device (e.g., next to, adjacent to, and/or partially overlapping the second user interface object).

Displaying the first visual indication and the second visual indication provides the user with visual feedback about what user accounts are signed into the external devices. Accordingly, the computer system facilitates the user's ability to select an appropriate external device for management. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the computer system by enabling the user to use the device more quickly and efficiently.

In some embodiments, the first visual indication does not visually correspond to the second external device. In some embodiments, the second visual indication does not visually correspond to the first external device.

In some embodiments, displaying the device management user interface (e.g., 608) includes the computer system (e.g., 600) concurrently displaying a first user identification indicator (e.g., 614b, 614c, 616b, and/or 616c) (e.g., text identifying the first account, such as a username of the first account, displayed next to, adjacent to, and/or overlapping with the first user interface object) of a first user signed into a first account (e.g., the same account that the computer system is signed into) on the first external device and a second user identification indicator (e.g., 622b, 622c, 624b, and/or 624c) (e.g., text identifying the second account, such as a username of the second account, displayed next to, adjacent to, and/or overlapping with the second user interface object) of a second user signed into a second account (e.g., a different account from which the computer system and the first external device are signed into), different from the first account, on the second external device (e.g., 626 and/or 628). The first user identification indicator (e.g., 614b, 614c, 616b, and/or 616c) is visually associated with the first external device (e.g., next to, adjacent to, and/or partially overlapping the first user interface object and/or is in a same user interface region or platter as the first user interface object). The second user identification indicator (e.g., 622b, 622c, 624b, 624c) is visually associated with the second external device (e.g., 626 and/or 628) (e.g., next to, adjacent to, and/or partially overlapping the second user interface object and/or is in a same user interface region or platter as the first user interface object).

Displaying the first user identification indicator and the second user identification indicator visually associated with the respective external devices provides the user with visual feedback about the user identification (e.g., username of the account) logged into the respective external device. Accordingly, the computer system facilitates the user's ability to select an appropriate external device for management. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the computer system by enabling the user to use the device more quickly and efficiently.

In some embodiments, the first user identification indicator is not visually associated with the second external device. In some embodiments, the second user identification indicator is not visually associated with the first external device.

In some embodiments, displaying the device management user interface (e.g., 608) includes the computer system (e.g., 600) concurrently displaying an add device user interface object (e.g., 648) (e.g., an affordance labeled "Pair New Watch") that, when selected via user input (e.g., a tap gesture), causes the computer system (e.g., 600) to initiate a process for enabling the computer system to manage a third external device (e.g., a process for establishing the first relationship or the second relationship between the computer system and the third external device). While displaying the add device user interface object (e.g., 648), the computer system (e.g., 600) receives a user input (e.g., tap input) corresponding to (e.g., on) the add device user interface object (e.g., 648). In response to receiving the user input corresponding to the add device user interface object (e.g., 648), the computer system (e.g., 600) displays, via the display generation component (e.g., 601), a user interface with one or more selectable options for managing the third external device.

Displaying a user interface with an option for adding a new external device to manage enables the computer system to create additional relationships with additional external devices for remote management, thereby reducing the need for the user to access the newly added devices to make configuration changes. Additionally, concurrently displaying an option for adding a new external device to manage with user interface objects that correspond to external devices that have both the first and the second relationship with the computer system, reduces the number of inputs needed to add external devices for remote management. Reducing the need to directly access various external devices to manage those devices and reducing the number of inputs needed to add external devices for remote management enhances the functionality of the computer system and makes the user-device interface more efficient (e.g., by helping the user to provide proper inputs and reducing user mistakes when operating/interacting with the device), which, additionally, reduces power usage and improves battery life of the device by enabling the user to use the device more quickly and efficiently.

In some embodiments, the process for enabling the computer system to manage the third external device provides an option (e.g., set up for myself or set up for a family member) to select whether the computer system will be paired to the third external device and establish the first relationship with the third external device or whether the computer system will only manage the third external device and establish the second relationship with the computer system.

In some embodiments, displaying the device management user interface (e.g., 608) includes the computer system (e.g., 600) concurrently displaying a third visual indication (e.g., 616a and/or 616b) (e.g., a visual graphic of a watch face, including a time indication, a background image, and/or complication(s)) corresponding to a watch face user interface of the first external device currently configured to be displayed by the first external device (e.g., a display generation component of first external device) and a fourth visual indication (e.g., 622a and/or 624a) (e.g., a visual graphic of a watch face, including a time indication, a background image, and/or complication(s)) corresponding to a watch face user interface of the second external device (e.g., 626 and/or 628) currently configured to be displayed by the second external device (e.g., 626 and/or 628) (e.g., a display generation component of second external device).

Displaying visual indications corresponding to watch faces of respective external devices provides the user with visual feedback about which external devices are available to be managed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the computer system by enabling the user to use the device more quickly and efficiently.

In some embodiments, prior to the computer system (e.g., 600) displaying the fourth visual indication (e.g., 622*a* and/or 624*a*) (and, optionally, prior to displaying the third visual indication), the computer system (e.g., 600) receives watch face information (e.g., information corresponding to the watch face currently configured to be displayed by the second external device) from a fourth external device (e.g., a server), different from the second external device (e.g., 626 and/or 628), where the fourth visual indication (e.g., 622*a* and/or 624*a*) is based on the watch face information.

In some embodiments, the computer system receives (e.g., from a server, from the respective external device) indications of the watch face currently configured to be displayed on the respective external device and/or user-customization of the watch face. The respective visual indication corresponding to the watch face user interface of the respective external device is based on the received indications of the watch face currently configured to be displayed on the respective external device and/or the user-customization of the watch face. For example, the customization of the watch face may have been performed at the respective external device. Thus, when the watch face currently configured on the respective external device is changed (e.g., from a first watch face to a second watch face), the computer system receives updated information indicating the new watch face and updates the visual indication corresponding to the watch face user interface accordingly.

In some embodiments, while the computer system (e.g., 600) displays the device management user interface (e.g., 608) (e.g., a device management application is launched and active on the computer system) (e.g., before the fourth visual indication is displayed), the computer system (e.g., 600) detects that a physical proximity between the computer system (e.g., 600) and the second external device (e.g., 626 and/or 628) satisfies a proximity condition (e.g., the computer system and the second external device are within a threshold distance from one another, such as a threshold distance that establishes short range communication between the computer system and the second external device). In response to the computer system (e.g., 600) detecting that the proximity condition between the computer system (e.g., 600) and the second external device (e.g., 626 and/or 628) is satisfied, the computer system (e.g., 600) receives (e.g., using the short-range communication connection) watch face information from the second external device (e.g., 626 and/or 628) (e.g., the second external device transmits watch face information to the computer system via short range communication), where the fourth visual indication (e.g., 622*a* and/or 624*a*) is based on the watch face information (e.g., the fourth visual indication is a visual graphic of a watch face being displayed on the second external device (e.g., the currently displayed watch face and/or a generic version of the currently displayed watch face)).

Receiving watch face information (e.g., that identifies an actively used watch face of the external device) from the external device enables the computer to system to provide the user with visual feedback with relevant visuals corresponding to external devices available for management, thereby making it easier for the user to recognize which external devices can be managed. Additionally, displaying a visual indication that is based on the received watch face information on the use interface provides information related to a state of the external device, without requiring further user input. Providing improved visual feedback to the user and providing information related to the state of the external device without requiring further user input enhance the operability of the device and make the user-device interface more efficient (e.g., by helping the user to provide proper inputs and reducing user mistakes when operating/interacting with the device) which, additionally, reduces power usage and improves battery life of the computer system by enabling the user to use the device more quickly and efficiently.

In some embodiments, (e.g., before the fourth visual indication is displayed) in response to detecting that the computer system is in short-range communication with the second external device when the device management user interface is displayed, the computer system requests and/or receives watch face information from the second external device (e.g., the second external device transmits watch face information to the computer system via short range communication), wherein the fourth visual indication is based on the watch face information. In some embodiments, the computer system does not request and/or receive watch face information from the second external device when either the computer system is not in short-range communication with the second external device or the device management user interface is not being displayed by the computer system.

In some embodiments, the fourth visual indication (e.g., 622*a* and/or 624*a*) includes a generic representation (e.g., 638 and/or 646) of a current watch face user interface of the second external device (e.g., 626 and/or 628) that includes one or more placeholder elements configured to be populated with contextually-relevant and/or user-specific information during normal operation of the second external device (e.g., 626 and/or 628). The computer system (e.g., 600) displays the one or more placeholder elements on the device management user interface (e.g., 608) with placeholder information that is not selected to be contextually-relevant and is not based on user-specific information (e.g., the generic representation of the current watch face user interface is a representation of the current watch face configured to be displayed on the second external device that does not include customizations/adjustments (e.g., to complications) of the current watch face user interface). In some embodiments, a user of the second external device customizes complications and/or images displayed on the currently displayed watch face user interface using the second external device. The generic representation includes the default version of the currently displayed watch face user interface without the customizations to complications and/or images that are set and/or adjusted by the user of the second external device.

Displaying a generic representation of a watch face of an external device with placeholders for contextually-relevant information enables the computer to system to provide the user with visual feedback with relevant visuals corresponding to external devices available for management without revealing sensitive information of the external devices. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the computer system by enabling the user to use the device more quickly and efficiently.

In some embodiments, users of the external devices can select from among different watch faces to be displayed by the external devices. The selected watch face can also be customized, such as with different color schemes, background images, and/or complications. In some embodiments, a generic representation of a watch face is a representation of a selected watch face without any customizations.

In some embodiments, the fourth visual indication (e.g., 622a and/or 624a) includes a current watch face user interface (e.g., 640, 642) of the second external device (e.g., 626 and/or 628). The fourth visual indication includes indications of user-customizations of the current watch face user interface (e.g., the currently displayed watch face user interface with customizations to complications and/or images included in the fourth visual indication).

Displaying a representation of a watch face of an external device with user-customizations of the watch face enables the computer to system to provide the user with visual feedback with relevant visuals corresponding to external devices available for management, thereby making it easier for the user to recognize which external devices can be managed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the computer system by enabling the user to use the device more quickly and efficiently.

In some embodiments, users of the external devices can select from among different watch faces to be displayed by the external devices. The selected watch face can also be customized, such as with different color schemes, background images, and/or complications. In some embodiments, the visual indication of the watch face user interface includes representation(s) of a selected watch face and one or more customizations to the watch face.

In some embodiments, the fourth visual indication (e.g., 622a and/or 624a) includes a plurality of icons (e.g., 638) including a first icon and a second icon, the first icon corresponding to a first application that is executable on the second external device and the second icon corresponding to a second application that is executable on the second external device. In some embodiments, the plurality of icons are part of an application springboard user interface (e.g., a generic application springboard user interface or a customized application springboard user interface set by a user of the second external device). In some embodiments, the first application and the second application are default applications that are pre-installed on the external device and/or that are applications that are not able to be deleted by the user.

Displaying icons corresponding to applications that are executable on a respective external device enables the computer to system to provide the user with visual feedback with relevant visuals corresponding to external devices available for management, thereby making it easier for the user to recognize which external devices can be managed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the computer system by enabling the user to use the device more quickly and efficiently.

In some embodiments, displaying the fourth visual indication (e.g., 622a and/or 624a) includes in accordance with a determination that the second external device (e.g., 626 and/or 628) is operating in a restricted mode (e.g., a time at which device management user interface is displayed is also a time that falls within a schedule for a restricted mode of the second external device), the computer system (e.g., 600) displays the fourth visual indication (e.g., 622a and/or 624a) as being a restricted mode watch face user interface (e.g., 640) (e.g., a watch face that limits functionality of the second external device when the second external device is operating in the restricted mode, such as a watch face that prevents access to and/or restricts notifications corresponding to one or more applications executable by the second external device when the second external device operates in the restricted mode). In some embodiments, displaying the fourth visual indication (e.g., 622a and/or 624a) includes in accordance with a determination that the second external device (e.g., 626 and/or 628) is not operating in the restricted mode, the computer system (e.g., 600) displays the fourth visual indication (e.g., 622a and/or 624a) as being a watch face (e.g., 638, 642, and/or 646) different from the restricted mode watch face user interface (e.g., 640).

Displaying different watch faces based on whether the external device is operating in the restricted mode enables the user to quickly and easily determine an operating state of the external device without requiring further user input. Enabling the user to determine an operating state of the external device without requiring further user input enhances the operability of the device and makes the user-device interface more efficient (e.g., by helping the user to provide proper inputs and reducing user mistakes when operating/interacting with the device) which, additionally, reduces power usage and improves battery life of the computer system by enabling the user to use the device more quickly and efficiently.

In some embodiments, the second user interface object (e.g., 622 and/or 624) includes a management affordance (e.g., 652) (e.g., a manage affordance and/or an information affordance). While displaying the management affordance (e.g., 652), the computer system (e.g., 600) detects a first user input (e.g., 650c) (e.g., a tap gesture) corresponding to (e.g., on) the management affordance (e.g., 652). In response to detecting the first user input (e.g., 650c) corresponding to the management affordance (e.g., 652), the computer system (e.g., 600) displays a management user interface (e.g., 654) (e.g., a user interface that enables the computer system to adjust and/or control a restricted mode of the second external device, location services of the second external device, and/or a connection between the second external device and the computer system) corresponding to the second external device (e.g., 626 and/or 628).

Displaying a management user interface that includes multiple controls for managing an external device enables the computer system to manage/configure different settings of the external device without requiring further user input. Enabling the computer system to manage/configure different settings of the external device without requiring further user input enhances the operability of the device and makes the user-device interface more efficient (e.g., by helping the user to provide proper inputs and reducing user mistakes when operating/interacting with the device) which, additionally, reduces power usage and improves battery life of the computer system by enabling the user to use the device more quickly and efficiently.

In some embodiments, while displaying the management user interface (e.g., 608), the computer system (e.g., 600) detects a second user input (e.g., 650e) (e.g., a tap gesture) corresponding to (e.g., on) a restrictions user interface object (e.g., 654c) (e.g., an affordance that enables a user of the computer system to adjust settings for a restricted mode (e.g., Schooltime mode) of the second external device) of the management user interface (e.g., 654). In response to detecting the second user input (e.g., 650e), the computer system (e.g., 600) displays a restrictions user interface (e.g., 658) (e.g., a user interface enabling the user of the computer system to adjust settings for the restricted mode of the second external device) including a scheduling user interface object (e.g., 658b) (e.g., "Schedule" affordance and/or restricted mode management affordance) that, when selected by user input, is configured to adjust a schedule for a restricted mode of the second external device (e.g., 626 and/or 628) (e.g., scheduling user interface object enables a user of the computer system to adjust the schedule (e.g., days and/or times) when the restricted mode is activated and/or activate/deactivate the restricted mode entirely (e.g., regardless of the schedule)).

Displaying a scheduling user interface object to adjust a schedule for a restricted mode of the second external device provides the user with the ability to restrict access on the external device without needing to directly access the external device, thereby increasing the security of the external device and reducing the likelihood that the external device will be used in an unintended manner.

In some embodiments, the restrictions user interface (e.g., 658) includes a first area corresponding to a first time period (e.g., the current day) and a second area corresponding to a second time period (e.g., the day before the current day), different from the first time period. The first area includes one or more first indicators (e.g., 658c-1, 658c-2, and/or 658c-3) (e.g., textual indicators of the time, duration, and/or number of unlock events that occurred for the second external device during the first time period) representing unlock events of the second external device (e.g., 626 and/or 628) from the restricted mode during the first time period. The second area includes one or more second indicators (e.g., 658c-4 and/or 658c-5) (e.g., textual indicators of the time, duration, and/or number of unlock events that occurred for the second external device during the second time period) representing unlock events of the second external device (e.g., 626 and/or 628) from the restricted mode during the second time period.

Displaying the number of times and dates/times at which the external device was unlocked during the restricted mode provides the user with visual feedback about the historical states of the external device without requiring the user to navigate to different user interfaces to obtain the information related to the historical states of the external device. Providing improved visual feedback to the user and displaying the historical states of the external device without requiring further user input enhances the operability of the device and makes the user-device interface more efficient (e.g., by helping the user to provide proper inputs and reducing user mistakes when operating/interacting with the device) which, additionally, reduces power usage and improves battery life of the computer system by enabling the user to use the device more quickly and efficiently.

In some embodiments, the first area and the second area are part of a scrollable list. The computer system detects a scroll gesture (e.g., swipe gesture) corresponding to (e.g., on) the scrollable list and, in response, scrolls the scrollable list to display a third area corresponding to a third time period different from the first time period and the second time period.

In some embodiments, the manage user interface (e.g., 654) includes a location sharing affordance (e.g., 654d) (e.g., Find my Watch) that, when selected via user input (e.g., a tap on the location sharing affordance), is configured to enable the computer system (e.g., 600) to determine (e.g., and present) a location of the second external device (e.g., 626 and/or 628).

In some embodiments, the computer system determines a location of the second external device and displays the location on a map.

In some embodiments, the manage user interface (e.g., 654) includes a disconnect affordance (e.g., 654e) (e.g., disconnect from watch, stop managing watch) that, when selected via user input, is configured to cease the second relationship between the computer system (e.g., 600) and the second external device (e.g., 626 and/or 628) (e.g., disconnect the second external device from the computer system to terminate the second relationship between the computer system and the second external device). The computer system (e.g., 600) detects selection, via user input, of the disconnect affordance (e.g., 654e). In response to detecting selection of the disconnect affordance (e.g., 654e), the computer system (e.g., 600) initiates a process to cease the second relationship between the computer system (e.g., 600) and the second external device (e.g., 626 and/or 628). In some embodiments, the disconnect affordance terminates the ability of the computer system to manage the second external device. In some embodiments, a first account signed into by computer system is disassociated with a second account signed into by second external device.

Displaying the disconnect affordance on the manage user interface enables a user to initiate a process for ceasing the relationship between the computer system and the external device without requiring further user input to navigate to another user interface. Displaying the disconnect affordance on the manage user interface without requiring further user input to navigate to another user interface enhances the operability of the device and makes the user-device interface more efficient (e.g., by helping the user to provide proper inputs and reducing user mistakes when operating/interacting with the device), which, additionally, reduces power usage and improves the battery life of the computer system by enabling the user to use the device more quickly and efficiently.

In some embodiments, the computer system (e.g., 600) is signed into a first account (e.g., a first account of a first user and/or without being signed into a second account) and the second external device (e.g., 626 and/or 628) is signed into a second account (e.g., a second account of a second user and/or without being signed into the first account), different from the first account. While displaying the device management user interface (e.g., 608) (e.g., a device management application is launched and active on computer system), the computer system (e.g., 600) detects that a proximity (e.g., physical proximity, wireless signal proximity, active wireless connection, etc.) between the computer system (e.g., 600) and the second external device (e.g., 626 and/or 628) satisfies a proximity condition (e.g., computer system and the second external device are within a threshold distance from one another, such as a threshold distance that establishes short range communication between the computer system and the second external device). While the proximity condition between the computer system (e.g., 600) and the second external device (e.g., 626 and/or 628) is satisfied, the computer system (e.g., 600) detects a third user input (e.g., 650*d*) (e.g., a tap gesture) on the second user interface object (e.g., 622 and/or 624). In response to detecting the third user input (e.g., 650*d*) on the second user interface object (e.g., 622 and/or 624), the computer system (e.g., 600) displays a settings user interface (e.g., 656) associated with the second account and the second external device (e.g., 626 and/or 628) (e.g., a settings user interface that enables the computer system that is signed into the first account, but not the second account, to adjust one or more settings of the second external device signed into the second account). In some embodiments, the settings user interface is different from a settings user interface that is displayed in response to user input on the first user interface object. The first user interface object corresponds to the first external device, which is also signed into the first account (e.g., the same account as the computer system). As such, the settings user interface associated with the first external device enables the computer system to adjust and/or control additional settings of the first external device when compared to the settings user interface for the second external device.

Displaying a settings user interface for setting up or continuing to set up (or otherwise configure settings of) the external device provides enables a user to manage the external device without requiring further user input to navigate to another user interface. Displaying the settings user interface for setting up or continuing to set up the external device without requiring further user input to navigate to another user interface enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting that the computer system is in short-range communication with the second external device when the device management user interface is displayed, the computer system displays the settings user interface associated with the second account and the second external device. In some embodiments, in response to detecting that the computer system is not in short-range communication with the respective external device when the device management user interface is displayed, the computer system does not display the settings user interface associated with the second account and the second external device and, optionally, displays an error message, instead.

In some embodiments, in response to detecting the third user input (e.g., 650*d*) on the second user interface object (e.g., 622 and/or 624) (and, optionally, in accordance with the proximity condition between the computer system and the second external device being satisfied) and in accordance with a determination that a setup process (e.g., setup steps for the second external device when the second external device is first powered on and/or not yet signed into the second account) for the second external device (e.g., 626 and/or 628) is not complete (e.g., setup steps were skipped and/or saved for later), the computer system (e.g., 600) displays a setup user interface object (e.g., 668) (e.g., finish setting up watch) in the settings user interface (e.g., 656) that, when selected via user input (e.g., 650*h*), is configured to continue the setup process for the second external device (e.g., 626 and/or 628) (e.g., cause the computer system to display a setup user interface for completing the setup process). In response to detecting the third user input (e.g., 650*d*) on the second user interface object (e.g., 622 and/or 624) (and, optionally, in accordance with the proximity condition between the computer system and the second external device being satisfied) and in accordance with a determination that the setup process for the second external device (e.g., 626 and/or 628) is complete (e.g., all setup steps were complete and/or not skipped), the computer system (e.g., 600) forgoes display of the setup user interface object (e.g., 668) in the settings user interface (e.g., 656).

Displaying a settings user interface for continuing a previously started device setup process of the external device enables the user to configure settings of the external device without requiring further user input to navigate to another user interface. Displaying the settings user interface for continuing a previously started device setup process of the external device without requiring further user input to navigate to another user interface enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the device management user interface (e.g., 608) includes the computer system (e.g., 600) concurrently displaying a first indicator (e.g., 622*b* and/or 624*b*) (e.g., textual indicator) corresponding to a user-defined designation (e.g., a name associated with the second external device received via user input) of the second external device (e.g., 626 and/or 628) and a second indicator (e.g., 622*c* and/or 624*c*) (e.g., textual indicator) corresponding to one or more characteristics (e.g., hardware characteristics, such as size, color, model, and/or material) of the second external device (e.g., 626 and/or 628).

Displaying a watch name assigned by the users of managed external devices along with hardware details of the managed device provides the user with visual information identifying the external devices available for management, thereby making it easier for the user to select an appropriate external device to manage. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user-defined designation of the second external device is designated by (inputted by) a user of the second external device at the second external device.

In some embodiments, the computer system (e.g., 600) detects a fourth user input (e.g., 650*d*) (e.g., a tap gesture) on the second user interface object (e.g., 622 and/or 624). In response to detecting the fourth user input (e.g., 650*d*) on the second user interface object (e.g., 622 and/or 624), the computer system (e.g., 600) displays a settings user interface (e.g., 656) associated with the second external device (e.g., 626 and/or 628). The settings user interface (e.g., 656) includes (e.g., at least one of, both of) a third indicator (e.g., 656*a*) (e.g., Family Device) indicating that the settings user interface (e.g., 656) is associated with an external device having the second relationship with the computer system or a fourth indicator (e.g., 656*b*) (e.g., Princess Emma) indicating identification information (e.g., a name associated with a user and/or a user-defined name) of the second external device (e.g., 626 and/or 628).

Displaying labels identifying whether an external device is part of a category of devices and/or the name of an external device provides the user with visual information to better identify the external devices available for management, thereby making it easier for the user to select an appropriate external device to manage. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) is signed into a first account (e.g., a first account of a first user and/or without being signed into a second account). The first user interface object (e.g., 614 and/or 616) is displayed in a first area (e.g., 610) (e.g., a first area of the device management user interface that includes one or more user interface objects corresponding to external devices having the first relationship with the computer system) of the device management user interface (e.g., 608) and the first external device is signed into the first account. The second user interface object (e.g., 622 and/or 624) is displayed in a second area (e.g., 612) of the device management user interface (e.g., 608) (e.g., a second area of the device management user interface that includes one or more user interface objects corresponding to external devices having the second relationship with the computer system), different from the first area (e.g., 610) (e.g., the second area is separate from the first area by a gap or blank space and/or separated from the first area via a label (e.g., "Family Watches") and the second external device (e.g., 626 and/or 628) is signed into a second account (e.g., a second account of a second user and/or without being signed into the first account), different from the first account (e.g., the second account is an account of a child).

Visually separating external devices having the first relationship with the computer system from external devices having the second relationship with the computer system provides the user with visual feedback on the type of relationship of the external devices (e.g., based on the location of the indicator of the external device). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

As described below, method 700 provides an intuitive way for managing external devices. The method reduces the cognitive burden on a user for managing external devices, thereby creating a more efficient human-machine interface. For battery-operated computing devices, enabling a user to manage external devices faster and more efficiently conserves power and increases the time between battery charges.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve and facilitate an ability to manage external devices. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to enable a user to quickly determine a particular external device to manage. Accordingly, use of such personal information data enables users to have improved control over external devices. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing information between an electronic device and one or more external devices, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, external devices may be identified based on non-personal information data or a bare minimum amount of personal information, such as the content being requested by the device associated with a user or publicly available information.

What is claimed is:

1. A computer system, comprising:
a display generation component;
one or more processors; and
memory storing one or more programs configured to be executed by the one or more processors, the one or more programs including instructions for:
while the computer system is configured to manage one or more external devices that have a first relationship with the computer system and is configured to manage one or more external devices that have a second relationship with the computer system, wherein external devices with the first relationship sync a first type of data with the computer system and external devices with the second relationship do not sync the first type of data with the computer system, wherein the first type of data is selected from a group consisting of messaging application data, fitness application data, and calendar application data, and wherein external devices with the first relationship are configured to sync the first type of data with the computer system without receiving user input, receiving a request to display a device management user interface for devices managed by the computer system; and
in response to receiving the request to display the device management user interface, displaying, via the display generation component, a device management user interface, wherein displaying the device management user interface includes concurrently displaying:
a first user interface object corresponding to a first external device that has the first relationship with the computer system, wherein the first user interface object includes a first representation of a respective user interface that has been configured for the first external device; and
a second user interface object corresponding to a second external device that has the second relationship with the computer system, wherein the second user interface object is visually distinguished from the first user interface object in the device management user interface to indicate that the second external device has the second relationship with the computer system, and wherein the second user interface object includes a second representation of a respective user interface that has been configured for the second external device.

2. The computer system of claim 1, wherein displaying the device management user interface includes concurrently displaying:
a first visual indication of a first user signed into a first account on the first external device, wherein the first visual indication visually corresponds to the first external device; and
a second visual indication of a second user signed into a second account, different from the first account, on the second external device, wherein the second visual indication visually corresponds to the second external device.

3. The computer system of claim 1, wherein displaying the device management user interface includes concurrently displaying:
a first user identification indicator of a first user signed into a first account on the first external device, wherein the first user identification indicator is visually associated with the first external device; and
a second user identification indicator of a second user signed into a second account, different from the first account, on the second external device, wherein the second user identification indicator is visually associated with the second external device.

4. The computer system of claim 1, wherein the one or more programs further include instructions for:
wherein displaying the device management user interface includes concurrently displaying an add device user interface object that, when selected via user input, causes the computer system to initiate a process for enabling the computer system to manage a third external device;
while displaying the add device user interface object, receiving a user input corresponding to the add device user interface object; and
in response to receiving the user input corresponding to the add device user interface object, displaying, via the display generation component, a user interface with one or more selectable options for managing the third external device.

5. The computer system of claim 1, wherein:
the respective user interface that has been configured for the first external device includes a watch face user interface of the first external device currently configured to be displayed by the first external device; and
the respective user interface that has been configured for the second external device includes a watch face user interface of the second external device currently configured to be displayed by the second external device.

6. The computer system of claim 5, wherein the one or more programs further include instructions for:
prior to displaying the watch face user interface of the second external device, receiving watch face information from a fourth external device, different from the second external device, wherein the watch face user interface of the second external device is based on the watch face information.

7. The computer system of claim 5, wherein the one or more programs further include instructions for:
while displaying the device management user interface, detecting that a physical proximity between the computer system and the second external device satisfies a proximity condition; and
in response to detecting that the proximity condition between the computer system and the second external device is satisfied, receiving watch face information from the second external device, wherein the watch face user interface of the second external device is based on the watch face information.

8. The computer system of claim 5, wherein the watch face user interface of the second external device includes a generic representation of a current watch face user interface of the second external device that includes one or more placeholder elements configured to be populated with contextually-relevant or user-specific information during normal operation of the second external device, wherein the one or more placeholder elements are displayed on the device management user interface with placeholder information that is not selected to be contextually-relevant and is not based on user-specific information.

9. The computer system of claim 5, wherein the watch face user interface of the second external device includes a current watch face user interface of the second external device, wherein the watch face user interface of the second external device includes indications of user-customizations of the current watch face user interface.

10. The computer system of claim 5, wherein the watch face user interface of the second external device includes a plurality of icons including a first icon and a second icon, the first icon corresponding to a first application that is executable on the second external device and the second icon corresponding to a second application that is executable on the second external device.

11. The computer system of claim 5, wherein displaying the watch face user interface of the second external device includes:
in accordance with a determination that the second external device is operating in a restricted mode, displaying the watch face user interface of the second external device as being a restricted mode watch face user interface; and
in accordance with a determination that the second external device is not operating in the restricted mode, displaying the watch face user interface of the second external device as being a watch face different from the restricted mode watch face user interface.

12. The computer system of claim 1, wherein the second user interface object includes a management affordance, and wherein the one or more programs further include instructions for:
while displaying the management affordance, detecting a first user input corresponding to the management affordance; and
in response to detecting the first user input corresponding to the management affordance, displaying a management user interface corresponding to the second external device.

13. The computer system of claim 12, wherein the one or more programs further include instructions for:
while displaying the management user interface, detecting a second user input corresponding to a restrictions user interface object of the management user interface; and
in response to detecting the second user input, displaying a restrictions user interface including a scheduling user interface object that, when selected by user input, is configured to adjust a schedule for a restricted mode of the second external device.

14. The computer system of claim 13, wherein the restrictions user interface includes:
a first area corresponding to a first time period, wherein the first area includes one or more first indicators representing unlock events of the second external device from the restricted mode during the first time period; and
a second area corresponding to a second time period, different from the first time period, wherein the second area includes one or more second indicators representing unlock events of the second external device from the restricted mode during the second time period.

15. The computer system of claim 12, wherein the manage user interface includes a location sharing affordance that, when selected via user input, is configured to enable the computer system to determine a location of the second external device.

16. The computer system of claim 12, wherein the one or more programs further include instructions for:
wherein the manage user interface includes a disconnect affordance that, when selected via user input, is configured to cease the second relationship between the computer system and the second external device;
detecting selection, via user input, of the disconnect affordance; and
in response to detecting selection of the disconnect affordance, initiating a process to cease the second relationship between the computer system and the second external device.

17. The computer system of claim 1, wherein the computer system is signed into a first account and the second external device is signed into a second account, different from the first account, and wherein the one or more programs further include instructions for:
while displaying the device management user interface, detecting that a proximity between the computer system and the second external device satisfies a proximity condition;
while the proximity condition between the computer system and the second external device is satisfied, detecting a third user input on the second user interface object; and in response to detecting the third user input on the second user interface object, displaying a settings user interface associated with the second account and the second external device.

18. The computer system of claim 17, wherein the one or more programs further include instructions for:
in response detecting the third user input on the second user interface object:
in accordance with a determination that a setup process for the second external device is not complete, displaying a setup user interface object in the settings user interface that, when selected via user input, is configured to continue the setup process for the second external device; and
in accordance with a determination that the setup process for the second external device is complete, forgoing display of the setup user interface object in the settings user interface.

19. The computer system of claim 1, wherein displaying the device management user interface includes concurrently displaying:
a first indicator corresponding to a user-defined designation of the second external device; and
a second indicator corresponding to one or more characteristics of the second external device.

20. The computer system of claim 1, wherein the one or more programs further include instructions for:
detecting a fourth user input on the second user interface object; and
in response to detecting the fourth user input on the second user interface object, displaying a settings user interface associated with the second external device, wherein the settings user interface includes a third indicator indicating that the settings user interface is associated with an external device having the second relationship with the computer system or a fourth indicator indicating identification information of the second external device.

21. The computer system of claim 1, wherein:
the computer system is signed into a first account;
the first user interface object is displayed in a first area of the device management user interface, and the first external device is signed into the first account; and
the second user interface object is displayed in a second area of the device management user interface, different from the first area, and the second external device is signed into a second account, different from the first account.

22. The computer system of claim 1, wherein the first representation of the respective user interface that has been configured for the first external device includes a first user interface that is currently configured to be displayed by the first external device and the second representation of the respective user interface that has been configured for the second external device includes a second user interface that is currently configured to be displayed by the second external device.

23. The computer system of claim 1, wherein:
the second user interface object includes concurrent display of:
the second representation of the respective user interface that has been configured for the second external device; and
a first person indicator of a third user associated with the second external device.

24. The computer system of claim 23, wherein the first user interface object is displayed without a second person indicator of a fourth user associated with the first external device.

25. The computer system of claim 23, wherein:
the first user interface object includes concurrent display of:
the first representation of the respective user interface that has been configured for the first external device; and
a third person indicator of a fifth user associated with the first external device.

26. The computer system of claim 1, wherein the first representation of the respective user interface that has been configured for the first external device includes a first user interface of a first type and the second representation of the respective user interface that has been configured for the second external device includes a second user interface of the first type.

27. The computer system of claim 1, wherein the first type of data includes fitness application data.

28. The computer system of claim 11, wherein the restricted mode watch face user interface is a watch face user interface that limits access to an application of the second external device while the second external device operates in the restricted mode.

29. A non-transitory computer-readable storage medium storing one or more programs configured to be executed by one or more processors of a computer system that is in communication with a display generation component, the one or more programs including instructions for:
while the computer system is configured to manage one or more external devices that have a first relationship with the computer system and is configured to manage one or more external devices that have a second relationship with the computer system, wherein external devices with the first relationship sync a first type of data with the computer system and external devices with the second relationship do not sync the first type of data with the computer system, wherein the first type of data is selected from a group consisting of messaging application data, fitness application data, and calendar application data, and wherein external devices with the first relationship are configured to sync the first type of data with the computer system without receiving user input, receiving a request to display a device management user interface for devices managed by the computer system; and
in response to receiving the request to display the device management user interface, displaying, via the display generation component, a device management user interface, wherein displaying the device management user interface includes concurrently displaying:
a first user interface object corresponding to a first external device that has the first relationship with the computer system, wherein the first user interface object includes a first representation of a respective user interface that has been configured for the first external device; and
a second user interface object corresponding to a second external device that has the second relationship with the computer system, wherein the second user interface object is visually distinguished from the first user interface object in the device management user interface to indicate that the second external device has the second relationship with the computer system, and wherein the second user interface object includes a second representation of a respective user interface that has been configured for the second external device.

30. The non-transitory computer-readable storage medium of claim 29, wherein displaying the device management user interface includes concurrently displaying:
   a first visual indication of a first user signed into a first account on the first external device, wherein the first visual indication visually corresponds to the first external device; and
   a second visual indication of a second user signed into a second account, different from the first account, on the second external device, wherein the second visual indication visually corresponds to the second external device.

31. The non-transitory computer-readable storage medium of claim 29, wherein displaying the device management user interface includes concurrently displaying:
   a first user identification indicator of a first user signed into a first account on the first external device, wherein the first user identification indicator is visually associated with the first external device; and
   a second user identification indicator of a second user signed into a second account, different from the first account, on the second external device, wherein the second user identification indicator is visually associated with the second external device.

32. The non-transitory computer-readable storage medium of claim 29, wherein:
   the respective user interface that has been configured for the first external device includes a watch face user interface of the first external device currently configured to be displayed by the first external device; and
   the respective user interface that has been configured for the second external device includes a watch face user interface of the second external device currently configured to be displayed by the second external device.

33. The non-transitory computer-readable storage medium of claim 32, wherein displaying the watch face user interface of the second external device includes:
   in accordance with a determination that the second external device is operating in a restricted mode, displaying the watch face user interface of the second external device as being a restricted mode watch face user interface; and
   in accordance with a determination that the second external device is not operating in the restricted mode, displaying the watch face user interface of the second external device as being a watch face different from the restricted mode watch face user interface.

34. The non-transitory computer-readable storage medium of claim 33, wherein the restricted mode watch face user interface is a watch face user interface that limits access to an application of the second external device while the second external device operates in the restricted mode.

35. The non-transitory computer-readable storage medium of claim 29, wherein the computer system is signed into a first account and the second external device is signed into a second account, different from the first account, and wherein the one or more programs further include instructions for:
   while displaying the device management user interface, detecting that a proximity between the computer system and the second external device satisfies a proximity condition;
   while the proximity condition between the computer system and the second external device is satisfied, detecting a third user input on the second user interface object; and
   in response to detecting the third user input on the second user interface object, displaying a settings user interface associated with the second account and the second external device.

36. The non-transitory computer-readable storage medium of claim 29, wherein:
   the computer system is signed into a first account;
   the first user interface object is displayed in a first area of the device management user interface, and the first external device is signed into the first account; and
   the second user interface object is displayed in a second area of the device management user interface, different from the first area, and the second external device is signed into a second account, different from the first account.

37. The non-transitory computer-readable storage medium of claim 29, wherein the first type of data includes fitness application data.

38. A method, comprising:
   at a computer system that is in communication with a display generation component:
      while the computer system is configured to manage one or more external devices that have a first relationship with the computer system and is configured to manage one or more external devices that have a second relationship with the computer system, wherein external devices with the first relationship sync a first type of data with the computer system and external devices with the second relationship do not sync the first type of data with the computer system, wherein the first type of data is selected from a group consisting of messaging application data, fitness application data, and calendar application data, and wherein external devices with the first relationship are configured to sync the first type of data with the computer system without receiving user input, receiving a request to display a device management user interface for devices managed by the computer system; and
      in response to receiving the request to display the device management user interface, displaying, via the display generation component, the device management user interface, wherein displaying the device management user interface includes concurrently displaying:
         a first user interface object corresponding to a first external device that has the first relationship with the computer system, wherein the first user interface object includes a first representation of a respective user interface that has been configured for the first external device; and
         a second user interface object corresponding to a second external device that has the second relationship with the computer system, wherein the second user interface object is visually distinguished from the first user interface object in the device management user interface to indicate that the second external device has the second relationship with the computer system, and wherein the second user interface object includes a second representation of a respective user interface that has been configured for the second external device.

39. The method of claim 38, wherein displaying the device management user interface includes concurrently displaying:
- a first visual indication of a first user signed into a first account on the first external device, wherein the first visual indication visually corresponds to the first external device; and
- a second visual indication of a second user signed into a second account, different from the first account, on the second external device, wherein the second visual indication visually corresponds to the second external device.

40. The method of claim 38, wherein displaying the device management user interface includes concurrently displaying:
- a first user identification indicator of a first user signed into a first account on the first external device, wherein the first user identification indicator is visually associated with the first external device; and
- a second user identification indicator of a second user signed into a second account, different from the first account, on the second external device, wherein the second user identification indicator is visually associated with the second external device.

41. The method of claim 38, wherein:
the respective user interface that has been configured for the first external device includes a watch face user interface of the first external device currently configured to be displayed by the first external device; and
the respective user interface that has been configured for the second external device includes a watch face user interface of the second external device currently configured to be displayed by the second external device.

42. The method of claim 41, wherein displaying the watch face user interface of the second external device includes:
in accordance with a determination that the second external device is operating in a restricted mode, displaying the watch face user interface of the second external device as being a restricted mode watch face user interface; and
in accordance with a determination that the second external device is not operating in the restricted mode, displaying the watch face user interface of the second external device as being a watch face different from the restricted mode watch face user interface.

43. The method of claim 42, wherein the restricted mode watch face user interface is a watch face user interface that limits access to an application of the second external device while the second external device operates in the restricted mode.

44. The method of claim 38, wherein the computer system is signed into a first account and the second external device is signed into a second account, different from the first account, the method further comprising:
- while displaying the device management user interface, detecting that a proximity between the computer system and the second external device satisfies a proximity condition;
- while the proximity condition between the computer system and the second external device is satisfied, detecting a third user input on the second user interface object; and
- in response to detecting the third user input on the second user interface object, displaying a settings user interface associated with the second account and the second external device.

45. The method of claim 38, wherein:
the computer system is signed into a first account;
the first user interface object is displayed in a first area of the device management user interface, and the first external device is signed into the first account; and
the second user interface object is displayed in a second area of the device management user interface, different from the first area, and the second external device is signed into a second account, different from the first account.

46. The method of claim 38, wherein the first type of data includes fitness application data.

\* \* \* \* \*